United States Patent [19]

Miller et al.

[11] Patent Number: 4,820,059
[45] Date of Patent: Apr. 11, 1989

[54] SPEECH PROCESSING APPARATUS AND METHODS

[75] Inventors: James D. Miller, St. Louis, Mo.; Hisao M. Chang, Stamford, Conn.

[73] Assignee: Central Institute for the Deaf, St. Louis, Mo.

[21] Appl. No.: 60,246

[22] Filed: Jun. 9, 1987

Related U.S. Application Data

[63] Continuation-in-part of Ser. No. 792,965, Oct. 30, 1985, abandoned.

[51] Int. Cl.$^4$ .............................................. G01L 1/00
[52] U.S. Cl. ........................................ 381/43; 381/41; 381/42; 381/44; 364/513.5
[58] Field of Search ............... 381/39, 40, 41, 42, 381/43, 44, 45, 48, 50, 51 R, 52; 364/513.5; 400/120, 121

[56] References Cited

U.S. PATENT DOCUMENTS

| | | | |
|---|---|---|---|
| 3,076,932 | 2/1963 | Jaffe | 324/77 |
| 3,172,954 | 3/1965 | Belar et al. | 179/1 |
| 3,619,509 | 11/1971 | Barger et al. | 179/15 A |
| 3,634,759 | 1/1972 | Koshikawa et al. | 324/77 |
| 3,679,830 | 7/1972 | Uffelman et al. | 179/1 SA |
| 3,812,291 | 5/1974 | Brodes et al. | 179/1 SA |
| 3,881,097 | 4/1975 | Lehmann et al. | 235/156 |
| 3,946,157 | 5/1976 | Dreyfus | 179/1 SA |
| 4,057,756 | 11/1977 | Ley et al. | 324/77 B |
| 4,059,725 | 11/1977 | Sakoe | 364/513.5 |
| 4,060,716 | 11/1977 | Pekrul et al. | 364/576 |
| 4,087,632 | 5/1978 | Hafer | 364/513.5 |
| 4,092,493 | 5/1978 | Rabiner et al. | 179/1 SD |
| 4,184,049 | 1/1980 | Crochiere et al. | 179/1 SA |
| 4,435,617 | 3/1984 | Griggs | 381/44 |
| 4,467,437 | 8/1984 | Tsuruta et al. | 364/513.5 |
| 4,479,236 | 10/1984 | Sakoe | 381/43 |
| 4,489,434 | 12/1984 | Moshier | 381/43 |
| 4,489,435 | 12/1984 | Moshier | 381/43 |
| 4,509,187 | 12/1985 | Ackland et al. | 381/43 |
| 4,570,232 | 2/1986 | Shikano | 364/513.5 |
| 4,592,086 | 5/1986 | Watari et al. | 381/43 |
| 4,608,708 | 8/1986 | Watanabe | 381/43 |
| 4,661,915 | 4/1987 | Ott | 364/513.5 |
| 4,667,341 | 5/1987 | Watari | 381/43 |
| 4,736,429 | 4/1988 | Niyada et al. | 381/43 |

OTHER PUBLICATIONS

Delattre et al., "Acoustic Loci and Transitional Cues for Consonants", *J. Acoust. Soc. Am.*, vol. 27, No. 4, 7/55, pp. 769-733.

Lehiste et al., "Transitions, Glides, and Diphthongs", *J. Acoust. Soc. Am.*, vol. 33, No. 3, 3/61, pp. 268-277.

Stevens et al., "Crosslanguage Study of Vowel Perception", *Language and Speech*, 1969, pp. 1-23.

(List continued on next page.)

Primary Examiner—William M. Shoop, Jr.
Assistant Examiner—Paul Ip
Attorney, Agent, or Firm—Senniger, Powers, Leavitt and Roedel

[57] ABSTRACT

Speech processing apparatus and methods utilizing a circuit for electronically deriving from speech over time a series of coordinate values representing positions of points on a path in a mathematical space which path positions represent the speech. An electronic memory prestores phonetic representations in correspondence with indicia of a glide in the path which indicia represent a nucleus in the space at which the glide begins and a range of directions of offglide on the path from the nucleus. A trajectory parameter is electronically computed from the series of coordinate values. When both the trajectory parameter satisfies a predetermined condition for significance and a coordinate value currently reached by the speech is within a predetermined region of such values, a signal is produced. The speech on the path is electronically analyzed in response to the signal for occurrence of a position in the nucleus and an offglide in said range of directions which offglide happens before another significant trajectory parameter occurs. Upon occurrence of such indicia of a glide, the phonetic representation corresponding to the glide indicia is obtained from the electronic memory. Other apparatus and methods for producing a segmentation index signal representing the trajectory parameter are disclosed.

18 Claims, 36 Drawing Sheets

OTHER PUBLICATIONS

Flanagan, *Speech Analysis Synthesis and Perception*, Springer-Verlag, 1972, face sheet and pp. 194–197, 202–203.

Miller, "Speech Processing Apparatus and Methods", May 7, 1987, World Intellectual Property Organization, International Bureau, International Publication No. WO 87/02816, 93 pp.

Joos, "Acoustic Phonetics", *J. Ling. Soc. Am.*, vol. 24, No. 2, Suppl., Apr.-Jun. 1948, p. 104.

Rife et al., "Use of the Discrete Fourier Transform in the Measurement of Frequencies and Levels of Tones", *The Bell System Tech. J.*, 2/70, pp. 197, 198, 202–205.

Niederjohn et al., "Computer Recognition of the Continuant Phonemes in Connected English Speech," *IEEE Trans. on Audio and Electroacoustics*, vol. AU–21, No. 6, Dec. 1973, p. 526.

Marslen-Wilson et al., "Processing Interactions and Lexical Access During Word Recognition in Continuous Speech", *Cog. Psych.* 10, 1978, pp. 29–63.

Jain et al., "High-Accuracy Analog Measurements via Interpolated FFT", *IEEE Trans. Inst. & Meas.*, vol. IM–28, No. 2, 1979, pp. 113–122.

*Periodic Progress Report No. 25*, Research Dept., Central Institute Institute for the Deaf, 7.1.81–6.30.82; pp. ii, iii 24–28.

Kasuya, "Japan's Drive for Speech Recognition", *Speech Tech.*, Sep./Oct. 1982, pp. 10, 12, 15–20.

Johnson, "Will Typewriters Ever Take Dictation?", *Speech Tech.*, Sep./Oct. 1982, pp. 35–42.

Ohga, "Recognition Board Cuts Both Size and Cost", *Speech Tech.*, Sep./Oct. 1982, pp. 82–85.

Miller, "BBB3. Auditory-Perceptual Approaches to Phonetic Perception" *J. Acoust. Soc. Am.* Suppl. 1, vol. 71, Spring 1982, p. S112.

Siegel et al., "Voiced/Unvoiced/Mixed Excitation Classification of Speech", *IEEE Trans. Acoust. Speech & Sig. Processing*, 1982, pp. 451–460.

*Periodic Progress Report No. 26*, Research Department, Central Institute for the Deaf, 7.1.82–6.30.83, pp. ii, iii 22–25.

Miller, "Sensory-Perceptual Dynamics and Categorization in Phonetic Perception", from Abstracts of the Sixth Midwinter Meeting of ARO, 1983, p. 76.

Reddy et al., "Recognizing Continuous Speech Remains an Elusive Goal", *IEEE Spectrum*, 11/83, pp. 84–87.

Scheffers, "Simulation of Auditory Analysis of Pitch: An Elaboration on the DWS Pitch Meter", *J. Acoust. Soc. Am.*, vol. 74, No. 6, 1983, pp. 1716–1725.

Miller, "Auditory Processing of the Acoustic Patterns of Speech,"*Arch. Otolaryngol.*, vol. 110, 3/84, pp. 154–159.

Miller, "Auditory-Perceptual Correlates of the Vowel", *J. Acoust. Soc. Am.* Suppl. 1, vol. 76, 1984, Abstract KK2, p. S79.

Micro Control Systems, "Capture 3-Dimensional Position Data an Instant ", 3 pp. including 3-Digitizer With On-Board Intelligence Features Four Modes, High Acurracy, *EDN*, , 5.31, p. 84.

McCandless, "An Algorithm for Automatic Formant Extraction Using Linear Prediction Spectra", *IEEE Trans. Acoust., Speech, and Signal Process*, vol. AS-SP–22, 1974, pp. 135–141.

FIG. 2
FIG. 5
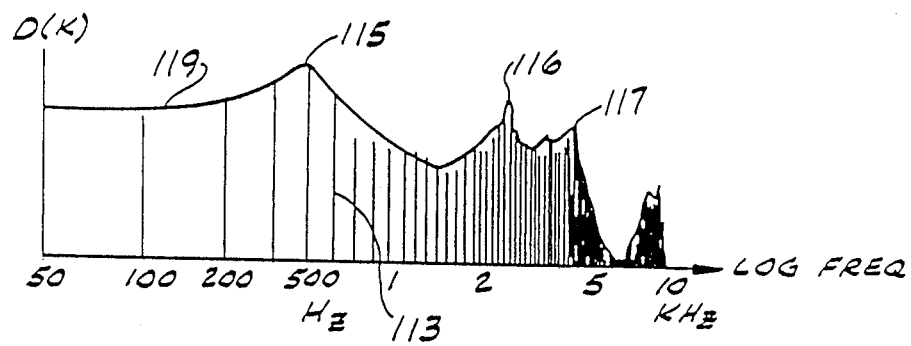
FIG. 5A
SPECTRUM TABLE

CPU 1 INTERRUPT ROUTINE

©1987 CENTRAL INSTITUTE FOR THE DEAF

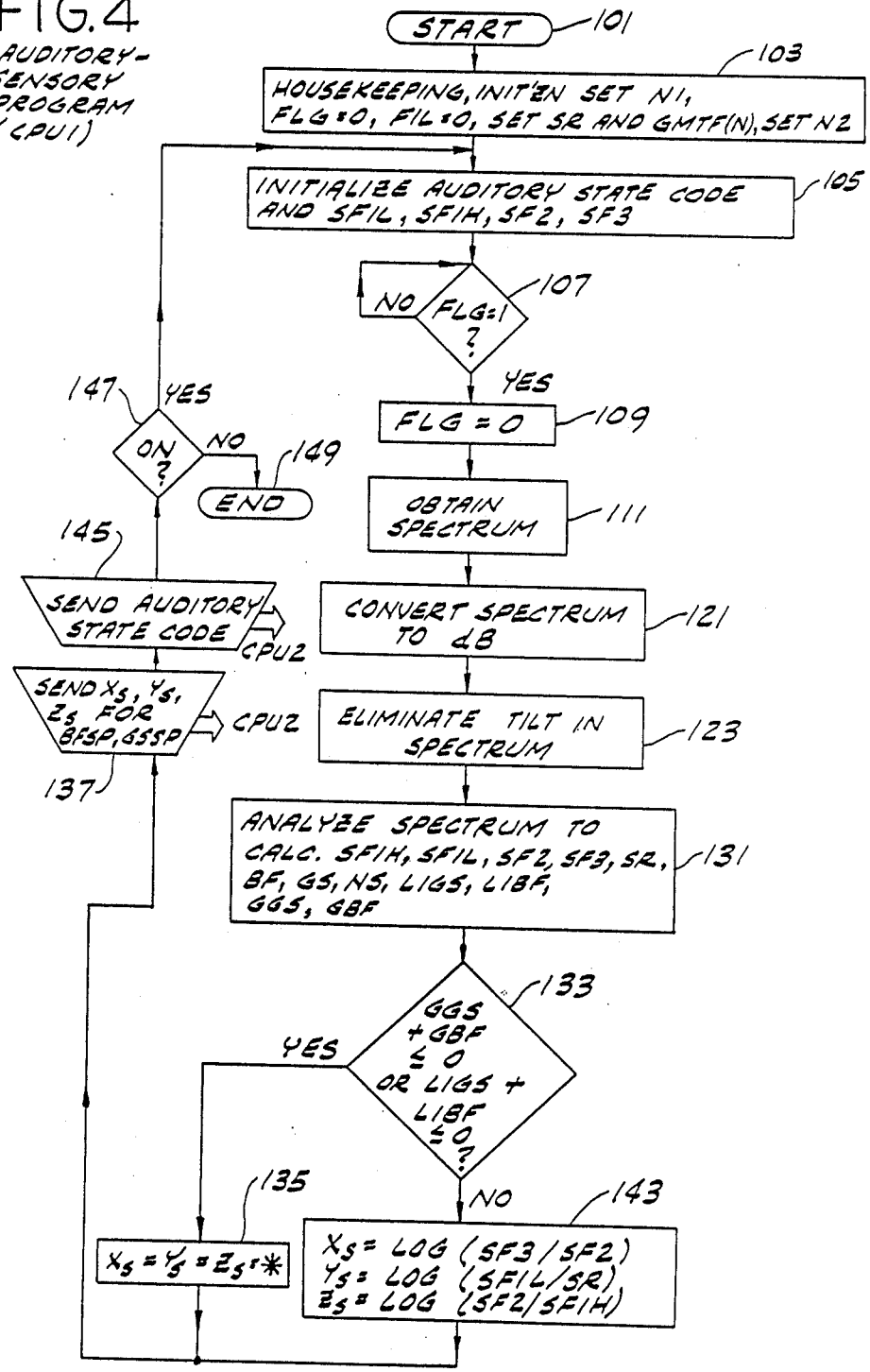

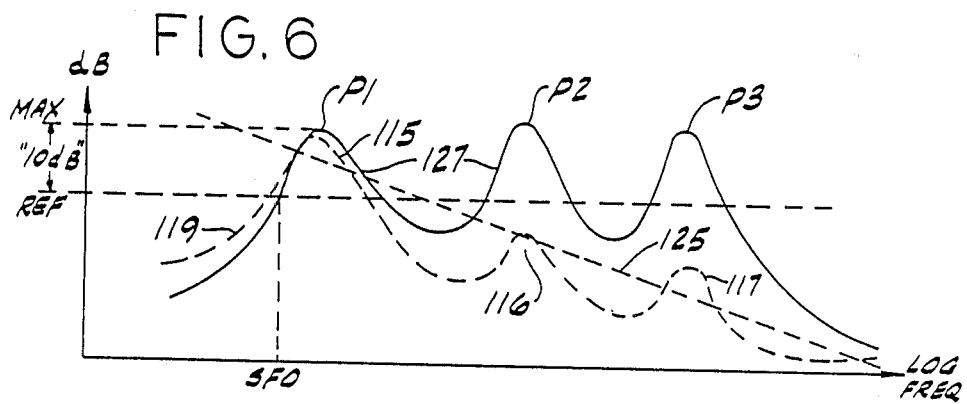
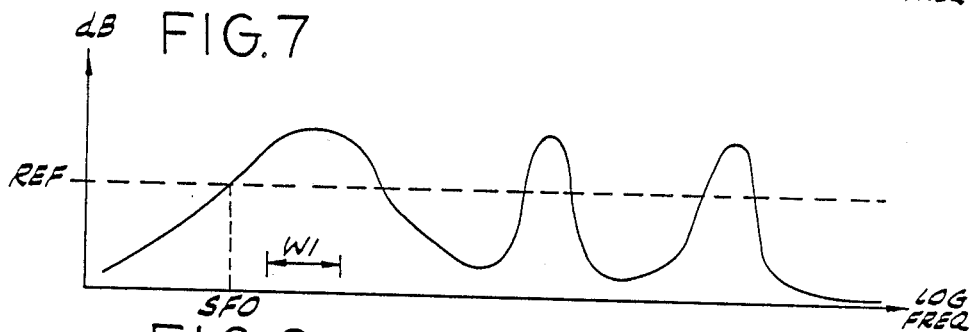
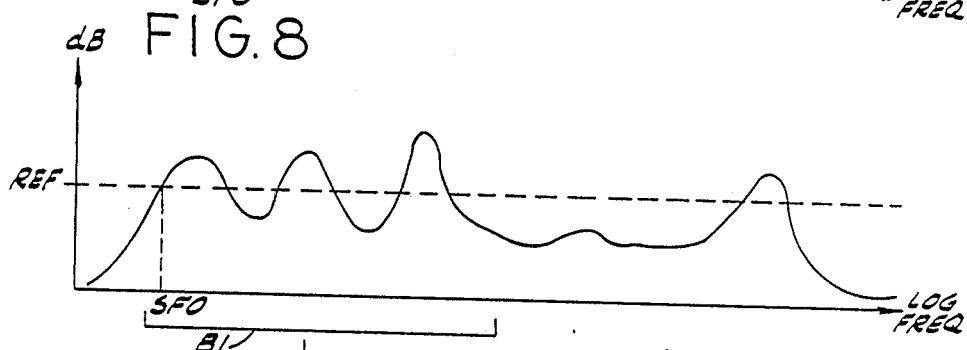
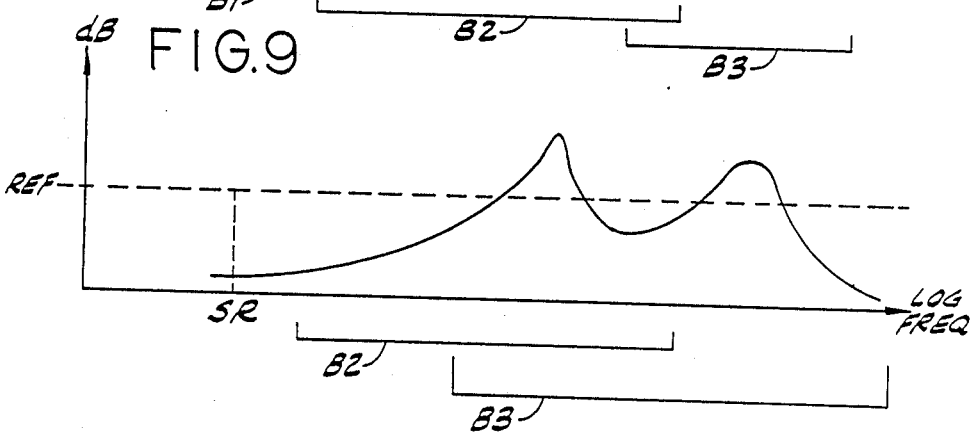

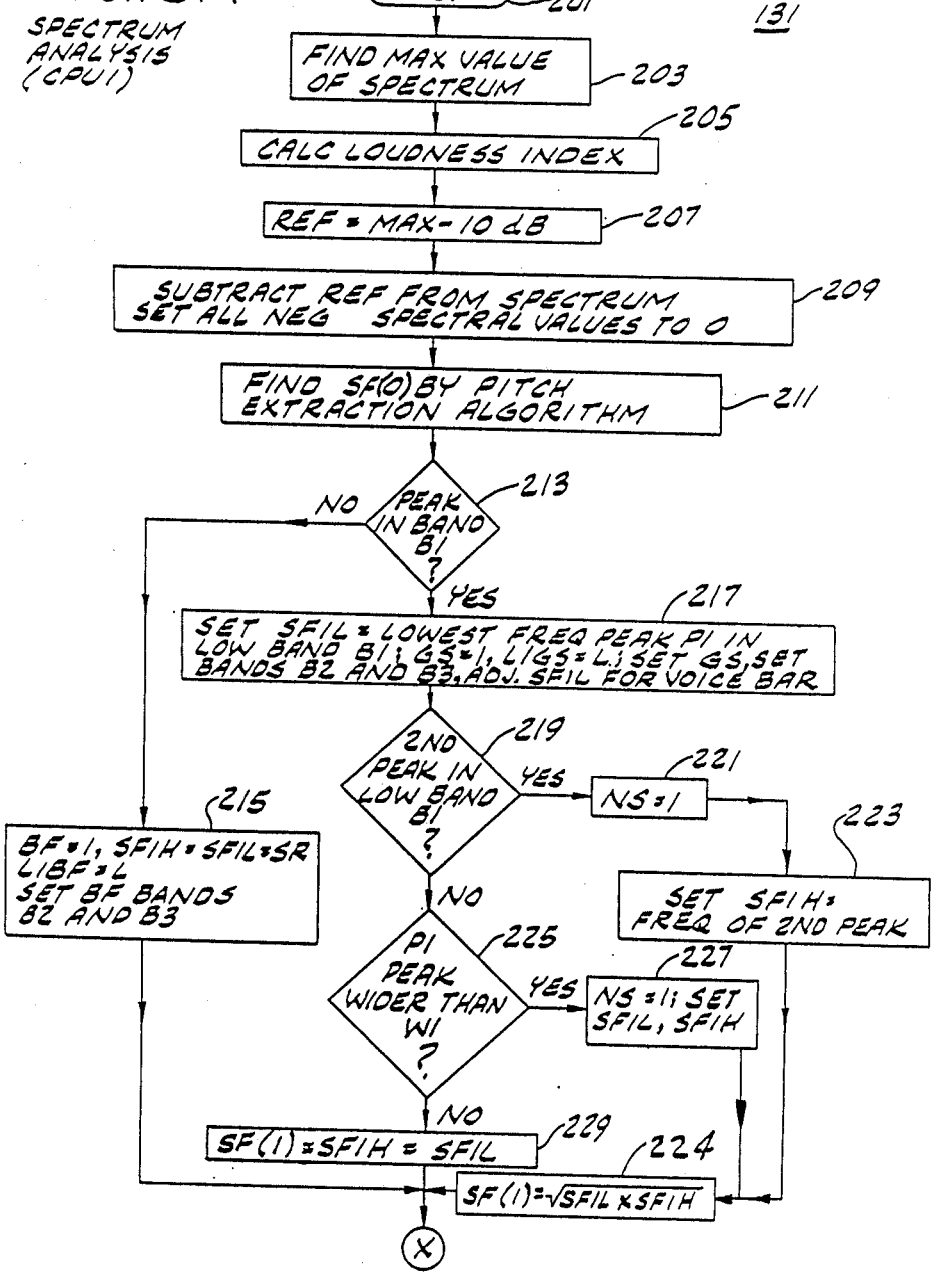

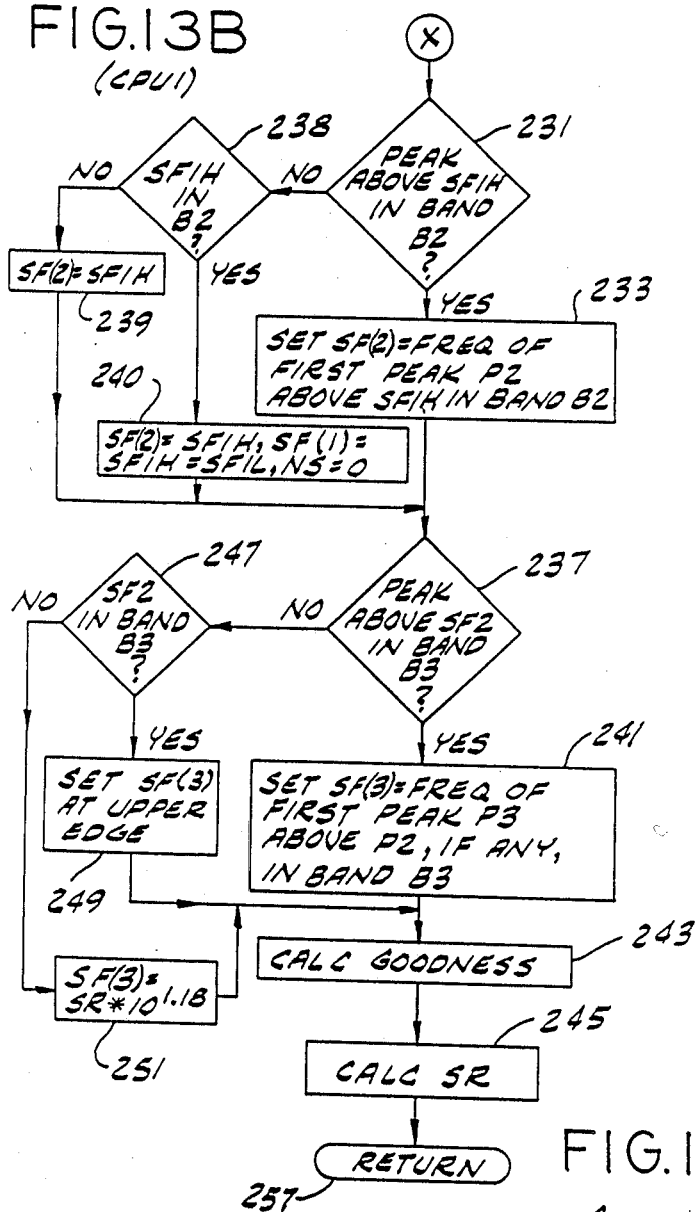
FIG.13B (CPU1)
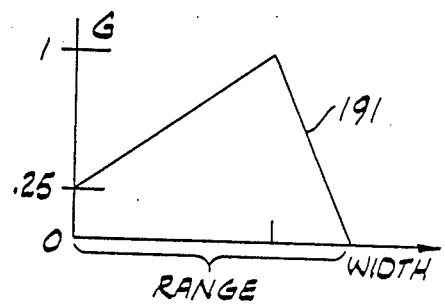
FIG.11
© 1987 CENTRAL INSTITUTE FOR THE DEAF

EXCESSIVE TILT IN VOICE BAR

30+ dB

REDUCE SF(1) AND SFIL

FIG.29 TARGET ZONE I.D.

© 1987 CENTRAL INSTITUTE FOR THE DEAF

©1987 CENTRAL INSTITUTE FOR THE DEAF

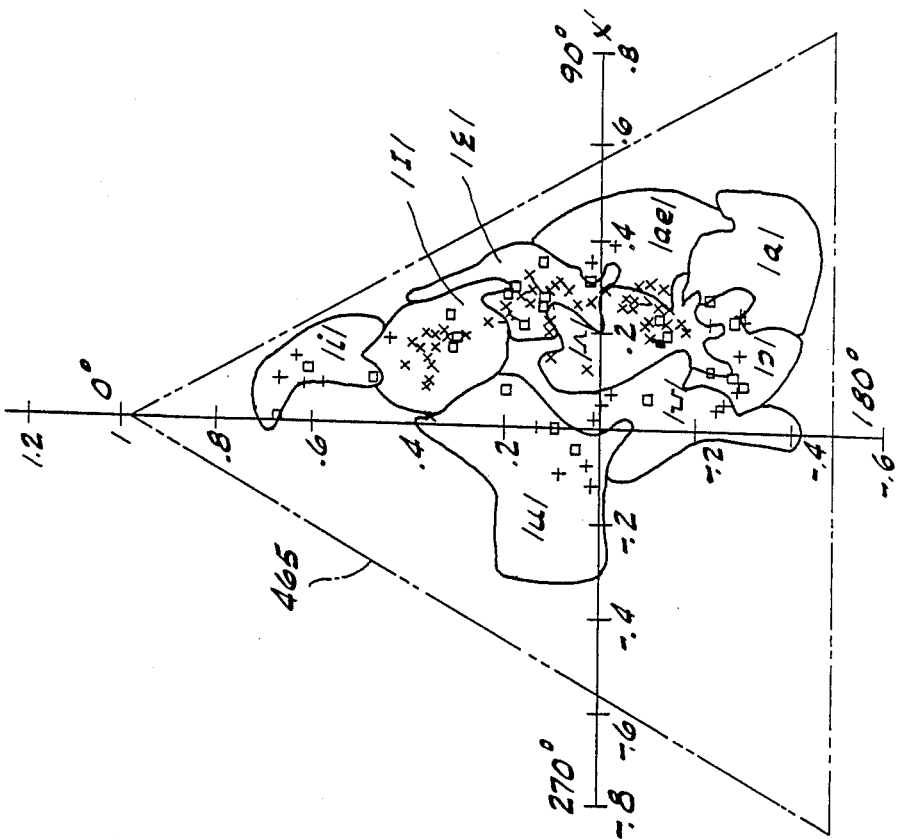
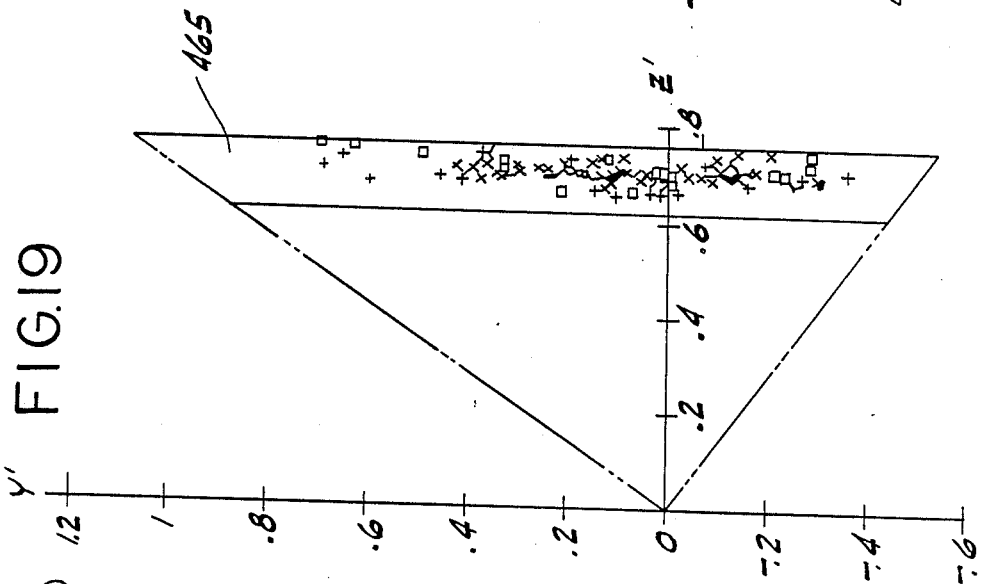
FIG.20
FIG.19
© 1987 CENTRAL INSTITUTE FOR THE DEAF

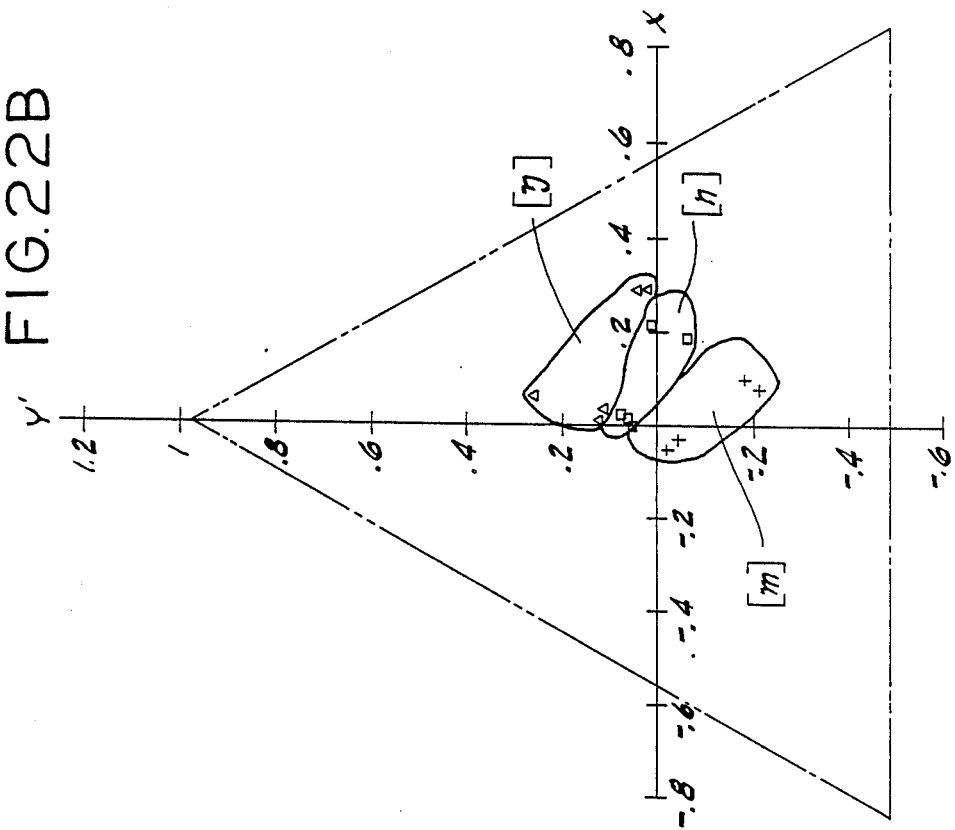
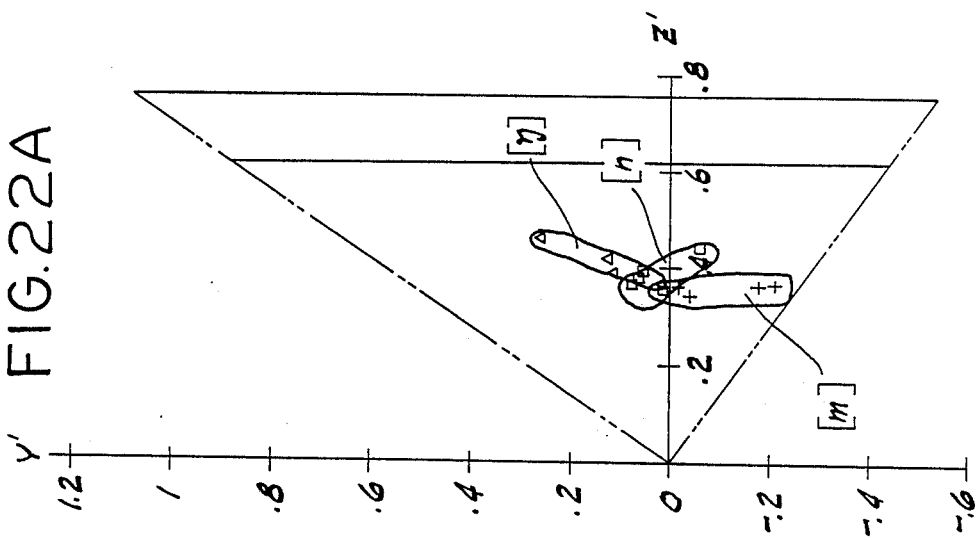
FIG.22B
FIG.22A
© 1987 CENTRAL INSTITUTE FOR THE DEAF

© 1987 CENTRAL INSTITUTE FOR THE DEAF

© 1987 CENTRAL INSTITUTE FOR THE DEAF

©1987 CENTRAL INSTITUTE FOR THE DEAF

FIG. 32C

FIG. 32B W-GLIDE = [Wn] -- OFF GLIDE, WHERE OFF GLIDE IS IN Y', X'-PLANE WITH ANGLE BETWEEN 0°-180°

©1987 CENTRAL INSTITUTE FOR THE DEAF

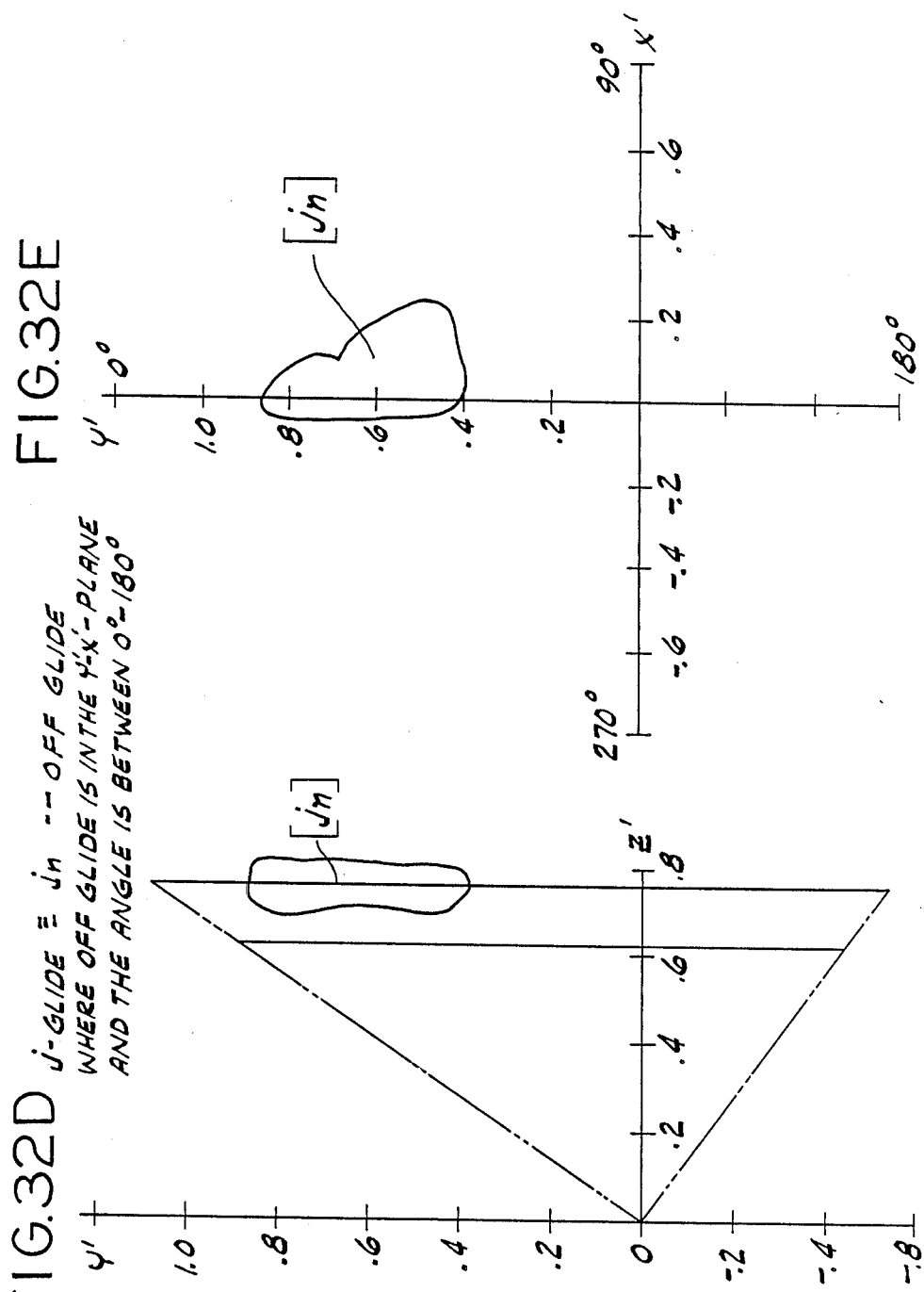

PHONETIC ELEMENT PROGRAM II (CPU 3)

GLIDE SUBROUTINE 810

©1987 CENTRAL INSTITUTE FOR THE DEAF

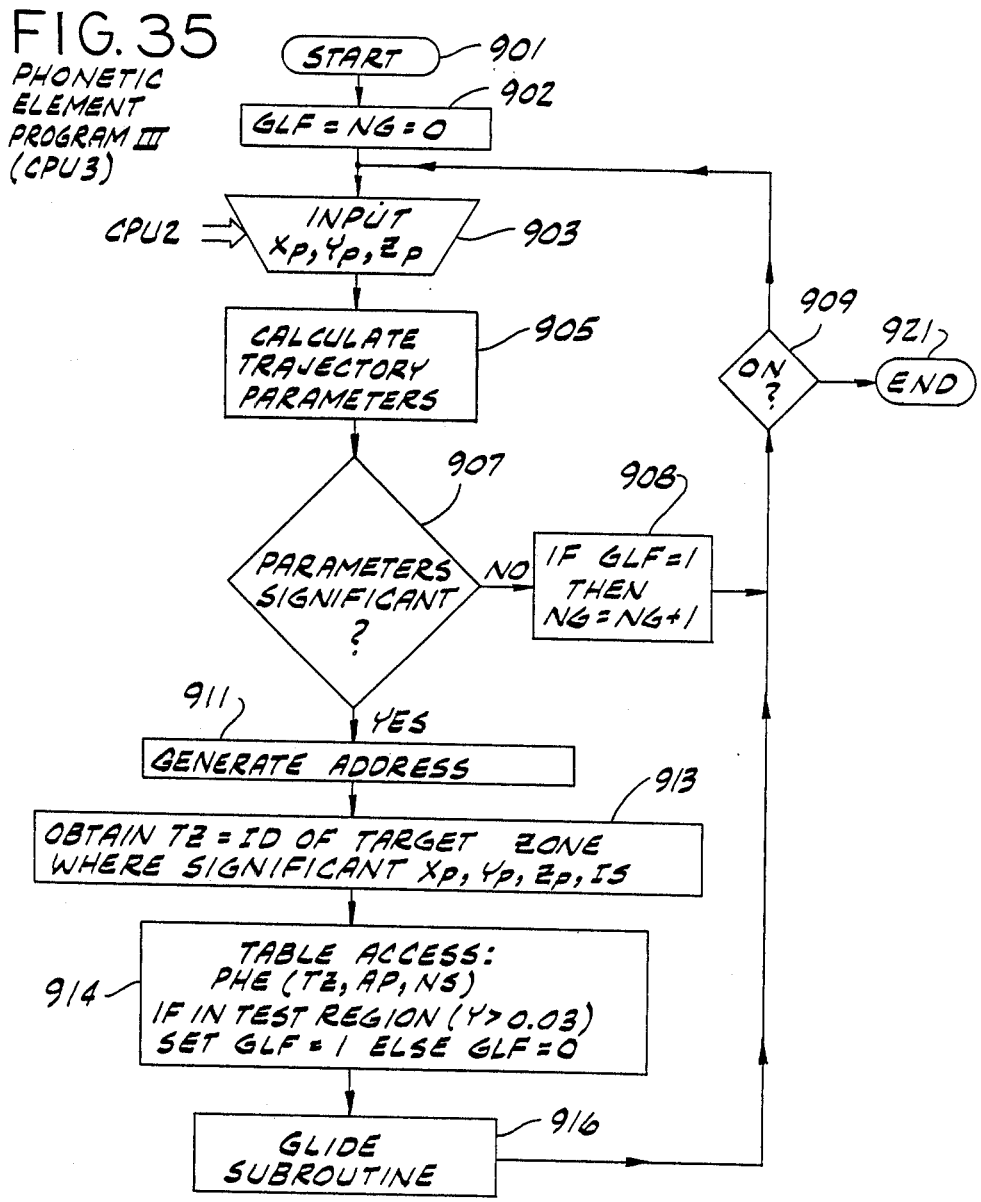
FIG. 35 PHONETIC ELEMENT PROGRAM III (CPU3)
©1987 CENTRAL INSTITUTE FOR THE DEAF

GLIDE SUBROUTINE
(CPU3)   916

©1987 CENTRAL INSTITUTE FOR THE DEAF

FIG.37 OUTPUT SUBROUTINE (CPU 3)

© 1987 CENTRAL INSTITUTE FOR THE DEAF

FIG. 39
SR ROUTINE 1105

- BEGIN — 1151
- STIMER = 0 — 1153
- 1155: BF = 1 ?
  - YES → FF(4,5) = FS(4,5) = 1 — 1157
  - NO → FF(4,5) = 0 — 1159
- 1161: GS = 1 ?
  - YES → FF(1,2,3) = FS(1,2,3) = 1; — 1163
  - NO → FF(1,2,3) = 0; IF BF = 1 THEN SF(4) = SF(2) AND SF(5) = SF(3) — 1165
- 1167: PERIODIC SPECTRUM ?
  - NO → AP = 1, FF(0) = 0 FS(0) = 1 — 1171
  - YES → AP = 0, FF(0) = FS(0) = 1 — 1169
- UPDATE GMTF(N), FSUM, SR — 1173
- ANALYZE TFO TABLE FOR PITCH MODULATION FREQ: FIL (HZ) — 1175
- SR = SR + FIL (TFO) — 1177
- RETURN — 1179

© 1987 CENTRAL INSTITUTE FOR THE DEAF

FIG. 40 UPDATE 1173

© 1987 CENTRAL INSTITUTE FOR THE DEAF

AUDITORY-SENSORY PROGRAM (CPU1)

© 1987 CENTRAL INSTITUTE FOR THE DEAF

SPEECH PROCESSING APPARATUS AND METHODS

GOVERNMENT SUPPORT

This invention was made with Government support under Grant No. AFOSR-86-0335 awarded by the Air Force. The Government has certain rights in this invention.

CROSS-REFERENCE TO RELATED APPLICATION

The present application is a continuation-in-part of coassigned U.S. patent application Ser. No. 79,965, filed Oct. 10, 1985 which is incorporated herein by reference now abandoned. This application has the same disclosure as cofiled application Ser. No. 060,397.

BACKGROUND OF THE INVENTION

The present invention relates to speech processing apparatus and methods. More particularly, the present invention relates to apparatus and methods for use in automatic speech recognition applications and research.

Speech, as it is perceived, can be thought of as being made up of segments or speech sounds. These are the phonetic elements, the phonemes, of a spoken language and they can be represented by a set of symbols, such as International Phonetic Association symbols.

These segments are linguistic units and have their bases in speech as it is perceived and spoken. All of the syllables and words of a language are made up of a relatively small number of phonetic elements. For example, in the case of English, textbooks in phonetics may list as few as 25 consonants and 12 vowels for a total of 37 phonemes. If the finer phonetic distinctions are included, then the list of distinguishable speech sounds or phones may lengthen to as high as 50 or 60.

It has been proposed that the phonemes of a spoken language can be understood in terms of a small set of distinctive features numbering about 12. These features have their bases in articulatory, perceptual, and linguistic analyses. A feature approach is often used in textbooks on phonetics as the phones and phonemes are described in terms of place of articulation and manner of articulation.

There are several theories of how the human listener processes an incoming acoustic waveform of speech and translates that waveform into a series of linguistic elements such as phonemes or words. The exact mechanisms and processes involved in the perception of speech are not yet fully understood. Finding simple and reliable acoustic-auditory correlates of the phones, phonemes and presumed features has proved elusive.

Research on speech perception has led to complicated, highly conditioned statements of relations between acoustic- auditory patterns and perception of phonemes, and even these statements are often of narrowly circumscribed generality. For example, the problem of how the listener can divide the acoustic input into segments relevant to linguistic perception is not understood. Even if a solution of this segmentation problem were available, the auditory-acoustic expression of a phoneme or feature seems to depend on the phonetic context, the particular talker, and the rate of speaking.

As a result of these problems there are several viable theories of speech perception. All of the current theories can be cast into a generic three-stage model, with the acoustic input undergoing three stages of processing in a bottom-up sequence. Stage 1 is an auditory-sensory analysis of the incoming acoustic waveform whereby representation of the signal is achieved in auditory-sensory terms. Stage 2 is an auditory- perceptual transformation whereby the spectral output of stage 1 is transformed into a perceptual form relevant to phonetic recognition. Here the spectral descriptions are transformed into dimensions more directly relevant to perception. For example, in various theories the perceptual form may be related to articulatory correlates of speech production or auditory features or pattern sequences. Finally, there is stage 3 in which the perceptual dimensions of stage 2 are transformed by a phonetic- linguistic transformation into strings of phonemes, syllables, or words. Stages 2 and 3 also are influenced by top-down processing wherein stored knowledge of language and events and recent inputs, including those from other senses as well as language, are brought into play.

Some work in automatic speech recognition has involved a narrow-band spectral analysis performed on a time-windowed speech waveform. In one system described in "Recognizing continuous speech remains an elusive goal" by R. Reddy et al., IEEE Spectrum, Nov., 1983, pp. 84–87, incoming digitized signals are broken into centisecond slices and spectrally analyzed. Each slice is compared with a collection of sound prototypes and the prototype closest to each slice is entered into a sequence. The prototype sequence is then used to roughly categorize the initial sound of the word, which in turn is used to produce word hypotheses. Each word is then tested by creating a probability matrix and a cycle of operation repeats for the next word until an entire sentence is identified.

Diphthongs, glides, and r-colored vowels are speech sounds that are all generically referred to as glides herein. Analysis of these sounds continues to pose difficult problems among the many faced in the field of automatic speech recognition. A paper which discusses some of these types of speech sounds is "Transitions, Glides, and Diphthongs" by I. Lehiste et al., *J. Acoust. Soc. Am.*, Vol. 33, No. 3, March, 1961, pp. 268–277.

SUMMARY OF THE INVENTION

Among the objects of the present invention are to provide improved speech processing apparatus and methods which more effectively process speech into segments; to provide improved speech processing apparatus and methods which more effectively and automatically recognize glide phonetic elements in speech; and to provide improved speech processing apparatus and methods which are alternatives to the improved speech processing apparatus and methods of cofiled application Ser. No. 060,397.

In a form of the present invention, speech processing apparatus includes a circuit for electronically deriving from speech over time a series of coordinate values representing positions of points on a path in a mathematical space which path positions represent the speech. Also, an electronic memory prestores phonetic representations in correspondence with indicia of a glide in the path which indicia represent a nucleus in the space at which the glide begins and a range of directions of offglide on the path from the nucleus. A further circuit electronically computes a trajectory parameter from the series of coordinate values and, when both the trajectory parameter satisfies a predetermined condition for significance and a coordinate value currently reached by the speech is within a predetermined region of such values, produces a signal. In response to the signal, the speech on the path is electronically analyzed for occurrence of a position in the nucleus and an offglide in said range of directions which offglide happens before another significant trajectory parameter occurs. Upon occurrence of such indicia of a glide, the phonetic representation corresponding to the glide indicia is obtained from the electronic memory.

In another form of the invention, speech processing apparatus includes circuitry that electronically derives frequency spectra from speech in successive time intervals respectively and computes a series of coordinate values of points on a path in a mathematical space from the frequency spectra of the speech. Further circuitry generates a segmentation index signal representing a function of the difference between the greatest and the least coordinate value occurring in a time period encompassing a predetermined number of the time intervals. As a result, the segmentation index signal indicates how the speech is to be segmented.

Other apparatus and method forms of the invention for achieving the above-stated and other objects of the invention are also disclosed and claimed herein.

Other objects and features will be in part apparent and in part pointed out hereinafter.

BRIEF DESCRIPTION OF THE DRAWINGS

FIG. 2 is a graph of voltage versus time of a typical speech waveform;

FIG. 4 is a diagram of operations of a main routine of CPU1 of FIG. 1;

FIG. 5 is a graph of amplitude versus log-frequency of a ten-millisecond sample of the speech waveform of FIG. 2, showing a frequency spectrum thereof;

FIG. 5A is a diagram of a table in a memory for CPU1 for holding a set of spectral values corresponding to multiples K of a basic frequency;

FIGS. 6, 7, 8 and 9 are a set of graphs of spectral envelopes in decibels versus log-frequency for illustrating a method for analyzing different frequency spectra of speech;

FIG. 11 is a graph of speech goodness versus width of one or more peaks in a spectrum;

FIGS. 13A and 13B are two parts of a diagram further detailing operations in the main routine of FIG. 4;

FIGS. 19 and 20 show two different views of a vowel slab with target zones for the vowels in the mathematical space relative to the X',Y',Z' coordinate system of FIG. 18 and viewing along the X' axis in FIG. 19 and along the Z' axis in FIG. 20;

FIGS. 22A and 22B depict target zones in the mathematical space for nasal consonants as viewed respectively along the X' and Z' axes of FIG. 18;

FIG. 29 is a diagram of a table in ROM3 of CPU3 in FIG. 1, which table relates phonetic element representations to the target zone identification numbers of FIG. 28 and to various flags for purposes of a complex target zone method;

FIGS. 32B and 32C are diagrams of a nucleus for a w-glide respectively shown in Y',Z' and in X',Y' coordinates for explaining a glide-detection method of the invention;

FIGS. 32D and 32E are diagrams of a nucleus for a j-glide (as in "yuh") respectively shown in Y',Z' and in X',Y' coordinate explaining a glide-detection method of the invention;

FIG. 35 is a diagram of inventive operations in a further alternative to FIG. 26 for implementing a complex target zone method and an inventive glide detection method;

FIGS. 38, 39 and 40 are flow diagrams of operations according to an alternative to FIG. 14 for generating the spectral reference value;

Corresponding reference characters indicate corresponding parts throughout the several views of the drawings.

DETAILED DESCRIPTION OF PREFERRED EMBODIMENTS

Figure 1:
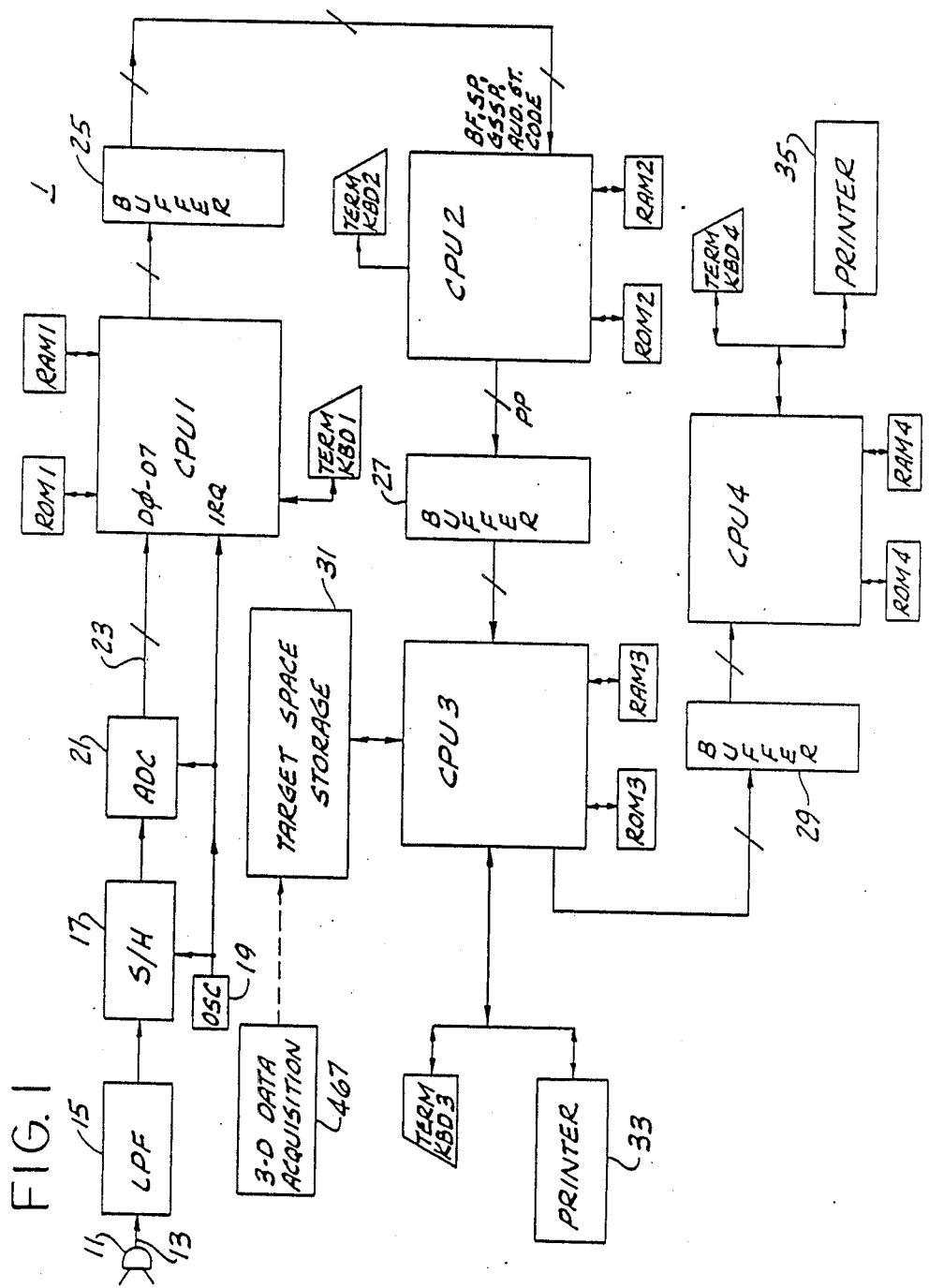
FIG. 1 is a block diagram of a speech processing apparatus.

In FIG. 1 a speech processing system 1 of the invention has a microphone 11 for converting sound pressure variations of an acoustic waveform of speech to an analog electrical signal on a line 13. System 1 performs a short-term analysis on the speech waveform that allows it to represent, every few milliseconds, the spectral shape and the auditory state of the incoming speech. This sensory processing serves as an input to a higher level perceptual electronic system portion. The perceptual electronic system portion integrates sensory information over time, identifies auditory-perceptual events (or "sounds"), and converts the sensory input into a string of symbols or category codes corresponding to the phonetic elements of a human language.

The electrical signal on line 13 is filtered by an antialiasing low pass filter 15 and fed to a sample-and-hold (S/H) circuit 17. S/H circuit 17 is enabled by an oscillator 19 at a sampling frequency such as 20 KHz. and supplies samples of the analog electrical signal to an analog-to-digital converter (ADC) 21 where the samples are converted in response to oscillator 19 to parallel digital form on a set of digital lines 23 connected to data inputs of a first central processing unit CPU1. CPU1 reads in the latest sample in digital form upon interrupt by oscillator 19 at interrupt pin IRQ every 50 microseconds.

CPU1 is one of four central processing units CPU1, CPU2, CPU3 and CPU4 in FIG. 1, which respectively have programmable read only memory (ROM1, ROM2, ROM3 and ROM4), random access memory (RAM1, RAM2, RAM3 and RAM4), and a video terminal-keyboard unit (TERMKBD1, TERMKBD2, TERMKBD3, and TERMKBD4). CPU1 generates data for CPU2 which is buffered by a data buffer 25. CPU2 generates data for CPU3 which is buffered by a data buffer 27, and CPU3 generates data for CPU4 which is buffered by a data buffer 29. CPU3 has a memory 31 of approximately 2 megabyte or otherwise sufficient capacity that holds prestored information indicative of different phonetic representations, target zone identifications, and glide zone (glide nucleus or radical) identifications corresponding to respective sets of addresses in the memory. CPU3 is provided with a printer 33 for recording phonetic element information in the order obtained by it from memory 31.

CPU4 is in one application shown in FIG. 1 programmed as a lexical access processor for converting the phonetic element information into plaintext and printing it out on a printer 35 to accomplish automatic dictation. CPU4 in some applications, such as a hearing aid embodiment or other intelligent sound system embodiment, is programmed additionally, or instead, to process the phonetic elements and synthesize speech therefrom and make it audible using an electroacoustic output transducer in a manner adapted to ameliorate hearing deficiencies or otherwise produce modified speech based on that entering microphone 11. CPU4 in still other applications acts as a bandwidth compressor to send the phonetic elements through a telecommunication system along with other phonetic elements from a different speech channel with which the first speech phonetic elements are multiplexed. CPU4 in yet further applications is programmed with artificial intelligence or expert systems software to interpret the phonetic elements and to produce a printed response, a synthesized speech response, a robotic response controlling computers or other electronic devices or electromechanical apparatus in home, office or factory, or to produce any other appropriate response to the speech sensed on line 13.

FIG. 2 shows a portion of an electrical waveform 51 of speech. The waveform 51 generally has several peaks and troughs over a time interval, or window, of about ten milliseconds, as well as higher frequency behavior. CPU1 is interrupted 20,000 times per second so that in each ten millisecond time interval a set of 200 samples is obtained from ADC 21.

Figure 3:
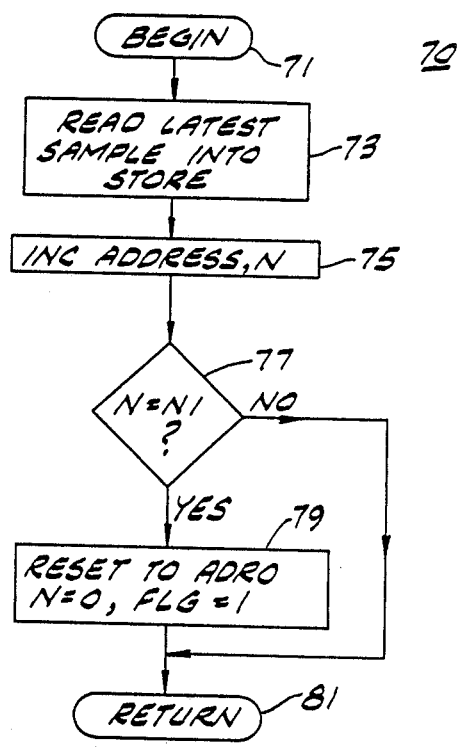
FIG. 3 is a diagram of operations of an interrupt routine of a unit CPU1 of FIG. 1.

In FIG. 3 operations of an interrupt routine 70 of CPU1 commence upon interrupt at pin IRQ with a BEGIN 71 and proceed to a step 73 to read the latest sample into an address location in a section of N1 (e.g. 80) addresses in RAM1. Then in a step 75 both the address and a sample count N are incremented by one. In a decision step 77, the count N is compared with the number N1 to determine if the latest set of samples is complete. If so, then in a step 79 the sample count N is returned to zero and a flag FLG is set to 1 as a signal that the latest set of samples is complete. Also, the address location for the next sample is reset to a predetermined location ADR0 at the beginning of the section of N1 addresses, whence a RETURN 81 is reached. If the latest set of samples is not complete, the operations branch from step 77 to RETURN 81 whence a main program resumes in CPU1 at an operation where the interrupt occurred.

The operations of CPU1 according to its main program are shown in FIG. 4 commencing with a START 101 and input-output housekeeping and initialization at a step 103. Also in step 103, sample set size N1 is set to 80, and a sample flag FLG and a variable FIL are set to zero. A sensory reference frequency SR and a variable GMTF(0) are both initialized to 168 Hertz, a constant close to the geometric mean pitch of the human speaking voice. A set of variables GMTF(N) for N=1 to 5 in a vector including GMTF(0) are also initialized to population mean values as shown in a Table herein and discussed in connection with FIGS. 38-40. A variable N2 is set to 100. Then at a step 105, a set of variables or quantities herein called an auditory state code, as well as a set of frequency values SF1L, SF1H, SF2 and SF3, are all initialized to zero. The variables in the auditory state code of the present embodiment are: burst-friction BF, glottal-source GS, nasality NS, loudness indices LIBF and LIGS for burst-friction and glottal-source sounds respectively, and speech goodness values GBF and GGS for burst-friction and glottal-source sounds respectively. In other embodiments, variables are included in the auditory state code for some or all of a variety of source characteristics of speech including nasality, voicing, frication, aspiration, whisper, loudness and goodness.

Next in a step 107, the flag FLG is checked to confirm that a full set of N1 samples is available. The interrupt operations of FIG. 3 are collecting the next set of N1 samples as the operations of FIG. 4 are executed. If the system 1 has just been turned on, CPU1 will wait until the first set of samples has been obtained and FLG has been set to 1 in the interrupt routine, which wait occurs by a branch from step 107 back to itself. When FLG becomes one, a full set of samples is present and FLG is reset to zero in a step 109. Next in a step 111 a set of digital values representing a frequency spectrum corresponding to the latest N1 samples from ADC 21 is computed according to a Discrete Fourier Transform (DFT) procedure. In other words each such set of digital values represents the frequency spectrum of the speech in each successive ten millisecond interval or frame. It is to be understood that the number of samples and duration of each frame can be modified as application considerations dictate.

An example frequency spectrum is depicted by vertical lines 113 of FIG. 5. The frequency spectrum is computed as follows. The digital values of the samples are designated S(N) where N goes from zero to N1-1. Their DFT is given by the equation $$D(Kf) = \sum_{N=0}^{N1-1} (S(N) e^{-j2\pi i KN/N1}) \quad (1)$$

where e is the base of natural logarithms, j is the square root of minus one, and pi is the ratio of circumference to diameter of a circle. f is a basic frequency equal to the reciprocal of the time required to collect a set of N1 samples (when time is 10 milliseconds, f is 100 Hertz) and Kf is an integer multiple of the frequency f at which one of the lines 113 in the spectrum is to be computed. CPU1 computes the DFT by the Fast Fourier Transform algorithm familiar to the art for frequency multiples K from 1 to a number M. The number M is half the sampling rate times the time required to collect a set of the N1 samples (20,000 Hz.x0.5x0.01 sec.=100).

The values of D(Kf) are stored as illustrated in FIG. 5A in a spectrum table in RAM at successive addresses corresponding to the K values respectively.

In another method for deriving the spectral envelope of the speech waveform, the speech waveform is multiplied by time-window weighting functions of 5-40 millisecond duration but shifted in 1.0-2.5 millisecond steps. Thus the successive time intervals defining the windows can be either overlapping or distinct. The window duration and step size as related to bursts, transitions and relatively steady-state segments are adjusted for best performance. The short-term spectrum is calculated for each segment by either DFT or linear prediction analysis (LPA). The DFT, of course, produces a line spectrum with components at integral multiples of the reciprocal of the window length while the LPA produces a smoothed spectral envelope—transfer function—with detail dependent on the number of LP-parameters selected. Either spectrum is represented in log-magnitude by log-frequency dimensions. Operations accomplish or approximate the following. The spectrum is "windowed" in the log frequency domain so that the amplitudes are represented in sensation levels or loudness levels. The spectrum is subjected to smoothing filters one of which is similar to the critical-band. Another minimizes confusing minor spectral peaks. Finally, the spectral envelope is subjected to high-pass filtering in the log-frequency domain to eliminate spectral tilt. The resulting spectra preferably have formant peaks of nearly uniform height—tilt having been removed and have minor irregularities removed by the smoothing filters. A nasal wave can be detected in the lower half of the speech spectrum by looking for a weakened and broadened first formant, or to window the processed spectral envelope in the appropriate range of log frequency units and band-pass filter that segment in search of the nasal wave, or to use correlational signal processing techniques.

In an another alternative embodiment, a real time filter bank circuit is used to produce the spectrum for CPU1. Such a filter bank advantageously reduces the computing required of CPU1, and in such embodiment the spectrum table is updated from the real time filter bank at regular intervals such as every ten milliseconds or even more frequently, for example every 1-2.5 milliseconds. Also, signal processing chips for inexpensively and rapidly computing spectra are available such as the Texas Instruments TMS 320.

In FIG. 5 the spectrum has several peaks 115, 116, and 117 which decline in height or "tilt" with increasing frequency. To facilitate the description an envelope 119 is drawn on FIG. 5 which envelope has the same peaks 115, 116 and 117. Envelope 119 is redrawn dashed in FIG. 6 with the spectral lines 113 being understood but suppressed in FIG. 6 for clarity. CPU1 in a step 121 of FIG. 4 converts the spectrum to decibels (dB) of sensation level according to the equation $$D(Kf)_{dB} = 20 \log_{10} D(Kf/\text{ref}) \qquad (2)$$

where D(Kf) is each spectral value at frequency Kf, and ref is normal human threshold for that frequency in sound pressure.

The spectrum is smoothed by sliding a critical-band-like weighting function along the log-frequency or pitch-like axis, and spectral tilt or "combing" is also eliminated by passing the smoothed spectrum through a high-pass lifter defined in the log-frequency or pitch-like domain. The resulting smooth envelope is rectified (straightened) to eliminate low-level excursions, including those some fixed number of decibels below the highest spectral peaks as well as those below the threshold of hearing, since these are irrelevant to phonetic perception.

The processed spectral envelope is tested for the presence, location and strength of the nasal wave. After determination of nasalization, which can be removed by further spectrum processing in some embodiments, the spectral envelope is examined for low and high frequency cutoffs and significant spectral prominences.

In a step 123 of FIG. 4 the tilt suggested by a dashed line 125 in FIG. 6 is eliminated from the spectrum by adding values to the spectrum that increase with frequency at a rate of C dB per ten-fold increase in frequency. The value of the constant C is determined using a linear regression analysis of the spectrum. By eliminating the tilt from the spectrum, a relatively flat spectral representation is achieved wherein energy prominences have approximately the same amplitude. The values for high-pass lifting to eliminate tilt are determined from the equation $$D1 = C \times \log K \qquad (3)$$

In words, to eliminate the tilt, each of the M values (where M is illustratively 40) of the spectrum in decibels is respectively added to a corresponding value computed according to equation (3) for each K from 1 to M. The resulting spectrum is suggested by an envelope 127 of FIG. 6 having three peaks P1, P2 and P3 in order of increasing frequency.

The above-described short-term spectral analysis of the time-windowed speech waveform identifies the amplitudes and frequencies of tonal components in the speech waveform and at the same time produces a power spectrum of any significant a periodic energy or other unresolved high-frequency components in the speech waveform. This information is used to distinguish a periodic, periodic, and mixed segments and to establish an effective lower frequency F0 or low pitch, of the periodic and mixed segments. This same short-term spectral information undergoes further processing to generate auditory-spectral patterns that can be called sensory-excitation patterns, auditory- sensory spectra, or auditory-spectral envelopes.

Voice pitch plays a role in the identification of voiced phonetic segments such as vowels like a, e, i, o and u. Detection of a periodic energy in speech is very important for the recognition of aspiration sounds as in /h/, /p/, /k/ and /t/ and of fricatives such as /s/ and /f/ and so on. Voiced fricatives such as /z/, /zh/ and /v/ have a mixture of periodic and a periodic energy and are a combination of both glottal-source and burst-friction spectra.

FIGS. 7, 8 and 9 show envelopes illustrating different types of spectra associated with different types of speech sounds. These spectra have different numbers and shapes of prominences, or peaks, at different frequencies compared with envelope 127 of FIG. 6. Clearly the spectra resulting from steps 111, 121 and 123 of FIG. 4 can vary widely as different sets of speech samples are processed by CPU1.

To characterize these spectra with relatively few variables, each latest spectrum is analyzed in a step 131 of FIG. 4. In this step, three spectral frequencies SF1, SF2 and SF3 are computed. (When these frequencies are part of a table they are equivalently designated SF(1), SF(2) and SF(3).) The spectral frequencies SF1, SF2 and SF3 are in some cases the frequencies at which peaks occur such as P1, P2 and P3 in FIG. 6, and the manner of determining them is described more specifically in connection with FIGS. 13A and 13B hereinafter. Distinct lower and higher values SF1L and SF1H are computed for SF1 when nasality is present. A spectral frequency reference SR is also computed to indicate the overall general pitch (timbre) of the speech so that voices with high pitch (timbre) and voices with low pitch (timbre) are readily processed by the system 1. Also in step 131 auditory state code quantities BF, GS, NS, LIGS, LIBF, GGS and GBF are determined from the spectrum.

Next in a decision step 133 the speech goodness values GGS and GBF are tested and the loudness index values LIGS and LIBF are tested, and if none is positive or otherwise significant, operations branch to a step 135. In step 135 a set of registers in CPU1 (corresponding to a set of three coordinates called sensory pointer coordinates $X_s$, $Y_s$ and $Z_s$) are loaded with a code "*" indicating that the coordinates are undefined. Then in a step 137 the contents of the registers for $X_s$, $Y_s$ and $Z_s$ are sent to CPU2 through buffer 25 of FIG. 1. If in decision step 133 the speech goodness is positive, operations proceed to a step 143 where sensory pointer coordinate value $X_s$ is set equal to the logarithm of the ratio of SF3 to SF2, pointer value $Y_s$ is set equal to the logarithm of the ratio of SF1L to SR, and pointer value $Z_s$ is set equal to the logarithm of the ratio of SF2 to SF1H, whence step 137 is reached. The equations of step 143 are computed once except when glottal source and burst friction spectra are simultaneously present, as in voiced fricatives, in which case step 143 is executed twice to compute sensory pointer coordinates $X_{gs}$, $Y_{gs}$, $Z_{gs}$ for the glottal source spectrum and $X_{bf}$, $Y_{bf}$, $Z_{bf}$ for the burst-friction spectrum.

After sensory pointer coordinate values $X_s$, $Y_s$ and $Z_s$ are sent to CPU2 in step 137, the auditory state code quantities BF, GS, NS, LIGS, LIBF, GGS and GBF are also sent in a step 145 to CPU2 through buffer 25. Then in a step 147, a test is made to determine if an OFF-ON switch is on, and if not, operations terminate at END 149. If the switch is on, as is normal, operations loop back to step 105 for obtaining the next spectrum, analyzing it and sending information to CPU2 as described above. CPU1 thus executes operations continually to obtain spectral information about the samples of speech as they arrive in real time.

The auditory-spectral pattern at any moment in time is given by the auditory-spectral envelope in dB (Phons or Sensation Level or equivalent) against log frequency, as shown in FIG. 5. After appropriate processing of this envelope, the frequency values of SR, SF1, SF2 and SF3 are found for the vocalic portions of speech. Vocalic portions are those segments or spectral components that ordinarily result from an acoustic source at the glottis and have the vocal tract, with or without the nasal tract, as a transmission path to the external air. Thus, voiced speech, which has periodic spectra, and whispers or aspirated sounds, which have a periodic spectra, are the vocalic components of speech and have spectra called glottal-source (GS) spectra herein. One sign of the presence of a vocalic segment is a low-frequency prominence (P1) that can be associated with a first resonance of the vocal tract.

A sensory pointer for vocalic portions of speech has a position in a mathematical space, or phonetically relevant auditory-perceptual space, computed in step 143 of FIG. 4. This pointer is called a glottal-source sensory pointer (GSSP). Usually SF1, SF2 and SF3 are the center frequencies of the first three spectral prominences in the auditory-spectral envelope 127 of FIG. 6. Sometimes, however, SF3 is interpreted as the upper edge of the spectral envelope when no clear peak P3 can be observed, such as when peaks P2 and P3 merge during a velar segment or is taken as being a fixed logarithmic distance over SR when P3 is absent. Spectral frequency SF1 generally corresponds to the center frequency of the first significant resonance of the vocal tract. However, during nasalization two peaks, or one broadened peak, appear near the first significant resonance, as in FIGS. 7 and 8 respectively. To take account of such spectral differences steps 131 and 143 of FIG. 4 are made sufficiently flexible to compute the sensory pointer position differently for nasalization spectra than for other spectra.

In another major class of spectra suggested by the envelope of FIG. 9, there is no major prominence in the area of peak P1 of FIG. 6. In other words, the latter two of the three prominences of FIG. 6 may occur without the first prominence in this class of spectra. Such spectra are associated with burst sounds and sustained friction sounds and are produced by a talker with supraglottal sources such as when the tongue meets or approximates the velum, palate, or teeth or at the teeth and lips, themselves. These spectra are referred to as burst-friction (BF) spectra herein. A BF spectrum is analyzed differently from a GS spectrum by CPU1 in order to produce the spectral frequency values SF1, SF2 and SF3 and sensory reference value SR, and the position of the resulting sensory pointer values computed in step 143 of FIG. 4 is generally in the $X_s$, $Z_s$ plane. These pointer values are regarded as defining the position of a pointer called the burst-friction sensory pointer (BFSP) which is distinct from the GSSP.

As the incoming speech is analyzed in step 131 of FIG. 4, the glottal-source GS value is set to 1 in the auditory state code whenever a glottal-source spectrum is above the auditory threshold. As the values of SR, SF1, SF2, and SF3 change, the GSSP is regarded as moving through a mathematical space, or auditory-perceptual space. The path of the GSSP is interrupted by silences and by burst-friction spectra. Then the GS value is set to zero and the BF value is set to 1 in the auditory state code. In such case, the GSSP is replaced by the BFSP. The GSSP can be regarded as moving through the mathematical space as the glottal-source spectrum changes shape and sometimes this movement is nearly continuous as in the case of the sentence, "Where were you a year ago?", where the only interruption would occur during the friction burst of "g" in "ago." In other words the quantity GS in the auditory state code can remain at a value of one (1) through many spectra in various examples of speech, but the quantity BF in the auditory state code when set to one is generally reset to zero very shortly thereafter, because spectra which are not of the burst-friction type occur so soon thereafter. In terms of the mathematical space, burst-friction sensory pointer BFSP will usually appear and disappear shortly thereafter as friction sounds are inserted in the speech stream. As burst-friction spectra are unstable, the BFSP may exhibit considerable jitter, and it usually will not move in any smooth, continuous way in the mathematical space.

Often the quantity BF in the auditory state code is 1 when the quantity GS is zero, and vice versa. However, in the case of voiced fricatives, both BF and GS are equal to one simultaneously. In terms of the mathematical space, both of the sensory pointers are simultaneously present as one is associated with the glottal-source spectrum of the voiced part of the voiced fricative speech sound and the other is associated with the burst-friction spectrum of the friction part of the sound.

CPU1 computes goodness values and loudness values in the auditory state code for the GS and BF spectra. The speech goodness is a measure of the degree to which the sound represented by the latest spectrum is like a sound of speech, and is regarded as the cross-correlation between an ideal spectrum for a given speech sound and the latest actual spectrum of that sound. Since calculation of the cross-correlation itself represents a significant computer burden, the goodness value is estimated in the preferred embodiment.

Figure 10:
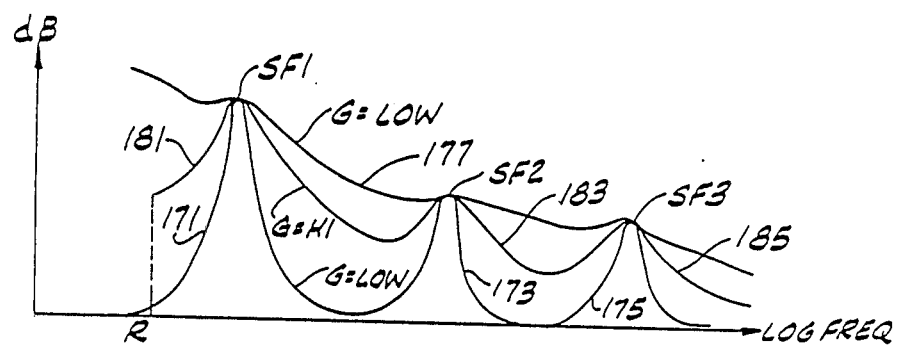
FIG. 10 is a diagram of three spectral envelopes in decibels versus log-frequency for showing how a quantity called speech depends on shapes of spectra.

As shown in FIG. 10, the speech goodness value is low when an actual spectrum consists of a few pure tones showing up as very narrow peaks 171, 173 and 175; and the goodness value is also low when the spectrum is very broadband with tiny bumps for peaks as in envelope 177. On the other hand, the goodness value is high for carefully produced natural speech of high fidelity, which has distinct moderately-wide prominences 181, 183 and 185 with distinct valleys between them.

The goodness value is estimated, for instance, by determining when the width of at least one of the peaks in the frequency spectrum, such as P2, is within a predetermined range. The width is illustratively defined as the difference of the nearest two frequencies higher and lower than the center frequency of the peak at which the DFT value in decibels is at least a predetermined number of decibels (e.g. 15 dB) below the maximum decibel level of the peak itself. When more than one peak is used in the calculation, an average or weighted average peak width is suitably determined.

Then as shown in FIG. 11, the goodness value is set to zero if the width is outside the range. The goodness value when the width is in range, is a triangular function 191 which peaks at unity for a best width value and illustratively declines linearly on either side of the best value to a value of 0.25 at a width of zero and to a value of zero at an upper limit of the range.

Figure 12:
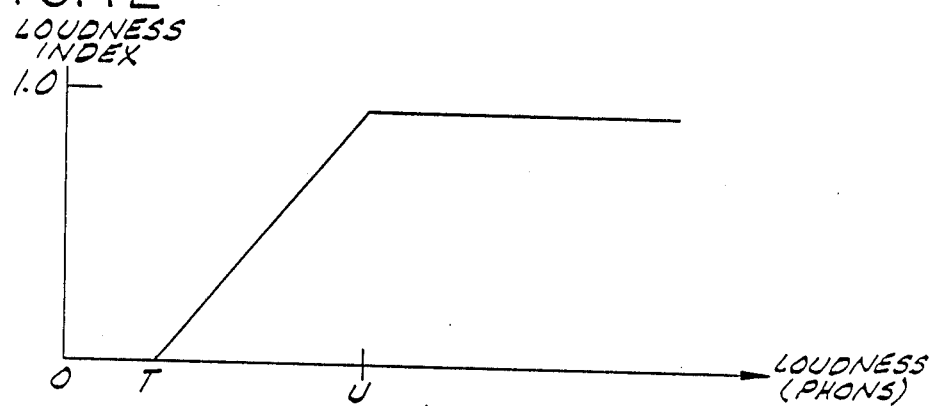
FIG. 12 is a graph of a quantity called speech loudness versus a decibel sum.

The loudness index is estimated from the sum of the decibel levels (or total power) of the lines of a spectrum within the width of at least one (and preferably all) of the prominences or peaks, wherein the width is defined as in the previous paragraph. As illustrated by the graph of FIG. 12, this decibel sum is then compared with a value T indicative of a hearing threshold, and if the sum is less than T, the loudness index L is zero. The decibel sum is compared with a value U indicative of adequate loudness as for everyday conversational speech, and if the sum exceeds U, the loudness index L is 1. Between the levels T and U the decibel sum is converted into loudness index L by the function $$L = (dB \text{ Sum} - T)/(U - T) \qquad (4)$$

The operations performed by CPU1 in analyzing each spectrum in step 131 of FIG. 4 are now described in sequence with reference to FIGS. 13A and 13B.

After a BEGIN 201, CPU1 in a step 203 finds the maximum value MAX, or highest peak, of the spectrum. This is illustratively accomplished by first setting to zero all spectral values which are less than a predetermined threshold decibel level, so that low sound levels, noise and periods of silence will not have apparent peaks. The nonzero values remaining, if any, are checked to find the highest value among them to find the value MAX.

Then in a step 205 a loudness L is computed as discussed above in connection with FIG. 12. Next, in a step 207 an appropriate preset value such as 15 db, or preferably 10 dB, is subtracted from the maximum value MAX to yield a reference level REF. In a following step 209 the level REF is subtracted from all of the M values in the DFT spectrum and all of the resulting negative values are set to zero to normalize the spectrum so that the reference line is zero dB and spectral values that fall below the reference are set to zero dB. The values in the spectrum at this point in operations are called normalized spectral values and are suggested in FIG. 6 by the portions of envelope 127 lying above the dashed horizontal line marked REF.

In a step 211 following step 209 the fundamental frequency is found by a pitch-extraction algorithm such as that of Scheffers, M.T.M. (1983). "Simulation of auditory analysis of pitch; An elaboration of the DWS pitch meter." J. Acoustic Soc. Am. 74, 1716-25. (see FIG. 6) and stored as a spectral frequency SF0, or pitch. Next the spectrum is analyzed in each of three frequency bands B1, B2 and B3, if the spectrum is a glottal-source spectrum, as suggested beneath FIG. 8; and otherwise analyzed in two frequency bands B2 and B3 with different numerical limits, as suggested beneath FIG. 9. These frequency bands are used as a way of discriminating the P1, P2 and P3 peaks and the frequency values selected to define each band are adjusted for best results with a variety of speaking voices.

In a decision step 213, CPU1 determines whether there are any positive normalized spectral values lying in the band B1 which is defined as 0 less than or equal to $\log_{10}(f/SR)$ less than or equal to 0.80, where SR is the spectral reference and f is frequency in Hertz. If there are no such positive normalized spectral values, it is concluded that the spectrum is a burst-friction spectrum (although this may also be a period of silence) and a branch is made to a step 215 where quantity BF is set to 1 in the auditory state code and the spectral higher and lower frequency values SF1L and SF1H are both set equal to SR. The burst-friction loudness index LIBF is set equal to the loudness L computed in step 205. (During silence the loudness is zero, and there is no harm in subsequent operations in having BF equal 1.) The frequency band B2 is established as 0.6 less than or equal to $\log_{10}(f/SR)$ less than or equal to 1.45, and frequency band B3 is established as 1.0 less than or equal to $\log_{10}(f/SR)$ less than or equal to 1.65.

On the other hand, if in step 213 there is any positive normalized spectral value in band B1 then operations proceed to a step 217 in which CPU1 scans the normalized spectral values in order of increasing address values corresponding to frequency multiplier K until the first normalized spectral value is found which is succeeded by a lower normalized spectral value at the next higher value of K. That first modified spectral value is regarded as the lowest-frequency peak in frequency band B1 and the spectral frequency values SF1 and SF1L are set equal to the K value representing the frequency of this peak.

Next in step 217 the spectrum is checked for the presence of a "voice bar" which is a condition of the lowest frequency peak being extremely prominent (e.g., 30 dB or more above any higher frequency peaks). A voice bar, or "murmur", is a periodic sound that occurs with the oral vocal tract stopped and usually with the nasal tract stopped. In a voice bar vocal folds are vibrated by moving air which either cannot escape and puffs the checks or which does escape through the nose. It is observed that voice bars that are associated with the voice stop consonants b, d, and g for example have the characteristic prominence. In step 217 the spectrum is analyzed to detect any peak 30 dB or more above any higher frequency peaks. (An alternative test is to detect a tilt value in step 123 of FIG. 4 which is in excess of a preset value.)

Figure 13C:
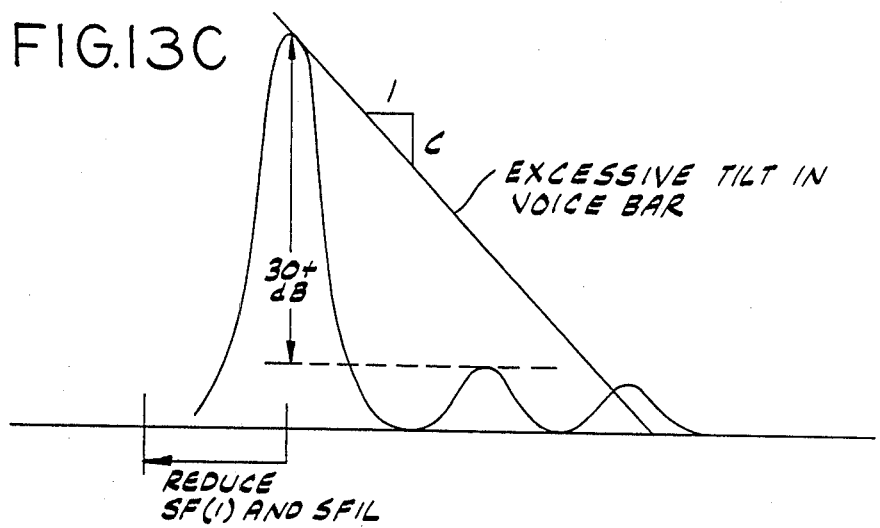
FIG. 13C is a diagram of a spectral envelope in decibels versus log-frequency representing a "voice bar" for showing a method of determining a "first sensory formant" value SF(1)

If a voice bar is detected, then the frequency of the first formant values SF(1) and SF1L are both set equal to a value that makes $Y_s = 0.025$. Since $Y_s = -\log(SF1L/SR)$, then SF(1) and SF1L are both set equal to $SR \times EXP(0.025)$, where SR is the sensory reference or spectral reference discussed elsewhere herein, and EXP denotes the exponential function. This operation generally corresponds to a reduction in frequency imputed to the first formant, as illustrated in FIG. 13C. In this way processor unit CPU1 acts as an example of a means for detecting an occurrence of a lowest frequency peak which lies in a defined frequency band indicative of a first formant peak wherein the peak substantially exceeds any other peak in its spectrum in intensity by a predetermined amount, and upon detection such an occurrence storing a lower frequency value than that of the detected peak as if it were the actual frequency value of the peak in the spectrum. CPU1 subsequently electrically derives from the lower frequency value and from the sets of digital values over time a series of coordinate values representing positions of points on a path in a mathematical space which path positions represent the speech.

Also in step 217 the glottal-source quantity GS is set to one in the auditory state code. The glottal-source loudness index LIGS is set equal to the loudness L computed in step 205. The frequency band B2 is established as 0.6 less than or equal to $\log_{10}(f/SR)$ less than or equal to 1.18, and frequency band B3 is established as 1.0 less than or equal to $\log_{10}(f/SR)$ less than or equal to 1.40.

Following step 217 a decision step 219 determines whether there is a second peak at a higher frequency than SF1L in frequency band B1. If so, operations branch to a step 221 where nasality NS is set to one in the auditory state code, and proceed to a step 223 where the frequency of the second peak is determined and stored at a location SF1H. For purposes of the nasality operations, the value SF(1) is set equal in a step 224 to the geometric mean of SF1L and SF1H in Hertz, i.e. to the square root of the product of SF1L and SF1H, which is equivalent to the arithmetic average of their values of log-frequency.

If in decision step 219 no second peak is found in band B1, operations proceed to another decision step 225 where the width of the peak is compared with a predetermined width W1 (such as 300 Hz. at 10 db down) to determine whether the peak is wider than a typical GS peak would be without nasality. If the predetermined width is exceeded, a branch is made to a step 227 where nasality NS is set to one. Also in step 227 the edges of the nasally broadened P1 peak are defined by setting the lower frequency SF1L to SF0 and the higher frequency SF1H to the frequency at the upper edge of the P1 peak where a normalized spectral value again is zero, whence step 224 is reached. If the predetermined width W1 is not exceeded in step 225, however, operations proceed to a step 229 where the value SF1H is set equal to SF1L because there is only P1 peak and no nasality.

Operations of CPU1 proceed from any of the steps 215, 224 or 229 in FIG. 13A through a point X to a decision step 231 of FIG. 13B. In step 231 CPU1 tests the normalized spectral values to determine whether there is a peak P2 in band B2 above the peak having value SF1H. Band B2 is already established to correspond with the BF or GS nature of the spectrum. The testing begins above value SF1H if SF1H lies in band B2, to avoid confusing the peak sought with a peak found earlier. If a peak P2 exists, then operations proceed to a step 233 where second spectral frequency value SF2 is set to the frequency K value of the first peak above frequency SF1H in band B2, and a decision step 237 is reached. If there is no peak found in step 231, operations branch from step 231 to a decision step 238 where the value of SF1H is tested to determine whether it is in the band B2. If not, operations branch to a step 239 where the value SF2 is set equal to SF1H and SF1H is not affected, whence operations reach step 237. If in decision step 238, the value of SF1H is in band B2 then operations proceed to a step 240 where the value SF2 is set equal to SF1H. Also, in step 240 SF1H is set equal to value SF1L and the nasality NS is reset to zero because nasality is not regarded as being present after all. Operations then pass from step 240 to step 237.

In this way, means are provided for deriving a set of digital values representative of a frequency spectrum of the speech from the samples in digital form, for selectively storing in distinct locations in the memory the values of frequency of one or more frequency peaks in the spectrum wherein a selected one or more of the distinct memory locations in which the frequency value of a given peak is stored depends on whether the peak lies in a first predetermined band of frequencies and on whether or not any other peak lies both in the first band and a second band overlapping the first band, and for generating a set of digital values corresponding to coordinate values in a mathematical space depending both on the stored values of frequency and on the distinct locations of the stored values of frequency.

In addition, means are thus provided for selecting values of end frequencies for both the second band and a third band overlapping the second band, the selected values depending on whether or not a peak exists in the first predetermined band of frequencies. Moreover, means are in this way provided for selecting values of end frequencies for both the second band and a third higher band overlapping the second band and for determining whether or not one of the peaks is the only peak in the third band and lies in both the second and third bands, and if so, storing in one of the distinct locations another frequency value corresponding to an upper frequency edge of the one peak. In another aspect means are thus provided for for determining whether or not one of the peaks lies in a third band which is generally higher in frequency than the second band and overlaps it, and if none of the peaks lies in the third band, storing another frequency value in one of the distinct locations, the other frequency value lying in the third band and being a function of a reference frequency value determined from at least two of the spectra.

Also, means are thus provided for storing as a lower first frequency the value of frequency of any lowest frequency peak in the first predetermined band of frequencies and as a higher first frequency the value of frequency of any next higher frequency peak in the first band, and for storing as a second frequency the value of frequency of any peak in the second band higher in frequency than the higher first frequency if the higher first frequency is also in the second band, and if there is no peak in the second band higher in frequency than the higher first frequency when it is in the second band then storing as the second frequency the value of frequency originally stored as the higher first frequency and storing as the higher first frequency the value of frequency stored as the lower first frequency also. Also provided thus is means for identifying lower and higher first frequencies descriptive of a peak which is widened or split upon at least one occurrence of nasality and for producing a signal indicative of the occurrence of nasality.

In step 237, CPU1 tests the normalized spectral values over increasing frequency K values to determine whether there is a peak P3 above any peak having value SF2 in band B3. Band B3 is already established to correspond with the BF or GS nature of the spectrum. The testing begins above value SF2 if SF2 lies in band B3, to avoid confusing the peak sought with any peak P2 found earlier. If a peak P3 is found, then operations proceed to a step 241 where third spectral frequency value SF3 is set to the frequency K value of the first peak above frequency SF2 in band B3. Next in a step 243, the speech goodness from step 235 is calculated based on a weighted average of the width of both peaks P2 and P3 using the function of FIG. 11 in the manner described hereinabove, and a calculation step 245 for SR is reached.

If there is no P3 peak found in step 237, operations branch to a step 247 where spectral frequency SF2 is tested to determine if it is in band B3. If so, operations proceed to a step 249 where SF3 is set at the upper edge of the spectral envelope, whence step 243 is reached. If SF2 is not in band B3, operations branch to a step 251 where value SF3 is set to a value equal to reference SR multiplied by ten-to-the-1.18-power, whence step 243 is reached.

In step 245 the spectral reference value SR is illustratively set equal to the frequency of the first non-zero spectral value SF0 determined in step 211 if the spectrum is a GS spectrum and SF0 is greater than zero. A more sophisticated alternative calculation of value SR for step 245 is described in more detail later herein with reference to FIG. 14. After step 245 operations proceed to a RETURN 257.

Figure 14:
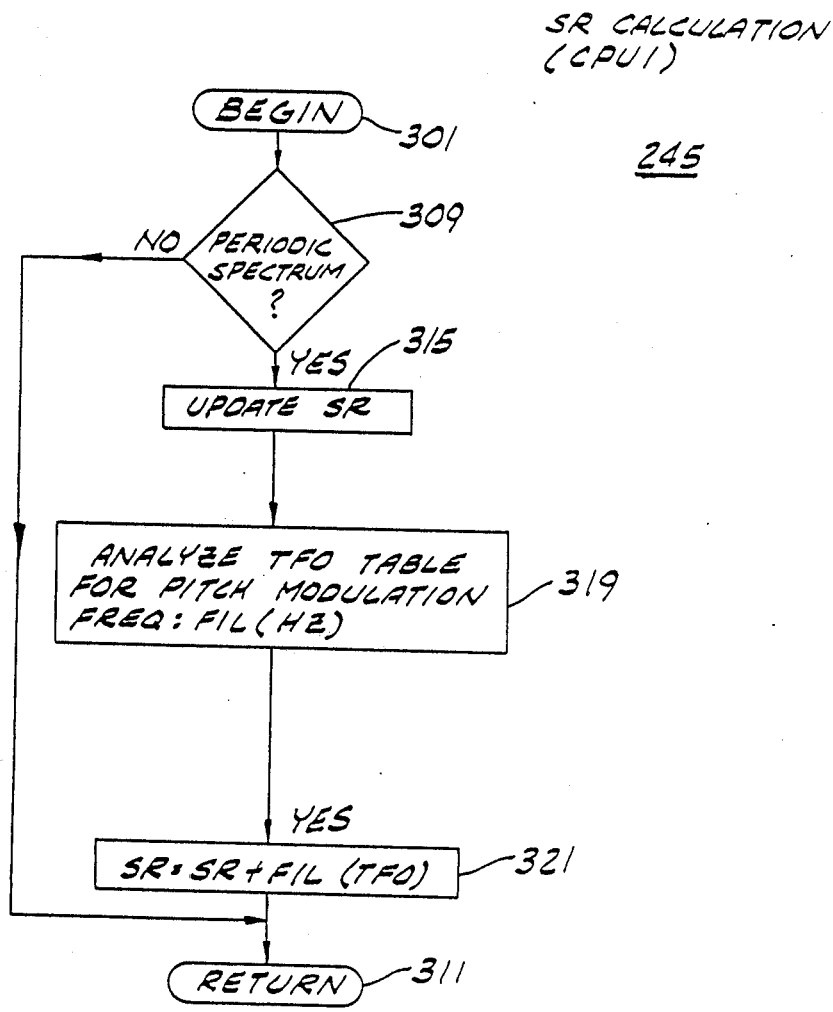
FIG. 14 is a diagram of operations according to a method for generating a spectral reference value SR.

In FIG. 14, CPU1 automatically computes spectral reference value SR (step 245 of FIG. 13B). The value SR is so defined that it is influenced by the geometric means of SF0 across the adult population (approximately 168 Hertz), by the geometric means of the pitch of the current talker, and by modulations in pitch of current talker filtered so as to eliminate the slow pitch changes such as those associated with pitch declination and so as to eliminate the very rapid transients at voice onset and offset. Specifically, $$SR = (K1)(GMTF0/K1)^a + FIL(SF0_i) \tag{5}$$

where K1 is a constant of about 168, GMTF0 is the geometric mean of the current talker's pitch, a is a constant equal to about $\frac{1}{3}$, and FIL(SF0$_i$) is the instantaneous value of the filtered modulations in the talker's SF0 for GS spectra. These parameters are chosen so as to make the average value of $Y_s = \log_{10}(SF1L/SR)$ constant across talkers, thus eliminating differences between talkers and so as to allow those SF0 modulations, which are believed to have phonetic significance, to influence the position of the sensory pointer. Only pitch modulations between about 1.5 Hertz and 50 Hertz are passed by a software bandpass filter. More exactly, values for the filter band are selected so that slow variations of the pitch declination and the very rapid variations at pitch onset and termination are advantageously eliminated.

In FIG. 14 operation commences with BEGIN 301 and proceeds to a decision step 309 in which the spectrum is tested to determine whether it includes a periodic component. This test is performed according to any appropriate procedure such as the spectral analysis disclosed in L. J. Siegel et al. Voiced/ unvoiced/mixed excitation classification of speech, *IEEE Trans. Acoust. Speech Signal Processing*, 1982, ASSP-30, pp. 451-460. If there is not a component that is periodic, then operations proceed to a RETURN 311 directly from step 309. If GS is 1, then in a step 315 a recalculation of the value of SR commences according to the formulas $$GMTF0 = EXP((\ln SF0 + N2 \ln GMTF0)/(N2+1)) \tag{6A}$$

$$SR = 168(GMTF0/168)^{\frac{1}{3}} \tag{6B}$$

(EXP is the exponential function $e^x$, and ln is the natural logarithm function.) In words, the GMTF0 is based on the last N2 values of SF0 and gradually adapts from its initialized value of 168 Hertz to the talker's pitch. Then the reference value SR (unadjusted as yet for pitch modulation) is calculated by the empirical formula (6B) from the updated geometric mean GMTF0. Operations proceed from step 315 to a step 319.

In step 319 the software bandpass filter for pitch modulation is illustratively implemented by maintaining a table of the values SF0 of periodic spectra of glottal-source type. This table is analyzed for any discernible pitch modulation in the frequency range between 1.5 Hertz and 50 Hz. Then a value FIL which is originally initialized to zero is updated with the size of the pitch modulation determined from the output of the pitch modulation software filter. Each pass through the operations of FIG. 4 accesses step 245 so the table has an entry added regularly when a glottal-source speech sound is in progress.

After step 319, the value of SR is increased in a step 321 by the value of FIL, whence RETURN 311 is reached.

In this way CPU1 constitutes means for computing at least one of the values in the sets of first-named coordinate values (e.g. sensory pointer values) as a function of a reference frequency value which is a function of frequency values (e.g. values of SF0) determined from at least two of the spectra. CPU1 also constitutes means for computing at least one of the values in the sets of first-named coordinate values as a function of a reference frequency value which is a function of a geometric mean of frequency values determined from at least some glottal-source spectra over time. CPU1 additionally constitutes means for computing at least one of the values in the sets of first-named coordinate values as a function of a reference frequency which is a function of (A) a frequency of pitch modulation of the speech and (B) a mean of frequency values determined from at least some of the spectra of the speech over time.

Depending on the hardware used to implement CPU1, one or more processors are needed to accomplish the operations described for CPU1. Where a single processor is fast enough to accomplish the operations, it is contemplated that the block of FIG. 1 marked CPU1 represents a single processor. When the skilled worker uses a slower type of processor, then it is contemplated that several such processors are used in a multiprocessing arrangement to compute several spectra at the same time and then to analyze the spectra so obtained in order to accomplish real time analysis of the speech waveform. In such an arrangement, several microprocessors are multiplexed to line 23 from ADC 21 of FIG. 1 so that they take turns inputting the latest set of N1 samples in overlapping manner, for instance. With a number P of microprocessors, each microprocessor need only input and compute the spectrum of every Pth set of N1 samples. Then the spectra can be supplied to one or more additional processors to analyze and output the auditory state code and the sensory pointer values $X_s$, $Y_s$ and $Z_s$.

Figure 15:
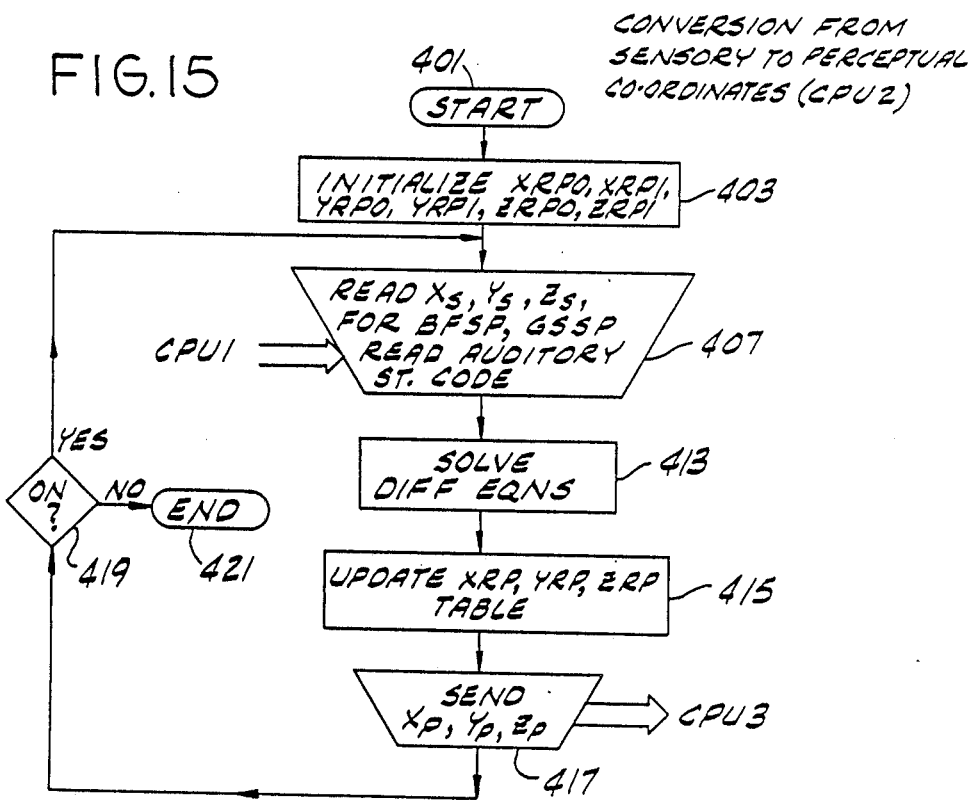
FIG. 15 is a diagram of operations according to a method in a unit CPU2 of FIG. 1 for converting from sensory pointer coordinate values to coordinate values on a path having perceptual significance.

In FIG. 15, the flow of operations in CPU2 for converting from sensory to perceptual coordinates is detailed. In this process a vector difference equation, or set of three difference equations for the coordinates respectively, is solved by CPU2 point by point by executing a loop continually. The difference equations are the numerical versions of three differential equations discussed hereinbelow.

Figure 16:
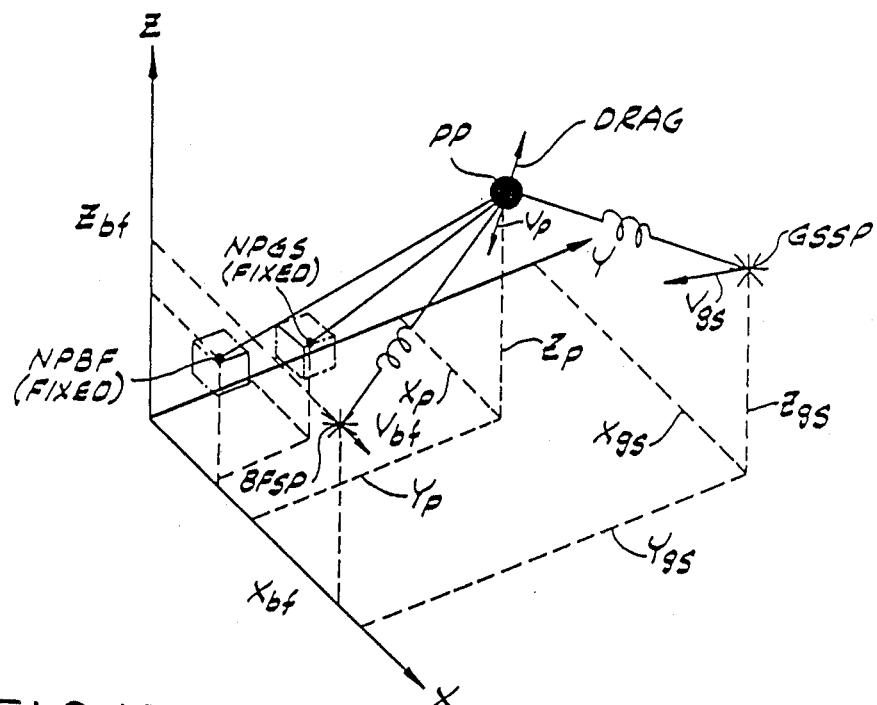
FIG. 16 shows an illustration of a mathematical model for converting from sensory pointer coordinates to coordinates $X_p$, $Y_p$ and $Z_p$ of a perceptual pointer in a three dimensional mathematical space.

Solving the difference equations is regarded as a sensory-perceptual transformation, or transformation from sensory coordinates to perceptual coordinates as an integrative-predictive function. The fundamental concept of the sensory-perceptual transformation is that sensory pointers GSSP and BFSP as illustrated in FIG. 16 attract a perceptual pointer PP in the three dimensional mathematical space, or auditory-perceptual space having a coordinate system defined by three mutually perpendicular axes X, Y and Z, and induce the perceptual pointer to move through the auditory-perceptual space and trace out a perceptual path. Perceptual pointer PP has coordinate values $X_p$, $Y_p$ and $Z_p$. The perceptual pointer PP almost instantaneously, that is within a few milliseconds, takes on the summed loudnesses of the sensory pointers GSSP and BFSP. However, when the sensory pointers disappear, the loudness of the perceptual pointer decays slowly over a period of 100 to 200 milliseconds. In this way the perceptual response is maintained during brief silences in the acoustic input.

The perceptual pointer, like the sensory pointer, is regarded as having at any moment an auditory state, for which a perceptual auditory state code is computed. The auditory state code of the perceptual pointer matches that of the sensory pointer, except that a certain amount of time is required for state switching. For example, if both the sensory pointer and perceptual pointer are in the frication state (BF) and the sensory pointer suddenly switches to the voiced, nonnasal state (GS=1, NS=0), then a period of time is required before the perceptual pointer switches to the new state.

Also, fixed pointers called neutral points NPGS and NPBF affect the motion of the perceptual pointer PP in the absence of the sensory pointers. The use of at least one neutral point advantageously provides a home location for the perceptual pointer when a lengthy period of silence occurs. During such a period of silence, an attractive force from the neutral point NPGS causes the perceptual pointer PP to migrate toward it. Moreover, the use of at least one neutral point also remarkably allows the system to interpret even periods of silence in phonetically relevant ways in a manner similar to human speech perception. (For instance, many listeners hear "split" when a talker says "s" followed by brief silence followed by "lit.")

In FIG. 16 the neutral point NPGS attracts the perceptual pointer immediately upon GS changing from one to zero in the auditory state code if BF is already zero. The attraction by NPGS lasts as long as the period of silence does, and the neutral point NPBF does not attract pointer PP at all. On the other hand, if GS is already zero and BF in the auditory state code is one and changes to zero, then the neutral point NPBF attracts the perceptual pointer immediately upon BF changing from one to zero. The attraction by NPBF lasts about 120 milliseconds and is replaced upon the expiration of the 120 milliseconds by an attraction from the neutral point NPGS which lasts for the remainder of the period of silence until either GS or BF become one again.

The sensory pointers GSSP and BFSP are conceived as being attached by springs to the perceptual pointer PP which is regarded as having mass and inertia. The stiffness of a spring depends on the goodness value and the loudness value of its associated sensory pointer. In this way, near-threshold spectra with little resemblance to speech have almost no influence on the perceptual response while moderately loud speech-like spectra have a strong influence on the perceptual response. The analogy to a spring is used because the attractive force of a sensory pointer or neutral point increases with the distance from the perceptual pointer PP. Unlike a physical system, however, the position of any sensory pointer or neutral point is not influenced by the spring, and all of the force acts on the perceptual pointer PP. In addition, the auditory-perceptual space is regarded as being a viscous medium and the perceptual pointer encounters resistance which not only varies with velocity but varies with the location of the perceptual pointer in a remarkable way in some embodiments. It is emphasized that the particular mathematical model of the sensory-perceptual transformation is illustrative and can be modified in the practice of the invention by the skilled worker as additional experimental information about the process of auditory perception is obtained.

The foregoing concepts are expressed in mathematical form by the difference equations which are solved by CPU2 to accomplish the sensory-perceptual transformation. In a further aspect, the difference equations are expressed in terms of variables which are coordinate values exponentiated. Since the sensory pointers of FIG. 16 have coordinates which are expressed in terms of logarithmic functions of frequency ratios in step 143 of FIG. 4, the mathematical space of FIG. 16 is called a "log space" herein. Because the coordinates are exponentiated in a first set of the difference equations, only the frequency ratios remain and the expression "ratio space" is adopted herein to refer to the domain in which the difference equations are expressed. It is contemplated that in some embodiments, no logarithms are calculated in step 143 of FIG. 4 to avoid subsequently exponentiating in CPU2 to recover the ratios themselves. Subsequent analysis by CPU3 occurs in log space, however. (In still other embodiments, as discussed later herein, the difference equations themselves are expressed in log space.)

The following chart states the nomenclature for the variables in ratio space and log space:

| Equations For Conversion To Ratio Space From Log Space | | |
|---|---|---|
| Ratio Space | Log Space | Remarks |
| Perceptual Pointer Coordinates: | | |
| $XRP = 10^{X_p}$ | $X_p$ | $X_p = \log(PF3/PF2)$ |
| $YRP = 10^{Y_p}$ | $Y_p$ | $Y_p = \log(PF1L/PR)$ |
| $ZRP = 10^{Z_p}$ | $Z_p$ | $Z_p = \log(PF2/PF1H)$ |

(Where applicable numeral suffixes of 0, 1, or 2 are appended to XRP, YRP, ZRP, $X_p$, $Y_p$ and $Z_p$ to denote values for the same variable at different times.)

| Burst-Friction Sensory Pointer BFSP Coordinates: | | |
|---|---|---|
| $XRSBF = 10^{X_{sBF}}$ | $X_{sBF}$ | $X_{sBF} = \log(SF3/SF2)$ |
| $YRSBF = 10^{Y_{sBF}}$ | $Y_{sBF}$ | $Y_{sBF} = \log(SR/SR) = 0$ |
| $ZRSBF = 10^{Z_{sBF}}$ | $Z_{sBF}$ | $Z_{sBF} = \log(SF2/SR)$ |
| Glottal-Source Sensory Pointer GSSP Coordinates: | | |
| $XRSGS = 10^{X_{sGS}}$ | $X_{sGS}$ | $X_{sGS} = \log(SF3/SF2)$ |
| $YRSGS = 10^{Y_{sGS}}$ | $Y_{sGS}$ | $Y_{sGS} = \log(SF1L/SR)$ |
| $ZRSGS = 10^{Z_{sGS}}$ | $Z_{sGS}$ | $Z_{sGS} = \log(SF2/SF1H)$ |
| Burst-Friction Neutral Point (NPBF) Coordinates: | | |
| $XRNBF = 10^{X_{NBF}}$ | $X_{NBF}$ | $X_{NBF} = 0.47$ |
| $YRNBF = 10^{Y_{NBF}}$ | $Y_{NBF}$ | $Y_{NBF} = -0.10$ |
| $ZRNBF = 10^{Z_{NBF}}$ | $Z_{NBF}$ | $Z_{NBF} = 0.82$ |
| Glottal-Source Neutral Point (GSSP) Coordinates: | | |
| $XRNGS = 10^{X_{NGS}}$ | $X_{NGS}$ | $X_{NGS} = 0.2818$ |
| $YRNGS = 10^{Y_{NGS}}$ | $Y_{NGS}$ | $Y_{NGS} = 0.5686$ |
| $ZRNGS = 10^{Z_{NGS}}$ | $Z_{NGS}$ | $Z_{NGS} = 0.5355$ |

CPU1 and CPU2 together electrically derive a series of coordinate values of points on a path in the mathematical space from frequency spectra of the speech occurring in successive time intervals respectively.

Figure 15A:
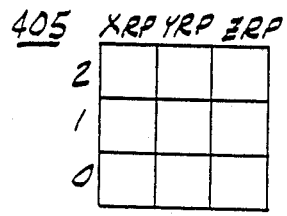
FIG. 15A is a diagram of a table for use by CPU2 in the operations of FIG. 15.

In FIG. 15 the operations of CPU2 commence with a START 401 and proceed to a step 403 to initialize a table 405 of FIG. 15A with two triplets of initial values XRP0, YRP0, ZRP0, XRP1, YRP1, ZRP1, for the set of coordinates XRP, YRP, ZRP in ratio space. In table 405, row zero (suffix zero on the variables) is regarded as earliest in time, row one as next in time, and row 2 as latest in time and to be solved for. The initial position coordinates are in row zero and are 10 raised to the power of the respective coordinates $X_{NGS}$, $Y_{NGS}$, $Z_{NGS}$ of the neutral pointer NPGS. The initial velocity is assumed to be zero in both ratio space and log space so all the entries in row one are the same as in row zero, because there is no change in position initially.

Next in a step 407, CPU2 reads the sensory pointer values $X_s$, $Y_s$ and $Z_s$ for either the BF sensory pointer or the GS sensory pointer or both, and the auditory state code values BF, GS, LIBF, LIGS, GBF, GGS and NS from CPU1. Then a computation step 413 occurs in which the difference equations involving the sensory pointer values in ratio space are solved to obtain the next in a series of coordinate values $X_p$, $Y_p$ and $Z_p$ on a path in the mathematical space. More specifically, the difference equations are solved for the entries for row 2 of table 405, and subsequently the logs of the entries in row 2 are computed in order to obtain perceptual pointer coordinates $X_p$, $Y_p$ and $Z_p$ in log space. The perceptual pointer coordinates $X_p$, $Y_p$ and $Z_p$ are regarded as tracing out a path in the mathematical log space of FIG. 16 which path has a perceptual significance.

The difference equations solved in step 413 are now described.

Let a differential equation for each ratio space component of the position vector (XRP, YRP, ZRP) of pointer PP be first written as a force summation-to-zero of the pointer mass m times its acceleration (second derivative of ratio space position) plus the viscous drag as a function of velocity (first derivative of ratio space position) plus forces due to the sensory pointer(s) and neutral point(s) acting through springs.

Solving the difference equations numerically by CPU2 utilizes values of the coordinates XRP, YRP and ZRP from the two next-previous time intervals represented by rows zero and one of table 405, as well as quantities from the auditory state code and the sensory pointer coordinates in ratio space. Row two (2) of the table of FIG. 15A represents the unknown latest coordinate values on the path of the perceptual pointer in the ratio space which are to be obtained by solving the difference equations. Row one (1) of table 405 in general represents the next-previous coordinate values of the perceptual pointer which were found in the next previous pass through the computation loop of FIG. 15 by CPU2. Row zero (0) of the table generally represents the second-next-previous coordinate values of the perceptual pointer which were found in the second-next-previous pass through the computation loop of FIG. 15 by CPU2.

The derivative of XRP is approximated by $$dXRP/dt = H(XRP2 - XRP1) \quad (7)$$

where H is the reciprocal of the time interval between spectra, e.g. 1/(1 millisecond) or 1000 Hertz. XRP2 is the latest X-coordinate value in ratio space to be solved for, and XRP1 is the next previous such X-coordinate value. These coordinate values are derived by CPU1 from spectra that are generated periodically so the factor H is included in the Equation (7).

The second derivative of $X_p$ is approximated by $$d^2XRP/dt^2 = H^2(XRP2 - 2XRP1 + XRP0) \quad (8)$$

The quantity H is the same as in Equation (7). XRP2 (table 405, row 2, column XRP) is the latest X coordinate value to be solved for and XRP1 is the next previous X coordinate value (table 405, row 1, column XRP). XRP0 is the second-next-previous X coordinate value (row 0, column XRP). The factor H-square occurs in Equation (8) because the second derivative is the derivative of the first derivative.

Based on the foregoing conceptual description and using the relationships of Equations (7) and (8), a set of difference equations to be solved by CPU2 is as follows:

Equation (9A)
$$0 = H^2(XRP2 - 2XRP1 + XRP0)$$
$$+ rH(XRP2 - XRP1)/B^{ABS(XRP2 - XRNGS)}$$
$$+ LIGS \times GGS \times KGS(XRP2 - XRSGS)$$
$$+ LIBF \times GBF \times KBF(XRP2 - XRSBF)$$
$$+ NF \times ((1-GS) \times (1-BF)) \times KNGS \times (XRP2 - XRNGS)^{-1}$$
$$+ (1-NF)(1-GS)(1-BF) \times KNBF \times (XRP2 - XRNBF)^{-1}$$

Equation (9B)
$$0 = H^2(YRP2 - 2YRP1 + YRP0)$$
$$+ rH(YRP2 - YRP1)/B^{ABS(YRP2 - YRNGS)}$$
$$+ LIGS \times GGS \times KGS(YRP2 - YRSGS)$$
$$+ LIBF \times GBF \times KBF(YRP2 - YRSBF)$$
$$+ NF \times ((1-GS) \times (1-BF)) \times KNGS \times (YRP2 - YRNGS)^{-1}$$
$$+ (1-NF)(1-GS)(1-BF) \times KNBF \times (YRP2 - YRNBF)^{-1}$$

Equation (9C)
$$0 = H^2(ZRP2 - 2ZRP1 + ZRP0)$$
$$+ rH(ZRP2 - ZRP1)/B^{ABS(ZRP2 - ZRNGS)}$$
$$+ LIGS \times GGS \times KGS(ZRP2 - ZRSGS)$$
$$+ LIBF \times GBF \times KBF(ZRP2 - ZRSBF)$$
$$+ NF \times ((1-GS) \times (1-BF)) \times KNGS \times (ZRP2 - ZRNGS)^{-1}$$
$$+ (1-NF)(1-GS)(1-BF) \times KNBF \times (ZRP2 - ZRNBF)^{-1}$$

CPU2 is programmed to perform an interative or other suitable computation mentioned to solve each of the three equations 9A, 9B and 9C for the latest coordinate values XRP2, YRP2 and ZRP2 of the perceptual pointer PP in the mathematical space. The absolute value function is represented by ABS. Coordinate values XRP1, YRP1, ZRP1 and XRP0, YRP0, ZRP0 are previously calculated from the equations 9A, 9B and 9C and are available in the table 405 of FIG. 15A. Values of constants are illustratively set forth as follows:

| Constant | Value |
| --- | --- |
| r | 414.7 |
| H | 1000 |
| KGS | 119,422 |
| KBF | 238,844 |
| KNGS | 12,000 |
| KNBF | 12,000 |
| A | 1 |
| B | 1.002 |

The viscous drag term is typified by the term $rH(YRP2-YRP1)/B^{ABS(YRP2-YRNGS)}$ in Equation 9B, which amounts to velocity times $r/B^{ABS(YRP2-YRNGS)}$. B is a base for the exponentiation, and the viscous drag factor is about equal to constant r near the neutral point NPGS (which has a Y coordinate of YRNGS in ratio space) because the exponent for B is about zero. The value of B is selected so that when the perceptual pointer PP moves over to the plane Y=0 in log space, then the viscous drag factor falls somewhat, e.g., to roughly half of constant r. When YRP2 is $10^0 = 1$, the denominator is $_B$ABS($1-10^{YNGS}$) or very roughly B². In another embodiment the argument for the exponent is the distance (or sum of squares) along a straight line in either ratio space or log space connecting NPGS with the latest position of the perceptual pointer.

The variables LIGS, GGS, GS, LIBF, GBF, and BF are in the auditory state code supplied by CPU1. These variables activate or deactivate (state switch) appropriate terms in Equations 9A, 9B and 9C depending on which sensory pointer(s) or neutral point is exerting an attraction on perceptual pointer PP. Then since the burst-friction flag BF and glottal-source flag GS are each either 0 or 1 and the loudness and goodness are zero during silence, the appropriate terms of the equations 9A, 9B and 9C figure in the solution computations or are advantageously neglected as circumstances require.

A neutral flag NF is included in the neutral point terms (the last two terms in each of the difference equations). Neutral flag NF is controlled by a timer in CPU2 which monitors the states of BF and GS in the auditory state code. If either BF or GS is 1, flag NF is 0. If BF is zero and GS makes a transition from 1 to zero, flag NF becomes 1 until either GS or BF becomes 1. If BF is 1 and GS is 0, and then BF makes a transition from 1 to zero as detected by step 407, then a 120 millisecond timer in CPU2 is activated to keep flag NF zero until the 120 milliseconds expires, whence flag NF is set to 1. In this way, the last term (for neutral point NPBF) in each difference equation is activated for 120 milliseconds and then is replaced by the second to last term (for neutral point NPGS) in each difference equation. Each term for a sensory pointer or neutral point is regarded as providing a contribution to the position of the perceptual pointer PP.

In this way means are provided for deriving sets of digital values representative of frequency spectra of the speech from the samples in digital form, for generating one of a plurality of auditory state codes for each of the sets of digital values and supplying at least two sets of coordinate values in a mathematical space, and for computing a series of other coordinate values of points defining a path with selected contributions from one or more of the sets of first-named coordinate values depending on which auditory state code is generated.

CPU1 is also advantageously programmed to perform operations to compute different loudnesses and goodnesses specific to the glottal-source and burst-friction portions of the same spectrum of a voiced fricative or other speech sound, which values LIBF, LIGS, GGS and GBF are transmitted from CPU1 to CPU2, and two sets of sensory pointer values $X_{sGS}$, $Y_{sGS}$, $Z_{sGS}$, $X_{sBF}$, $Y_{sBF}$ and $Z_{sBF}$ are sent for the glottal-source pointer GSSP and the burst-friction pointer BFSP, instead of one triplet $X_s$, $Y_s$ and $Z_s$. In this way means are provided for producing a first of the two sets of first-named coordinate values from one of the sets of digital values representing spectra when the auditory state code indicates a glottal-source auditory state and for also producing the second of the two sets of first-named coordinate values from the same one set of digital values when the auditory state code simultaneously indicates a burst-friction auditory state.

The use of at least one neutral point as well as at least one sensory pointer in CPU2 provides means for producing a first of two sets of first-named coordinate values from the sets of digital values representing spectra and wherein the second set (e.g. neutral point values) of the first-named coordinate values is independent of the sets of digital values representing spectra.

In Equations 9A, 9B and 9C, the value A is an exponent, illustratively 0, indicating that a neutral point attracts the perceptual pointer PP with a force that does not vary with distance. The value of A is made positive if experimental observations suggest that the force should increase with distance, or A is made negative if the force should decrease with distance. It was earlier believed that the best value of A was zero but more recent work indicates that the neutral points should act with spring-like forces for which A is unity (one).

For purposes of description, the equations 9A, 9B and 9C are collectively regarded as expressing one vector difference equation for the vector position of the perceptual pointer PP. Advantageously, all sensory inputs to microphone 11 of FIG. 1, including bursts, transitions, steady-states, and silences are all integrated into a single perceptual response by the sensory-perceptual transformation. In a further advantage, the perceptual pointer PP position depends not only on the position of the sensory pointers but also their dynamics. When the equations correspond to an underdamped system, a sensory pointer may rapidly approach and veer away from a target location, and yet it induces the perceptual pointer to overshoot and reach that desired location in the mathematical space. Operations by CPU2 in solving the difference equations are advantageously arranged to be analogous to such overshooting behavior, particularly in the cases of stop consonants and very rapid speech.

In step 415 of FIG. 15, the latest values XRP2, YRP2, ZRP2 resulting from solution of Equations 9A, 9B and 9C are stored in row 2 of table 405 of FIG. 15A. Then in a step 417 common logarithms of these latest values are sent as $X_p$, $Y_p$, $Z_p$ to CPU3. Operations proceed to a decision step 419 to determine if CPU2 is to remain ON. If ON, then a loop is made back to step 407. A new set of sensory pointer coordinates and auditory state code information is received in step 407. Table 405 is maintained in a cyclic manner to prepare for the next pass through the computation step 413, so that in table 405 the values in row 2 become the first-previous values and the values in row 1 become the second-next-previous values for purposes of XRP1, YRP1, ZRP1 and XRP0, YRP0, ZRP0 respectively. Equations 9A, 9B and 9C are solved again in step 413 and operations continue in the loop of FIG. 15 until CPU2 is not ON at decision step 419 whence operations terminate at an END 421.

In an alternative embodiment, the difference equations are solved in log space and are given as:

Equation (9A')

$$0 = H^2(X_{p2} - 2X_{p1} + X_{p0})$$
$$+ rH(X_{p2} - X_{p1})$$
$$+ LIGSxGGSxKGS(X_{p2} - X_{sGS})$$
$$+ LIBFxGBFxKBF(X_{p2} - X_{sBF})$$
$$+ NFx((1 - GS)x(1 - BF))xKNGS(X_{p2} - X_{NGS})$$
$$+ (1 - NF)(1 - GS)(1 - BF)xKNBF(X_{p2} - X_{NBF})$$

Equation (9B')

-continued $$0 = H^2(Y_{p2} - 2Y_{p1} + Y_{p0})$$
$$+ rH(Y_{p2} - Y_{p1})$$
$$+ LIGS \times GGS \times KGS(Y_{p2} - Y_{sGS})$$
$$+ LIBF \times GBF \times KBF(Y_{p2} - Y_{sBF})$$
$$+ NF \times ((1 - GS) \times (1 - BF)) \times KNGS(Y_{p2} - Y_{NGS})$$
$$+ (1 - NF)(1 - GS)(1 - BF) \times KNBF(Y_{p2} - Y_{NBF})$$

Equation (9C')

$$0 = H^2(Z_{p2} - 2Z_{p1} + Z_{p0})$$
$$+ rH(Z_{p2} - Z_{p1})$$
$$+ LIGS \times GGS \times KGS(Z_{p2} - Z_{sGS})$$
$$+ LIBF \times GBF \times KBF(Z_{p2} - Z_{sBF})$$
$$+ NF \times ((1 - GS) \times (1 - BF)) \times KNGS(Z_{p2} - Z_{NGS})$$
$$+ (1 - NF)(1 - GS)(1 - BF) \times KNBF(Z_{p2} - Z_{NBF})$$

For the log space embodiment, table 405 has columns for $X_p$, $Y_p$ and $Z_p$ and the initial position coordinates in rows zero and one are the respective coordinates $X_{NGS}$, $Y_{NGS}$, $Z_{NGS}$ of the glottal source neutral pointer NPGS. In this log space embodiment, which in more recent work appears to be preferable to the ratio space embodiment, the viscous drag factor is made constant throughout log space, with B=1.

Figure 17:
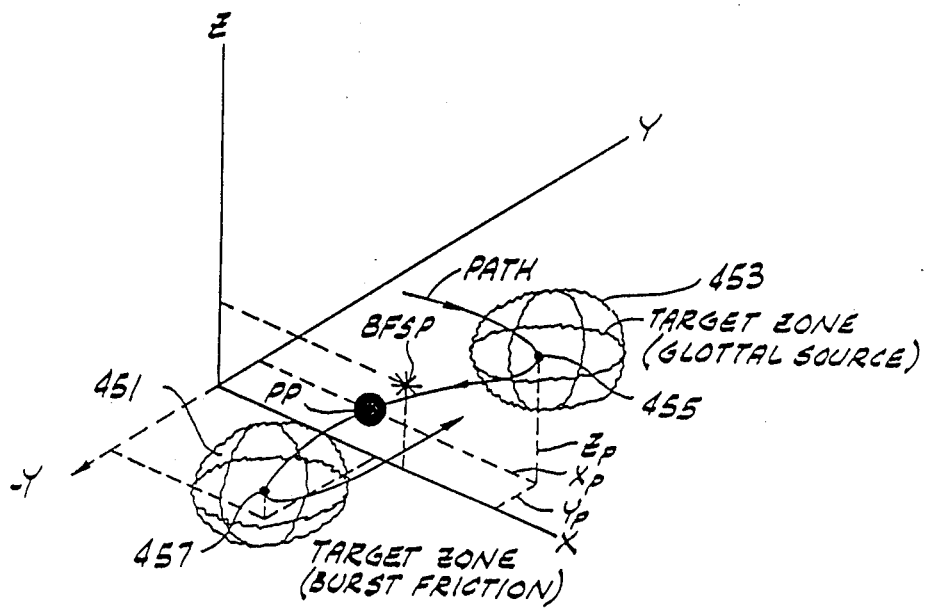
FIG. 17 is a simplified diagram of the mathematical space of FIG. 16, showing target zones for two phonetic elements, and showing a trajectory or path traced out by the perceptual pointer in the mathematical space.

The operations of CPU3 are first discussed conceptually in connection with FIG. 17. Auditory-perceptual events, or perceived sounds occur when the behavior of the perceptual pointer PP meets certain criteria. For example, these are (a) an auditory- perceptual event occurs when the perceptual pointer undergoes a period of low velocity; (b) an auditory-perceptual event occurs when the perceptual pointer undergoes sharp deceleration; and (c) an auditory-perceptual event occurs when the path of the perceptual pointer has high curvature. CPU3 is appropriately programmed to determine such events. The computations can involve any one or more of the criteria, or other criteria such as segmentation index SI discussed later hereinbelow, and time constraints can be added such that a velocity must be maintained for a predetermined number of milliseconds, or that a path or a certain locus and curvature have to be traversed within certain time limits.

In some of these various cases the auditory-perceptual event is regarded as associated with a position along the path in log space of a peak in magnitude of acceleration (determined now in log space and not ratio space in the preferred embodiment) of the perceptual pointer PP. The position of the perceptual pointer PP in log space is a vector defined by the coordinate values $X_p$, $Y_p$ and $Z_p$. Its velocity is a vector quantity equal to speed in a particular direction relative to the X, Y, Z frame of reference. The velocity has the components $dX_p/dt$, $dY_p/dt$ and $dZ_p/dt$, which are the time derivatives of $X_p$, $Y_p$ and $Z_p$. Speed is the magnitude, or length, of the velocity vector at any given time and is equal to the square root of the sum of the squares of the velocity components $dX_p/dt$, $dY_p/dt$ and $dZ_p/dt$. In general, the magnitude, or length, of any vector is equal to the square root of the sum of the squares of its components. Acceleration is a vector which represents change of velocity or rate of such change, as regards either speed or direction or both. The components of acceleration are the time derivatives of the components of the velocity vector respectively. In mathematical terms, the acceleration has components $d^2X_p/dt^2$, $d^2Y_p/dt^2$ and $d^2Z_p/dt^2$, which are the time derivatives of $dX_p/dt$, $dY_p/dt$ and $dZ_p/dt$.

Even when deceleration is involved in an auditory-perceptual event, the event is associated with a position along of the path of a peak in magnitude of acceleration of the perceptual pointer PP because a period of low velocity results from a deceleration which amounts to a peak in magnitude of acceleration. Also, a sharp deceleration is a peak in magnitude of acceleration because deceleration is negative acceleration and a negative sign does not affect the magnitude which involves sums of squares. When the path of the perceptual pointer has high curvature, the acceleration is a vector peaking in magnitude and pointing centripetally from the path.

CPU3 in some of the embodiments acts as at least one or more of the following: (A) means for identifying coordinate values approximating at least one position along the path of a peak in magnitude of acceleration, generating a memory address as a function of the position coordinate values and obtaining from said memory means the phonetic representation information prestored at that memory address; (B) means for computing a parameter approximating the curvature of the path and, when the parameter exceeds a predetermined magnitude at a point on the path, identifying the coordinate values of that point to approximate the position of a peak in magnitude of acceleration; (C) means for computing a speed along the path and identifying the coordinate values of a position where the speed decreases by at least a predetermined amount within a predetermined time, to approximate the position of a peak in magnitude of acceleration; or (D) means for computing a speed along the path and identifying the coordinate values of a position where a decrease in speed occurs that is both preceded and succeeded by increases in speed within a predetermined time, to approximate the position of a peak in the magnitude of acceleration.

Each auditory-perceptual event is said to leave a trace or tick mark that fades in time. When a cloud of ticks occurs, that is, when a region of high density of ticks surrounded by a region of lower density is formed, as would be the case for an oft-repeated speech sound, it is postulated that in human beings, the nervous system automatically places an envelope around the cloud of tick marks and creates a target zone capable of issuing a neural symbol or a category code. Under most circumstances such target zones are temporary and dissolve with time. Other target zones, such as those for the phones of one's native language and dialect, are formed during infancy and childhood under certain circumstances, such that they are nearly permanent and difficult to modify.

The concept of the target zone is perceptual. In the preferred embodiment the large memory 31 for target space storage is a memory means for holding prestored information indicative of different phonetic representations corresponding to respective sets of addresses in the memory. CPU1, CPU2, and CPU3 together constitute means for electrically deriving a series of coordinate values of points on a path in a mathematical space from frequency spectra of the speech occurring in successive time intervals respectively, for identifying coordinate values approximating at least one position along the path of a peak in magnitude of acceleration, generating a memory address as a function of the position coordinate values and obtaining from said memory means the phonetic representation information prestored at that memory address.

The target zones for stop phonemes such as /b/, /d/, /g/, /k/, /p/ and /t/ (FIG. 21) are associated with respective sets of addresses in the memory corresponding to a negative-Y region of the mathematical space which cannot be entered by sensory pointer values $X_s$, $Y_s$ and $Z_s$ but which can be entered by the coordinate values $X_p$, $Y_p$ and $Z_p$ because of underdamping in the sensory-perceptual transformation.

CPU3 finds a peak in the magnitude of acceleration, or otherwise finds a significant value of a trajectory parameter. The coordinates on the path at which a latest peak occurs are converted to integer values along each axis X, Y and Z. In terms of the coordinate values for the perceptual pointer which can be expected to result from the step 417 of FIG. 15, the target zones lie within ranges for X between 0 and 2, Y between −0.5 and 1.5 and Z between 0 and 2. In the preferred embodiment each axis is regarded as having 200 divisions which, for example include 150 divisions along the positive Y axis and 50 divisions along the negative Y axis. In this way, the shape of each target zone is definable with considerable precision. Therefore, the $X_p$, $Y_p$ and $Z_p$ values at which the latest peak occurs are multiplied by 100 and rounded to the nearest integer by a function INT. Since a peak can occur anywhere within the ranges, a number of memory addresses equal to the cube of 200, or 8 megabytes, is used. In other words 23 bits are used to express each memory address in binary form, since $2^{23}$ is about 8 million. The coordinates are converted to a memory address by the equation $$ADR = INT(100X) + 200 \times INT(100Y+50) + 40000 \times INT(100Z) \quad (10)$$

In other words when CPU3 finds a peak in the magnitude of acceleration by velocity analysis, curvature analysis, acceleration analysis, segmentation index analysis or other trajectory parameter analysis for significance or saliency, it then generates memory address ADR according to the above equation or the equivalent and obtains from the memory 31 the phonetic representation information, target zone identification or glide nucleus identification information prestored at that address. In one embodiment, a binary code representing each phoneme, or phonetic element generally, of a language is stored at each of a set of addresses in the memory. The 8 bits in a byte provide ample flexibility to provide distinct arbitrary binary designations for the different phonemes in a given human language. When CPU3 asserts memory address ADR, memory 31 supplies the binary code stored at that address. CPU3 then converts the binary code to a letter or other symbol representation of the phoneme and displays it on the video screen of its terminal and prints it out on printer 33.

The targets for the nonsustainable speech sounds are placed outside of the octant of positive X, Y, and Z. In FIG. 17 the sensory pointer BFSP can only approach a target zone such as 451 for a sound such as "p" and must do with appropriate dynamics such that the perceptual pointer actually reaches the target zone in the negative Y region. For example, suppose a talker is just finishing saying the word "Stop." The perceptual pointer has just made a sharp curve while passing through a target zone 453 for the vowel sound in "stop" under the influence of the glottal-source sensory pointer GSSP, now absent, and the suddenly appearing burst-friction sensory pointer BFSP. Because of the sharp curve, a memory lookup occurs for the coordinates of a point 455 and a phonetic element /a/ (as in "father") is obtained from memory 31. The burst-friction sensory pointer BFSP appears in the X-Z plane because of the "p" sound, attracting the perceptual pointer PP toward BFSP. Perceptual pointer PP overshoots the plane Y=0, in which BFSP occurs, and reaches target zone 451 for "p". Because of the attractive force of BFSP followed in succession by the neutral points NPBF and then NPGS, perceptual pointer PP reverses its direction of motion at a point 457 in the target zone 451, resulting in another peak in magnitude of acceleration. A memory lookup again occurs, this time for the coordinates of point 457 and a phonetic element for "p" is obtained from memory 31. The sensory pointers thus can in some cases only go to approach zones in such a way as to induce the perceptual pointer PP to reach the more distant perceptual target zone. However, the target zones such as 453 for the vowels are able to be entered by both the sensory and perceptual pointers. The perceptual response should reach vowel target zones when starting from neutral point NPGS in about 50 milliseconds.

Figure 18:
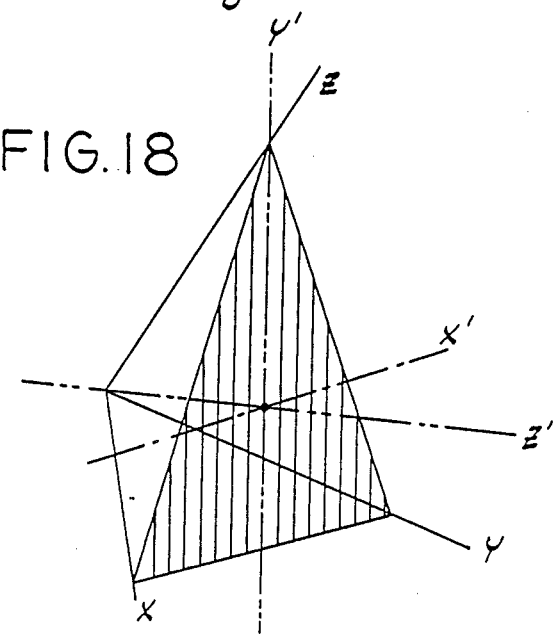
FIG. 18 shows an X,Y,Z coordinate system and an X',Y',Z' coordinate system in the mathematical space.

FIG. 18 shows the axes X, Y and Z of a coordinate system for the mathematical space. In describing the target zones for the vowels, it is useful to define additional axes X', Y' and Z' which intersect at a point in the first octant of the X, Y, Z system and are inclined relative to the axes X, Y and Z. The equations defining the X', Y', Z' coordinates are as follows:

$$X' = 0.70711 * (Y-X) \quad (11A)$$

$$Y' = 0.8162 * Z - 0.4081 * (X+Y) \quad (11B)$$

$$Z' = 0.5772 * (X+Y+Z) \quad (11C)$$

FIG. 19 is a view of an approximately planar slab 465 in the X', Y', Z' coordinate system (also called SLAB coordinates) which has been found to hold the target zones for the vowels. FIG. 19 shows the slab 465 edge as viewed along the X' axis. The neutral point NPGS is approximately centered in the vowel slab. Even though the vowel slab is thin, lip-rounding moves the vowel to the back of the slab, while retroflection as in r-coloring moves the position far back toward the origin so that even with the vowels alone, the use of three-dimensions is beneficial. The consonants fall in or near the vowel slab or in another slab that is orthogonal to the vowel slab, further supporting the use of a three dimensional space. It is contemplated that in some embodiments of the invention, however, that the slabs can be unfolded and unwrapped in such a way that a two dimensional space can be used. Also, it is contemplated that the slabs be mapped into the memory 31 addresses in such a way that the available memory capacity is efficiently used only for the slabs.

FIG. 20 is a view of the slab 465 face-on and viewed along the Z' axis in the X', Y', Z' coordinate system. Outlines for the target zones for the vowels are shown, from which outlines sets of addresses are derived for prestoring codes representing each of the vowel symbols in memory 31 of FIG. 1. Ranges in the Z' coordinate for each of these target zones of FIG. 20 are defined in the following Table of Z' Values for the Simple Vowels of English:

| Z' VALUES FOR THE SIMPLE VOWELS OF ENGLISH | |
|---|---|
| | Z' |
| /i/ | .65–.80 |
| /I/ | .63–.79 |
| /e/ | .63–.78 |
| / / | .63–.78 |
| / / | .62–.78 |
| /a/ | .62–.79 |
| / / | .62–.78 |
| / / | .61–.79 |
| /u/ | .60–.71 |
| /ɛ/ | .50–.63 |

These codes are prestored by manually entering them for each of the addresses corresponding to a point within each of the target zones. Also the codes can be prestored by preparing 3- dimensional position acquisition equipment 467 such as a Perceptor unit from Micro Control Systems, Inc., of Vernon, Conn. The unit has a teflon coated, precision-ground aluminum reference plate, on which is mounted a precision machined digitizing arm. A circuit that performs electrical data acquisition functions is housed beneath the reference plate. Dual RS-232 ports let the unit transmit data. The digitizing arm has five preloaded ball bearing supported joints which allow the arm to move. Potentiometers housed in the joints transmit electrical information about the angles of rotation of each segment of the arm. Then a Z-80A microprocessor in the unit computes the x, y, and z coordinates of the position of the arm's pointer tip. In this way the shapes of the target zones are recorded relatively rapidly for use in automatically programming the memory 31 of FIG. 1.

Figure 21:
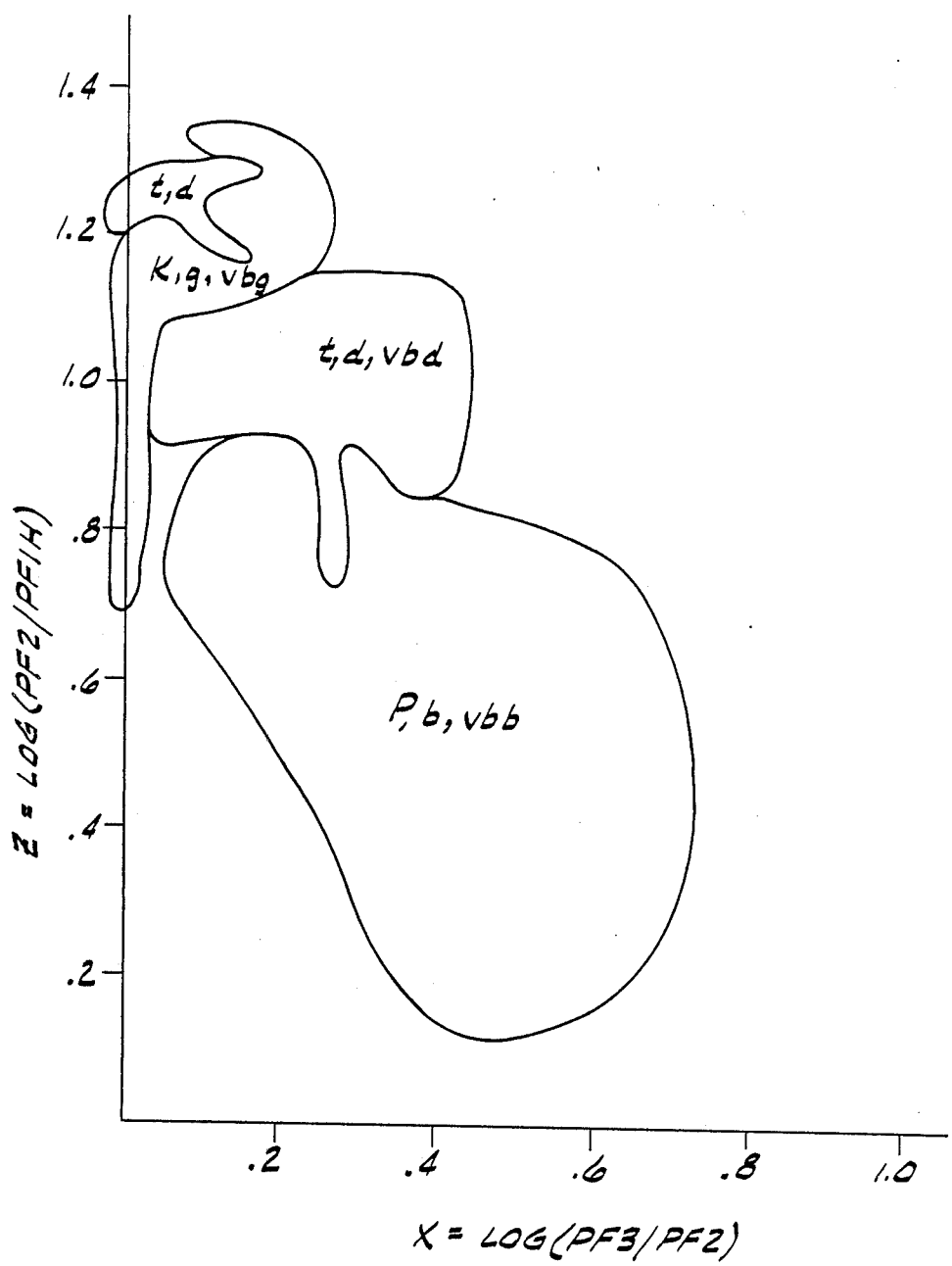
FIG. 21 depicts target zones in the mathematical space for voiceless stops, voiced stops and voice bars as viewed along the Y axis of FIG. 18.

FIG. 21 shows target zones in the mathematical space for voiceless stops as viewed along the Y axis of FIG. 18. The legend for this Figure is found in Table 1. The shapes of the target zones defined by FIG. 21 for the voiceless stops k, t, p are projected onto the X-Z plane but they actually only occupy a negative Y region between $Y=-0.10$ and $Y=-0.055$. The corresponding voiced stops g, d, b (legend in Table 2) occupy negative Y values in a range $-0.055$ to $-0.02$. Voice bars vbg, vbd, and vbb occupy positive Y values in a range $+0.02$ to $+003$.

FIGS. 22A and 22B depict target zones in the mathematical space for nasal consonants as viewed along the X' axis in FIG. 22A and the Z' axis in FIG. 22B. The legend for these Figures is found in Table 2.

Figure 23:
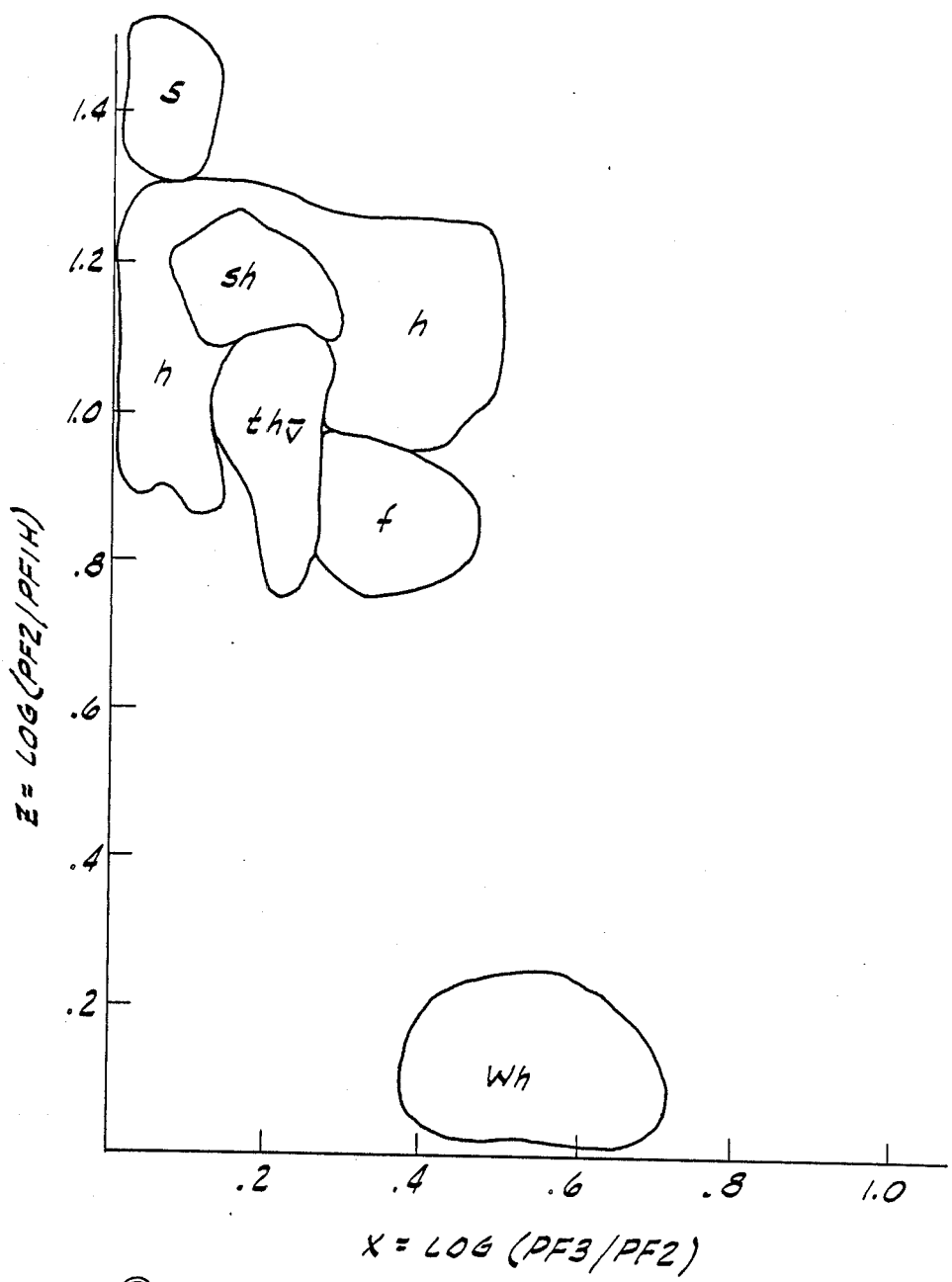
FIG. 23 depicts target zones in the mathematical space for voiceless fricatives of American English as viewed along the Y axis of FIG. 18.

FIG. 23 depicts target zones in the mathematical space for voiceless fricatives of American English as viewed along the Y axis of FIG. 18. The legend for this Figure is found in Table 3. The shapes of the target zones defined by FIG. 23 are projected onto the X-Z plane but they actually occupy a Y region between $y=-0.02$ and $y=+0.02$.

Figure 24:
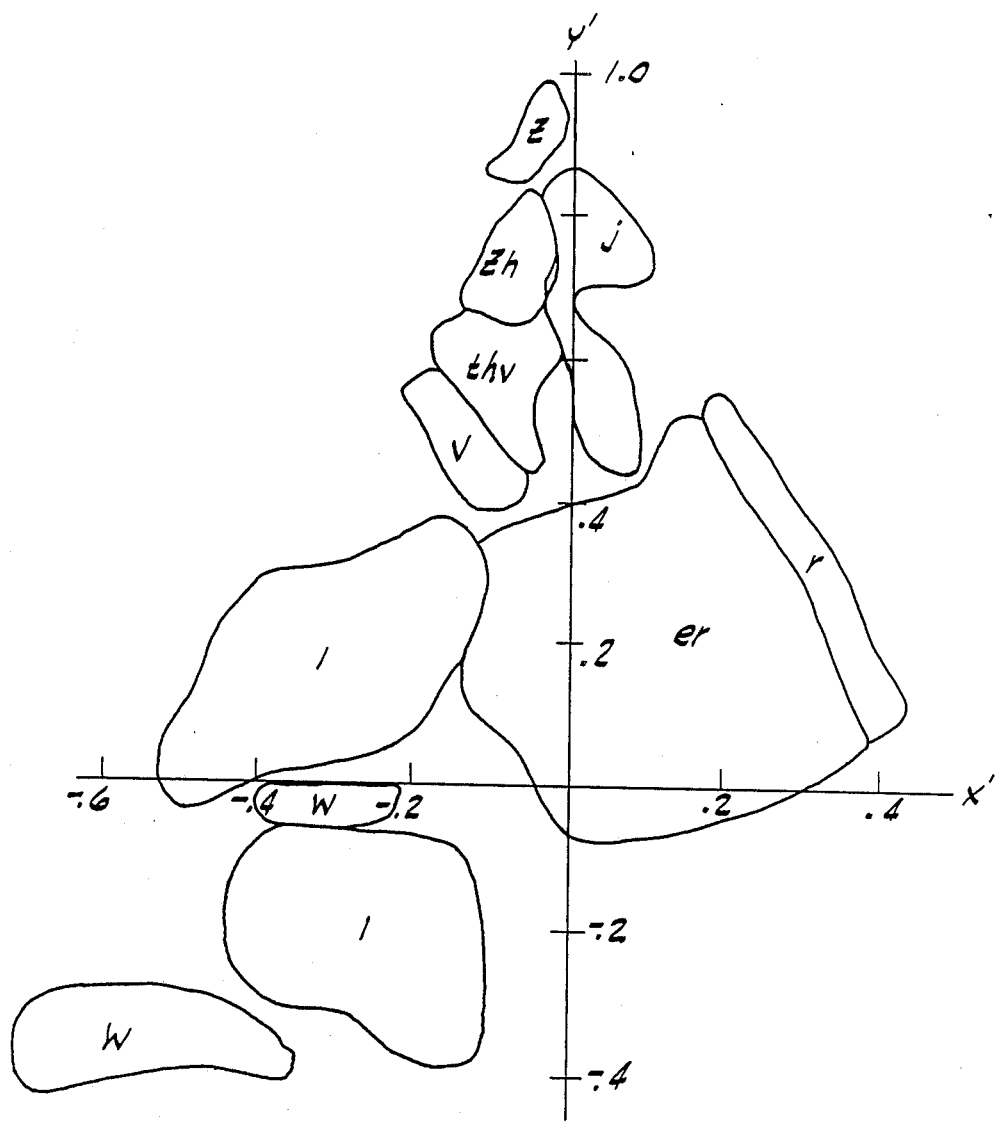
FIG. 24 depicts target zones in the mathematical space for voiced fricatives and the phonetic approximates as viewed along the Z' axis of the X', Y', Z' coordinate system of FIG. 18.
Figure 25:
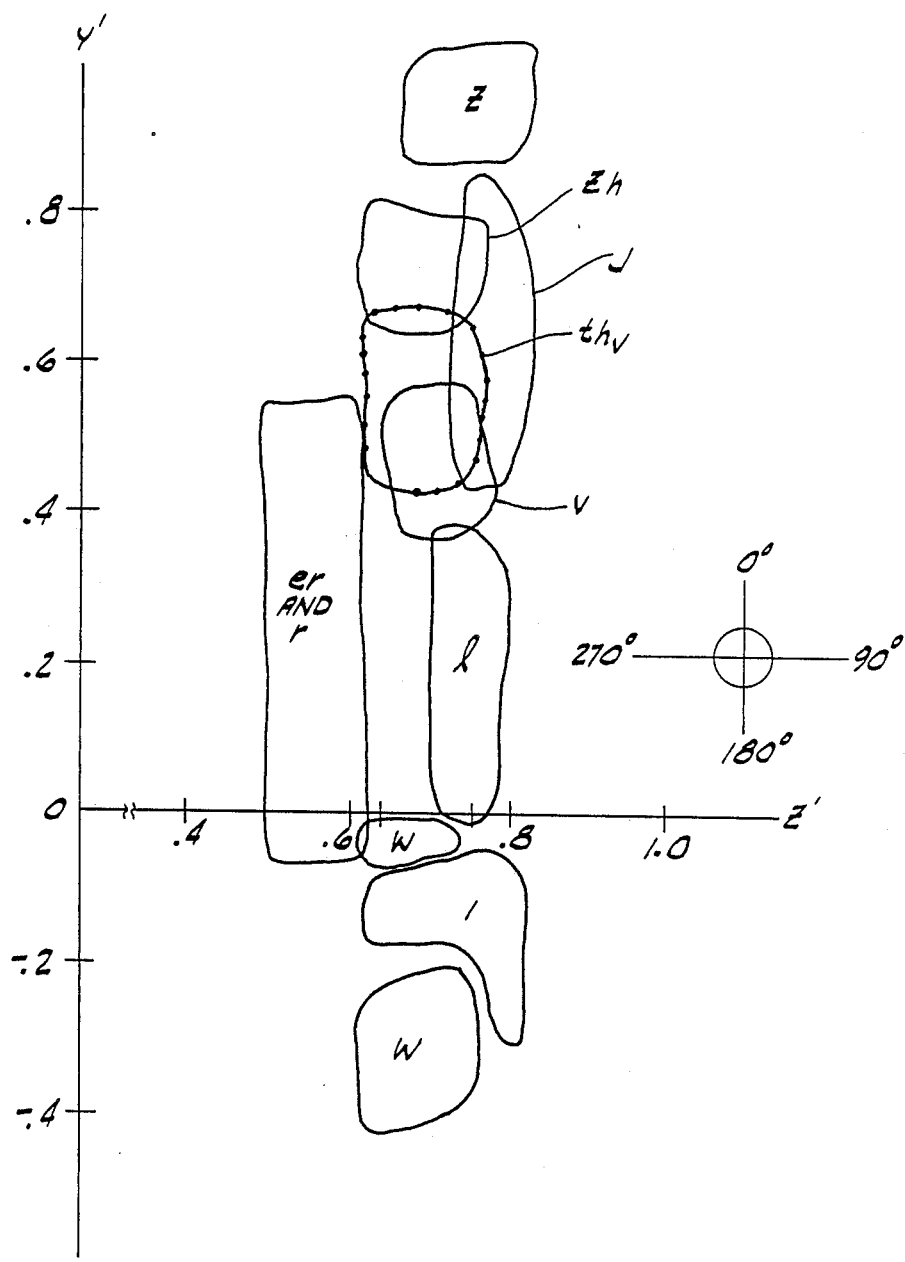
FIG. 25 depicts target zones in the mathematical space for the voiced fricatives and the phonetic approximates of FIG. 24 as viewed along the X' axis of the X', Y', Z' coordinate of FIG. 18.

FIG. 24 depicts target zones in the mathematical space for voiced fricatives and the phonetic approximates as viewed along the Z' axis of the X', Y', Z' coordinate system of FIG. 18. FIG. 25 depicts target zones in the mathematical space for the voiced fricatives and the phonetic approximates of FIG. 24 as viewed along the X' axis of the X', Y', Z' coordinate system of FIG. 18. The legend for FIGS. 24 and 25 is found in Table 4. These target zones are generally juxtaposed in or near the vowels, so the the X', Y', Z' coordinate system is used. The FIGS. 24 and 25 are interpreted in the manner of an orthographic projection to define the three dimensional shapes of the target ones. A superficial comparison of FIGS. 20 and 24 might suggest that the target zones for /er/ and /r/ in FIG. 24 conflict with the target zones of some of the vowels of FIG. 20, but this is not the case. FIG. 25 makes it clear that /er/ and /r/ fall behind the vowels in the log space. Interestingly, /w/ occupies two noncontiguous target zones according to present observations. In general target zones do not overlap. A legend for the vowel FIGS. 19 and 20 is found in Table 5.

TABLE I
VOICELESS (ASPIRATED) STOPS (PLOSIVES)

$k_v = /k^h/$ - velar
$k_p = /k^h/$ - palatal
($k_v$ and $k_p$ combined to k)
$t = /t^h/$
$p = /p^h/$

TABLE 2
VOICED PLOSIVES (STOPS) AND UNASPIRATED VOICELESS PLOSIVES (STOPS)

$g_v = /g/$ - velar
$g_p = /g/$ - palatal
($g_v$ and $g_p$ combined to g)
$d = /d/$
$b = /b/$ Note: These include unaspirated k, t, p of American-English

NASAL CONSONANTS m = /m/
n = /n/
= / / = ng in sing

TABLE 3
VOICELESS FRICATIVES (AMERICAN-ENGLISH)

s = /s/
h = /h/
sh = / /
thv̄ = /θ/
f = /f/
wh = /M/

TABLE 4
VOICED FRICATIVES AND THE APPROXIMATES z = /z/
zh = / /
j = /j/
thv = / /
v = /v/
l = /l/
w = /w/
er = / /
r = /r/

TABLE 5
VOWELS

| i | = /i/ | in beet |
| I | = /I/ | in bit |
| e | = /e/ | in bet |
| | = / / | in bat |
| | = / / | in but |
| a | = /a/ | in father |
| | = / / | in bought |
| | = / / | in book |
| u | = /u/ | in boot |

It is contemplated that the skilled worker use the shapes and coordinate information contained in FIGS.

19–25 for loading memory 31 in constructing the preferred embodiment.

Figure 27:
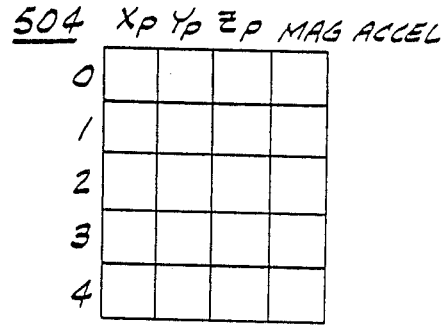
FIG. 27 is a diagram of a table for use in the operations of FIG. 26.
Figure 26:
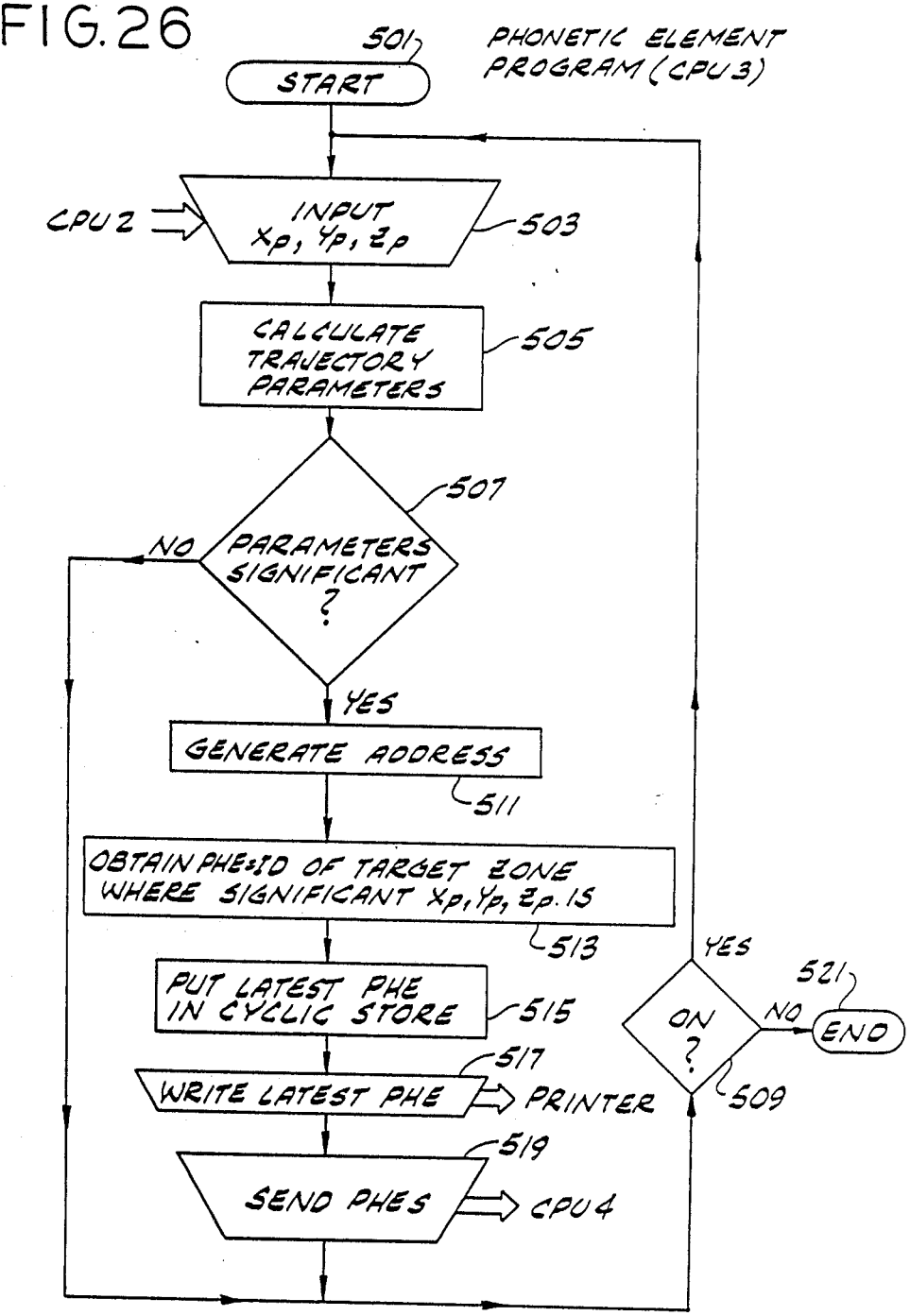
FIG. 26 is a diagram of inventive operations of a CPU3 of FIG. 1 of the inventive apparatus in analyzing the path in the mathematical space and obtaining phonetic elements when phonetically significant events occur.

In FIG. 26 operations of CPU3 of FIG. 1 commence with a START 501 and proceed to a step 503 where the coordinate values $X_p$, $Y_p$ and $Z_p$ of the latest point on the path in the mathematical space are input from CPU2 and stored in a table 504 of FIG. 27. Next in step 505, the significant parameters of the trajectory are computed, so that it can be subsequently determined when a significant speech event occurs. The coordinate values result from sampling by S/H 17 at equal intervals in time and analyzing the spectra at a repetition rate expressed by the quantity H hereinabove. Therefore, the magnitude of acceleration is computed from the latest coordinate values and the two previous triplets of coordinate values from table 504. The subscripts zero (0), one (1) and two (2) are used to indicate the latest triplet, the next previous triplet, and the triplet before that. The magnitude of acceleration is illustratively computed according to the equation $$\text{MAGACCEL} = H^2 \text{SQRT}((X_{p0}-2X_{p1}+X_{p2})^2 \quad (12)$$
$$+ (Y_{p0}-2Y_{p1}+Y_{p2})^2$$
$$+ (Z_{p0}-2Z_{p1}+Z_{p2})^2)$$

In some embodiments the curvature CURV is also calculated from MAGACCEL just given and from a velocity-squared quantity according to the equations $$\text{CURV} = \text{MAGACCEL}/\text{VELSQ} \quad (13)$$

where $\text{VELSQ} = H^2[(X_{p0}-X_{p1})^2$
$$+ (Y_{p0}-Y_{p1})^2 + (Z_{p0}-Z_{p1})^2]$$

It is to be understood that equation (12) defines a magnitude of acceleration that implicitly includes components that can be either normal (perpendicular) or tangential to the instantaneous velocity at any given point on the path. Therefore, equation (13) provides a trajectory parameter that includes curvature but is not limited to it. A further alternative embodiment computes the curvature only according to the following equations:

$$S_{01} = \text{SQRT}((X_{p1}-X_{p0})^2 + (Y_{p1}-Y_{p0})^2 + (Z_{p1}-Z_{p0})^2) \quad (14)$$

$$S_{12} = \text{SQRT}((X_{p2}-X_{p1})^2 + (Y_{p2}-Y_{p1})^2 + (Z_{p2}-Z_{p1})^2) \quad (15)$$

$$S_{AV} = 0.5 \times (S_{01} + S_{12}) \quad (16)$$

$$\text{CURV1} = (1/S_{AV}) \times \text{SQRT}(((X_{p2}-X_{p1})/S_{12} - (X_{p1}-X_{p0})/S_{01})^2 \quad (17)$$
$$+ ((Y_{p2}-Y_{p1})/S_{12} - (Y_{p1}-Y_{p0})/S_{01})^2$$
$$+ ((Z_{p2}-Z_{p1})/S_{12} - (Z_{p1}-Z_{p0})/S_{01})^2$$

In words $S_{01}$ is the length of a distance interval between two successive points on the path in the X, Y, Z coordinate system and $S_{12}$ is the length of another distance interval adjacent the first one. $S_{AV}$ is the average of $S_{01}$ and $S_{12}$. CURV1 is an example of one of a number of formulas for curvature which is a numerical approximation to the magnitude of the second partial derivative of an instantaneous position vector with respect to path length. Another of such formulas recognizes that the curvature equals the magnitude of the vector cross product of velocity vector crossed with acceleration vector /v x a/ divided by the cube of the magnitude of the velocity vector (three-halves power of sum of squares of the components of the velocity vector). Consequently, CURV1 advantageously eliminates any tangential components of acceleration for the curvative calculations in embodiments when to do so provides a more accurate segmentation of the path in X, Y, Z space for speech recognition purposes.

Another related alternative procedure computes a quantity called curvature index CI according to the formula $$CI = \frac{K*DS}{2}, \text{ where} \quad (18)$$

K is curvature and DS is the step size in distance.

Two line segments of equal length with a common end subtend an interior angle A. The cosine of angle A is equal to the inner product of unit vectors in the direction of the two line segments representing two intervals along the path in X,Y,Z space.

$$K \times DS = \cos A + 1. \quad (19)$$

$$\cos A = [(X_3 - X_2)(X_2 - X_1) + (Y_3 - Y_2)(Y_2 - Y_1) + \quad (20)$$
$$(Z_3 - Z_2)(Z_2 - Z_1)]/(S_{01} \times S_{12})$$

where $S_{01} = S_{12} = DS$.

Each latest value of the magnitude of acceleration MAGACCEL (or alternatively CURV, CURV1, CI, or other trajectory parameter) is stored during step 505 in table 504 holding it and four previous values of MAGACCEL (or other parameter). Similar tabular analysis of the curvature CURV or CURV1 or curvature index CI is applied where curvature is used. The argument in the square root SQRT function of Equation (12) is sufficient for use as a parameter related to the magnitude of acceleration also. It is emphasized that there are many ways of calculating significant trajectory parameters to accomplish an equivalent analysis of the path of the perceptual pointer in the mathematical space.

A still further alternative method of determining significant trajectory parameters involves a segmentation index SI as discussed next and in connection with FIGS. 48 and 49.

First, consider a perceptual path $P(X',Y',Z')$ to be represented as three independent projections along X', Y' and Z' axes in SLAB space of FIGS. 19 and 20. Each projection is herein called an X' curve, Y' curve, and Z' curve, respectively (see FIG. 48). Clearly, they are all the functions of time. Then, all the peaks (i.e., local maxima) and valleys (local minima) are located on the three curves. At each peak and valley, the maximum variation within time interval centered on that peak or valley is measured in log-units, i.e., the difference between the local minimum and the local maximum. The duration of such a region is set to a constant value (e.g. 80 msec. involving the corresponding number of frames) for all the three curves. Thus, there is a pair, composed of a local minimum and a local maximum for each function at any peak or valley location. Finally, the three differences are added up with a weighting function to provide the values of the segmentation index (SI) at that peak or valley. For those non-peak or non-valley frames, their SI values are simply set to zero. The value of SI at ith frame is defined in equation (21) as $$SI(i) = W1 \cdot SIX(i) + W2 \cdot SIY(i) + W3 \cdot SIZ(i) \quad (21)$$

where SIX(i), SIY(i), and SIZ(i) are the maximum variations of X', Y' and Z' coordinate values at the 80 msec. region centered at the ith frame. In actual design, W1 and W2 are set to one as a constant. W3 is a function of Z' (Z-prime) and varies inversely with Z' when Z' is below 0.6 (i.e., left of vowel slab in FIG. 19). Thus, when a perceptual path travels through below the vowel-slab (such a Z'-dip usually indicates entering /r/ target or nasal targets), the corresponding frames will have high SI values. The formula used in calculation of W3 is given in equation (22)

$$W3(i) = \begin{cases} 1.0 \text{ if } Z'(i) \text{ gtreater than } 0.6 \\ 10. \cdot (0.3/Z'(i)) \text{ otherwise} \end{cases} \quad (22)$$

where Z'(i) is the value of Z'-coordinate at ith frame. Note that there is a break point for W3 at any frame where Z'(i) is equal to 0.6. This transition into values of 3/Z' for Z' less than or equal to 0.6 does not cause any problems because SI itself is not a continuous function, based on its definition. In fact, in most frames SI's have zero values because peaks or valleys on X', Y', and Z' are very limited.

A suitable threshold value for significance for the segmentation index when used as a trajectory parameter is that SI exceed 0.10 to be significant.

Returning to FIG. 26, and discussing step 507 using trajectory parameter MAGACCEL for example, the table 504 holding five values of MAGACCEL is tested to determine if a significant peak has occurred. A suitable test is that a peak has occurred if the table has a tested value entered therein which exceeds a predetermined level and is is preceded and succeeded in the table 504 by values less than the tested value. If this test is not passed, operations pass from step 507 to a decision step 509 where CPU3 checks an ON/OFF switch to determine whether it is to continue, and if so operations loop back to step 503. Eventually, a phonetically significant event occurs at step 507 and operations proceed to a step 511 to generate an address ADR according to ADR Equation (10) hereinabove.

Then in a step 513 the address ADR is asserted by CPU3 to memory 31 of FIG. 1 to obtain a prestored phonetic element code PHE byte identifying the phonetic element of the target zone where the significant $X_p$, $Y_p$, $Z_p$ coordinate values lie. In a step 515, this PHE value is stored in a memory space holding PHE values in the order in which they are obtained. In a step 517, the PHE value, or byte is looked up in a table providing instructions for writing the corresponding phonetic symbol or category code corresponding to a phone of the language to printer 33 of FIG. 1.

In a next step 519 all PHE values stored in the order in which they are obtained are sent to CPU4 of FIG. 1. CPU4 is a lexical access processor which converts the PHE values to a series of words spelled according to a language chosen, or is any other processing apparatus chosen for other applications as noted hereinabove.

When step 519 is completed, operations proceed to ON decision step 509, and loop back to step 503 unless the CPU3 is to be no longer ON, whence operations terminate at an END 521.

In a complex target zone approach to identifying some of the phonetic elements PHE in step 513 of FIG. 26, it is recognized that experimental observations may require that some PHEs occupy the same target zone.

Figure 28:
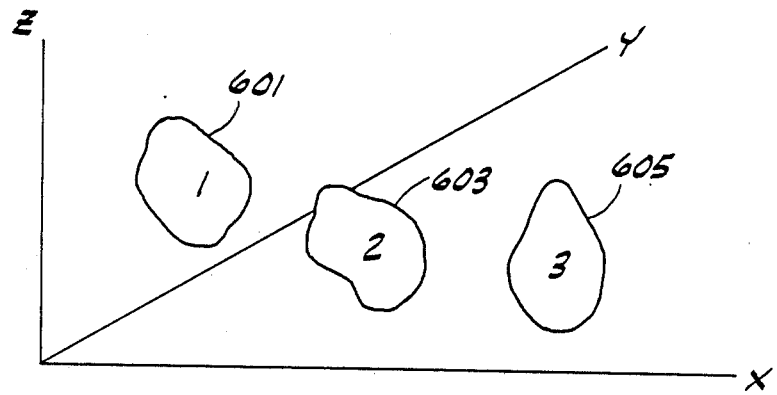
FIG. 28 is a pictorial of an X, Y, Z coordinate system with target zones marked with identification numbers instead of phonetic element representations.

In such case, the PHE is not associated with a target zone, and instead the target zone is assigned an arbitrary numerical target zone identification number as shown in FIG. 28 for target zones 601, 603 and 605.

Then a table lookup procedure as illustrated in FIG. 29 selects the correct PHE entry p, b or m for column: target zone ID=1 depending on flag values such as a periodic flag AP=1, periodic AP=0, or nasal NS=1. Two contiguous or noncontiguous target zones ID=1 and 2 can be parts of the same overall target zone for lookup purposes as indicated by columns 1 and 2. Target zones which are independent of flag values have identical PHEs tabulated in a column as in column 3. The effect of nasality to produce a different PHE value is shown in column 4. A null identification "-" is readily incorporated when a dummy target zone is desired. In this way, CPU1 detects which of the characteristics of the speech is present, for example, as indicated by the flags in the auditory state code. ROM3 acts as an example of an electronic memory for prestoring information relating at least one of the event identifications or address set identifications (e.g. a target zone identification number TZ in memory 31) to different phonetic representations depending on which of a plurality of characteristics of speech is present. CPU3 acts as an example of a means obtaining from the electronic memory the address set identification for the set of addresses containing the address so determined, and when the address set identification so obtained is related to more than one phonetic element representation in the memory according to characteristics of speech, then obtaining from the electronic memory the phonetic representation which corresponds to the detected characteristic of speech.

Figures 30, 31:
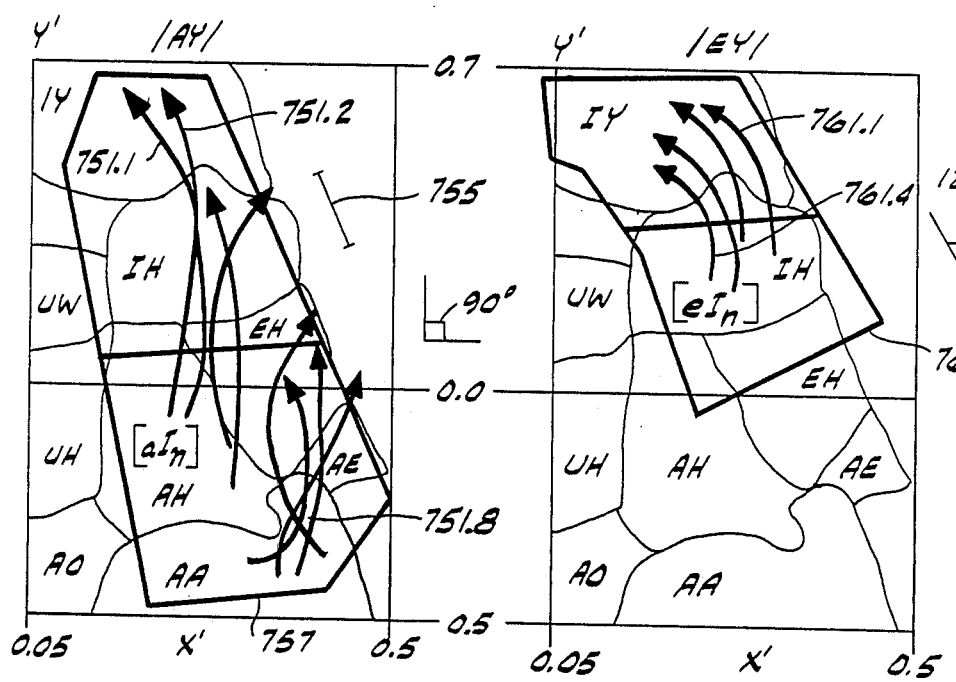
FIG. 30 is a diagram of some perceptual paths in an X',Y' coordinate system which paths represent different occurrences of the same diphthong /AY/.
FIG. 31 is a diagram of some perceptual paths in the same X',Y' coordinate system of FIG. 30 which paths represent different occurrences of the diphthong /EY/.

Turning now to the subject of glide detection, FIG. 30 shows numerous differently-located segments 751.1, 751.2, ... and 751.8 of perceptual paths of speech which are all examples of what is heard as the diphthong /AY/ (same sound as in the word "buy"). All of the segments are at least as long as some minimum length 755 or some minimum time duration, are relatively straight or unidirectional (low curvature), appear as arrows with relatively consistent angular orientation from tail to tip, originate in either the AA or AH target zone, and terminate in either the EH or AE target zone if they originate in the AA target zone and otherwise terminate in either the IY or IH target zone if they originate in the AH target zone. Moreover, all of the segments are within a relatively well-defined pipe 757 and originate in a lower portion of that pipe 757 which portion is designated as a radical or nucleus [$aI_n$] in perceptual space as shown in FIG. 30.

The above characteristics of the diphthong /AY/ lead to corresponding tests which can be performed with electronic hardware or software to detect the presence of one or more indicia of the diphthong or other glide, and when the indicia are present, the diphthong or other glide is automatically recognized.

In a further example shown in FIG. 31, four differently-located segments of perceptual paths of speech 761.1-.4 are all examples of what is heard as the diphthong /EY/ (same sound as in the word "bait"). Again, all of the segments are at least as long as minimum length 755 or some minimum time duration, are relatively straight or unidirectional (low curvature), appear as arrows with relatively consistent angular orientation from tail to tip, originate in a nucleus [$eI_n$], and terminate in the IY target zone. Also, all of the segments are within another relatively well-defined pipe 765 as shown in FIG. 31.

A tedious exposition of further examples is believed to be unnecessary to support the concept that diphthongs and the more general category of glide sounds (of which diphthongs are a species) are susceptible of automatic recognition by using tests directed to one or more of the various indicia above.

At present two alternatives types of tests are believed to be particularly promising.

Test Type I is a test for what is herein called a "nucleus-off glide sequence", wherein a region including the tail of the glide arrow is called the glide nucleus or radical and the position of any given tail is called the "root position". It is noted that the meaning of nucleus as used herein refers to a region in mathematical perceptual space and does not have the linguistic meaning associated with it by Lehiste et al. hereinabove-cited (A "syllable nucleus" in that paper is simply the middle of a syllable with beginning and ending consonants.) If the arrow exceeds the minimum length 755, has an angular orientation within a predetermined band of angles centered approximately on the Y' axis direction, and has a nucleus in the base of the pipe, then it passes Test Type I as an /AY/ phonetic element. Correspondingly, if the arrow exceeds the minimum length 755, has an angular orientation within a predetermined band of angles centered approximately on 120°, and has a root position in the nucleus [$eI_n$], then it passes Test Type I as an /EY/ phonetic element.

Figure 32A:
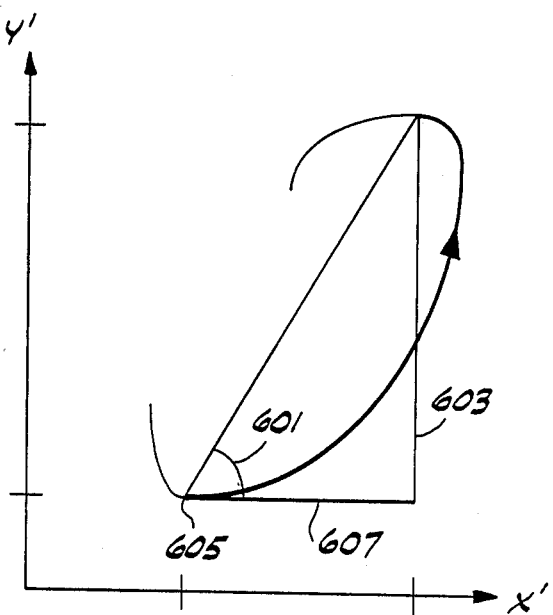
FIG. 32A is a diagram of a generalized perceptual path in the X',Y' coordinate system for explaining a glide-detection method of the invention.

In FIG. 32A the angular orientation 601 is computed as the arctangent of the ratio of a distance 603 in a monotonic sequence traveled along a first coordinate (e.g. Y') from the root position 605 divided by a distance 607 traveled along a second coordinate (e.g. X'). A Y' glide is monotonic in the increasing Y' direction. A decreasing X' glide is monotonic in the decreasing X' direction. A decreasing Z' glide is monotonic in the decreasing Z' direction. Other examples of terminology in this respect are unnecessary. Discussion of FIGS. 32B–32D is found hereinbelow in connection with FIGS. 33 and 34.

Figure 32:
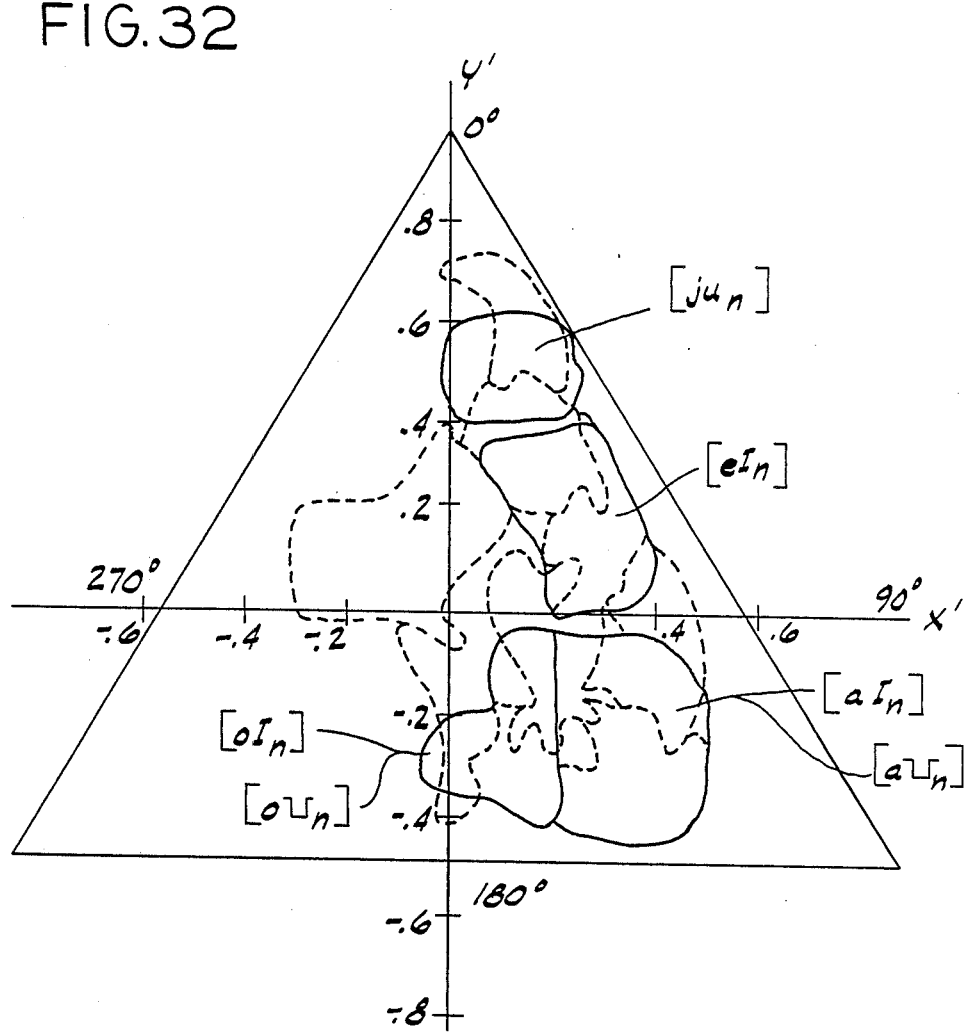
FIG. 32 is a diagram of various nucleus zones, or nuclei, in the X', Y' coordinate system for explaining a glide-detection method of the invention.

In other words, in Test Type I a table of glides is prepared and for each glide representation is stored one or more target zone identifications where a nucleus for the glide can occur and there is also stored an angle range for that glide. This can be accomplished by judicious selection of entries in a table analogous to that shown in FIG. 29. Alternatively, a separate section of memory 31 is provided for target zones corresponding only to glide nuclei, since they overlap other target zones as shown in FIG. 32.

Then a nucleus and angle are determined for each glide when it occurs and are compared in electronic apparatus such as CPU3 with the prestored information. The prestored information is structured and based on experimental data such as that reflected in FIGS. 30 and 31 so that either the comparison yields a null identification in that the observed glide corresponds to nothing in the prestored information, or the comparison yields a match with at most one glide for which there is prestored information. If there is a match, the latest phonetic element PHE value is replaced with a phonetic element PHE corresponding to the diphthong or glide for which a match is found. ("Glide" is for the present purposes also used as generic to "diphthong", "glide" and "r-colored vowel".)

Speech sounds such as the diphthongs, at least some versions of the approximates or glides /wj/, and perhaps r-coloration of certain vowels such as in boar, bar, beer, and so on, can be treated as nucleus-off glide sequences. Such nucleus-offglide sequences are sometimes referred to as radical-glide sequences in linguistics.

Test Type II is a test for what is herein called a "phonetic element doublet" or pair, i.e. a succession of two different phonetic elements as determined by a trajectory analysis test (e.g. curvature, acceleration magnitude, low velocity segment, segmentation index). If the two different phonetic elements occur within a time interval that is in a predetermined range of time values, then they are regarded not as two separate phonetic elements but as one. For example, if a phonetic element doublet originates in, the AA target zone and terminates in either the EH or AE target zone, it passes Test Type II and is identified as an /AY/ phonetic element. If instead it originates in the AH target zone and terminates in either the IH or IY target zone, it also passes Test Type II and is also identified as an /AY/ phonetic element. If as a further example, it originates in the IH target zone and terminates in the IY target zone, it passes Test Type II and is identified as an /EY/ phonetic element. A direction test can also be included.

In other words, in Test Type II a table of glides is prepared and for each glide representation is stored one or more pairs of phonetic element PHE or other target zone identifications. Then as phonetic element PHE values are stored in memory the latest pair of them is compared in electronic apparatus with the prestored information. The prestored information is structured and based on experimental data such as that reflected in FIGS. 32 and 32A-D so that either the comparison yields a null identification in that the observed glide corresponds to nothing in the prestored information, or the comparison yields a match with at most one glide for which there is prestored information. Then the latest pair of PHE values or event identifications in memory is replaced with the phonetic element PHE identification of a glide for which a match is found.

Figure 33:
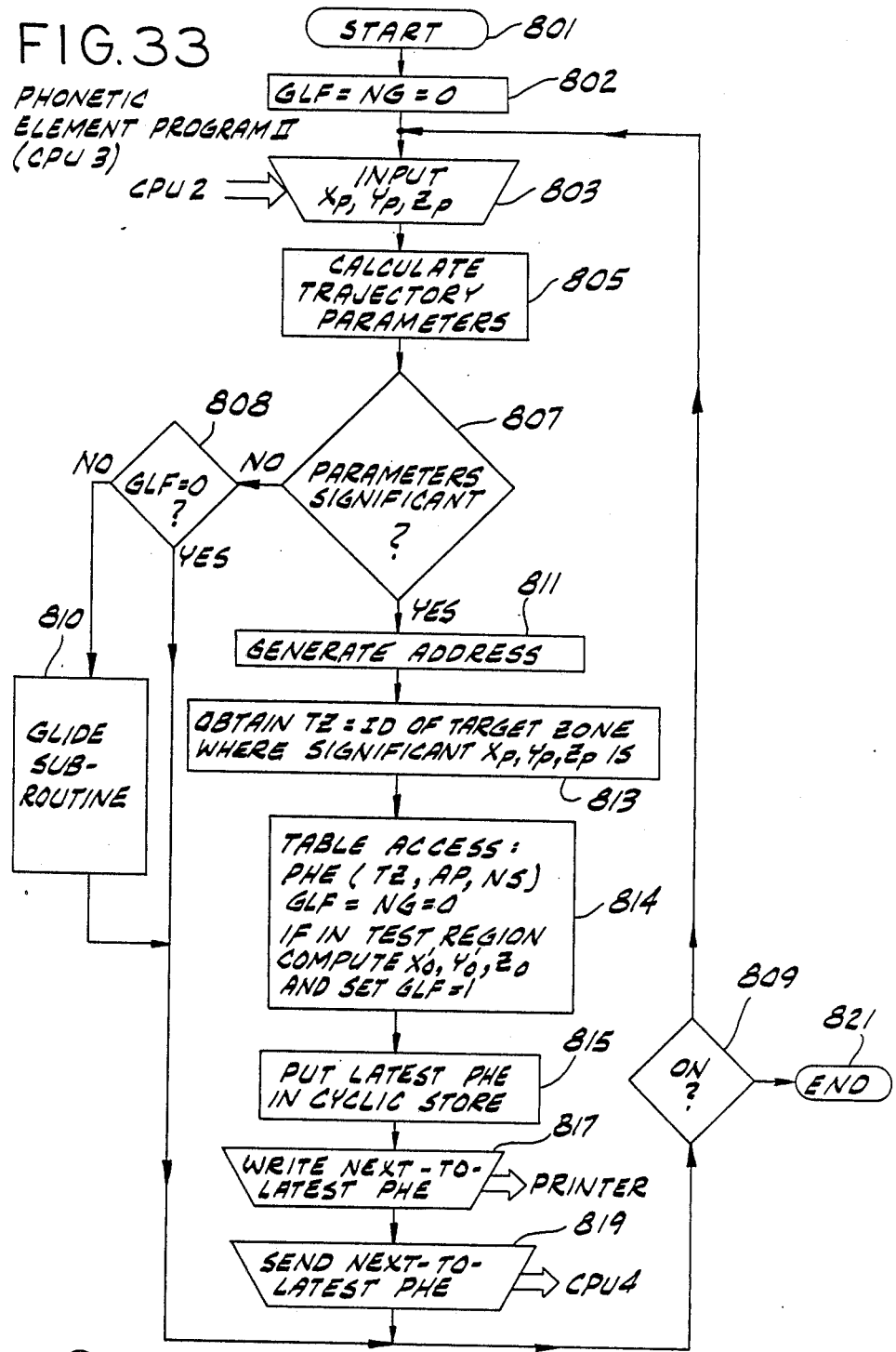
FIG. 33 is a diagram of inventive operations in an alternative to FIG. 26 for implementing a complex target zone method and an inventive glide detection method.

In FIG. 33 operations in an embodiment (alternative to FIG. 26 for implementing Test Type I for a glide) are marked with 800+ numbers in a manner analogous to the 500+ numbers of FIG. 26 to facilitate comparison. Operations in FIG. 33 commence with a BEGIN 801 and proceed to a step 802 to set a glide flag GLF and a glide number NG to zero. Next in a step 803 the coordinate values $X_p$, $Y_p$ and $Z_p$ of the latest point on the path in the mathematical space are input from CPU2 and stored in a table such as 504 of FIG. 27. Next in a step 805, a latest value of a parameter (such as curvature CURV of equation (13) or CURV1 of equation (17)) of the trajectory is computed.

Following step 805, operations proceed to a step 807 to determine whether a significant peak in CURV1 has occurred by the same table analysis procedure as described for MAGACCEL in step 505 for example. In contrast with the operations of FIG. 26, the operations of FIG. 33 are capable of extracting phonetically important information not only when the test of step 807 is passed but also in some circumstances when the test of step 807 is not passed.

If the test of step 807 is not passed, operations proceed to a step 808 to test the glide flag GLF. If GLF is still zero, as it is initially, then operations proceed to a decision step 809 where CPU3 checks an ON/OFF switch to determine whether it is to continue, and if so operations loop back to step 803. If in step 808 the glide flag had been set (as described in further operations hereinbelow), then operations proceed from step 808 to a Glide Subroutine 810 after execution of which step 809 is reached.

Eventually, a significant trajectory parameter value is detected in step 807 and operations proceed to a step 811 to generate an address ADR of target space storage 31 according to ADR Equation (10) hereinabove. Then in a step 813 the address ADR is asserted by CPU3 to memory 31 of FIG. 1 to obtain an identification number TZ prestored at each of a set of addresses including the address ADR asserted. In other words, TZ is an identification number for complex target zone purposes as discussed in connection with FIGS. 28 and 29. In contrast to the step 513 of FIG. 26, the step 813 of FIG. 33 does not access a PHE byte directly. Instead, the address ADR is asserted by CPU3 to memory 31 to obtain a target zone identification, TZ identifying the target zone where the significant $X_p$, $Y_p$ and $Z_p$ values lie.

Then in a step 814 the table of FIG. 29 is accessed with the target zone identification number TZ, the a periodic flag (periodic=0, a periodic=1) and the nasality flag (nasal=1) to obtain a prestored phonetic element code PHE byte identifying the phonetic element of the target zone where the significant $X_p$, $Y_p$ and $Z_p$ values lie. Further in step 814, the glide flag GLF is set (GLF=1) if the coordinate values $X_p$, $Y_p$ and $Z_p$ are in the test region. A suitable test or preestablished condition for the test region is that Y be greater than +0.03. If the coordinate values are in the test region, the X', Y', and Z' coordinates are also computed according to equations (11A), (11B) and (11C) stored as values $X'_o$, $Y'_o$ and $Z'_o$ for glide identification purposes. On the other hand, if the coordinate values $X_p$, $Y_p$ and $Z_p$ are not in the test region, then the glide flag GLF and glide number NG are both reset to zero.

Then in a step 815, the phonetic element PHE value obtained from the table of FIG. 29 in step 814 is stored in a memory space holding PHE values in the order in which they are obtained. In a step 817, the next-to-latest PHE value, if any, in the same memory space is obtained from the memory space and used to look up in a table providing instructions for writing the corresponding phonetic symbol or category code corresponding to a phone of the language to printer 33 of FIG. 1.

In a next step 819 all PHE values stored in the order in which they are obtained are sent to CPU4 of FIG. 1. On a real-time basis this involves sending the next-to-latest PHE value just discussed, if any, to CPU4. When step 819 is completed, operations proceed to ON decision step 809, and loop back to step 803 unless the CPU3 is to be no longer ON, whence operations terminate at an END 821.

Figures 34, 34A:
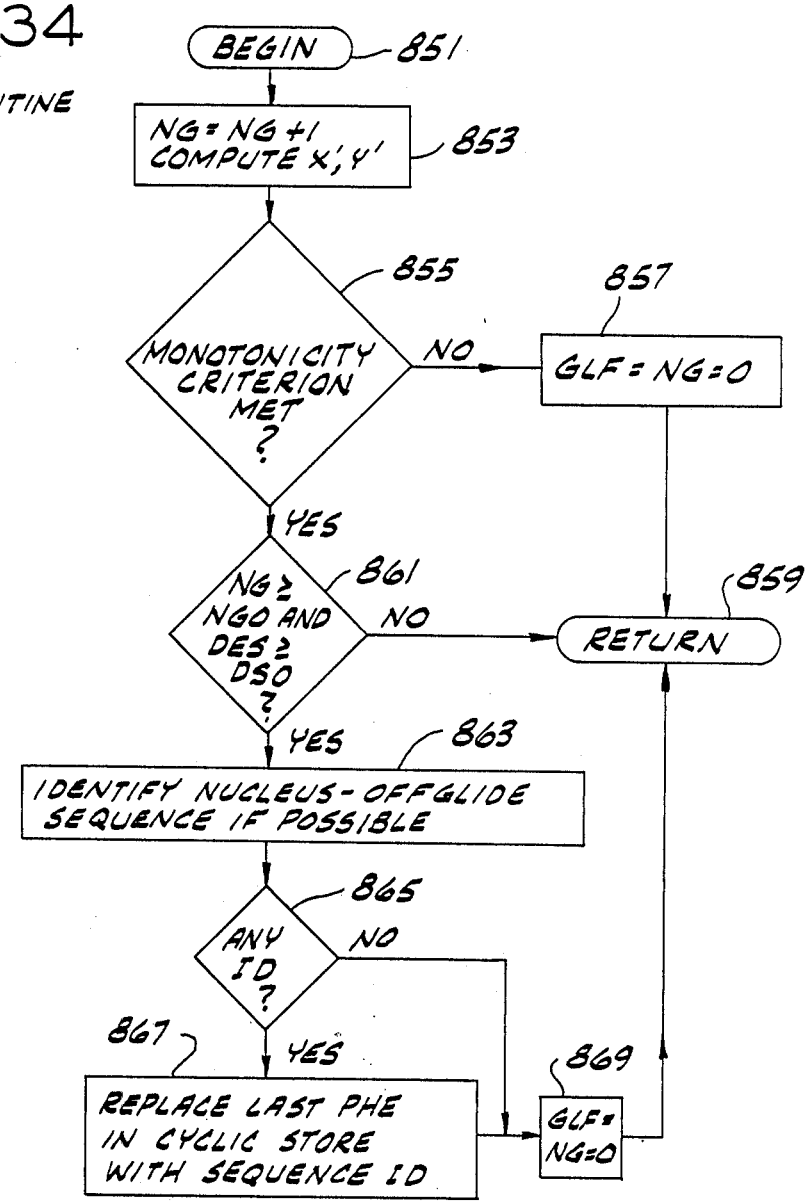
FIG. 34 is a flow diagram of inventive operations in a glide subroutine portion of FIG. 33 for the inventive glide detection method.
FIG. 34A is a table of coordinate values for use in a monotonicity test in the glide detection method of FIG. 34.

In FIG. 34 operations in the Glide Subroutine 810 of FIG. 33 are described in further detail. Operations commence with a BEGIN 851 and proceed to a step 853 to increment glide number NG by one and to compute the vowel slab coordinates X', Y' and Z' for the latest coordinate values $X_p$, $Y_p$ and $Z_p$ which have been reached on the path of the perceptual pointer. These latest coordinates X', Y' and Z' are entered into a table 854 of FIG. 34A in a row corresponding to the value of the glide number NG.

After step 853 of FIG. 34, a step 855 tests the values in the table 854 to determine whether a monotonicity criterion is met. For the present purposes, monotonicity is a condition in which all of the X', Y' or Z' values in table 854 are either listed in increasing order, or listed in a decreasing order. The coordinate values $X'_o$, $Y'_o$ and $Z'_o$ stored in step 814 are regarded as the "root position" for a possible glide, the existence of which is to be detected in subroutine 810. Step 855 determines whether a segment of the path of the perceptual pointer PP, which segment begins in the nucleus and ends with the latest position coordinate values, is going in any particular direction or not by using this monotonicity test as a threshold test which a true glide must pass.

For example, if the values in the X' row first increase and then decrease for NG=0, 1, 2, ... to the latest value of NG, then the X-prime coordinate of the path segment is not monotonic. If for another example, the values in the Y' row first decrease and then increase for NG=0, 1, 2, ... to the latest value of NG, then the Y-prime coordinate of the path segment is not monotonic. If either the X' coordinate, the Y' coordinate, or the Z' coordinate is monotonic, then the path segment is monotonic for purposes of one exemplary preferred embodiment. If the path segment is not monotonic, then operations branch from step 855 to a step 857 to reset the glide flag GLF and glide number NG to zero because no glide is found. After step 857 a RETURN 859 is reached.

Since monotonicity is regarded as a necessary but not a sufficient condition for detecting a glide in the subroutine 810, then if the monotonicity criterion of step 855 is met, operations go to a step 861 to test whether the glide number exceeds a predetermined maximum glide number NG0 (e.g. NG0=32) and also whether a distance DES traveled is at least a predetermined amount DS0 (e.g. 0.1 log units, or a sum of squares in X', Y' and Z' of table 854 exceeding 0.01 log units squared). If the test of step 861 is not passed, a branch is made to RETURN 859 to accumulate more path data, assuming that no trajectory event in step 807 is detected before a repeated loop through steps 803, 805, 807, 808, 810 and 809 in FIG. 33 occurs for enough times for the glide number to reach NG0.

If a glide occurs, glide number NG eventually reaches NG0 in step 861, whence a step 863 is executed to identify a recognizable nucleus-offglide sequence if possible. An exemplary procedure for the identification is discussed hereinbelow. When the procedure has been executed, and the nucleus and glide correspond to a recognizable speech sound according to an ID check in test step 865, then operations proceed to a step 867 to replace the last PHE value in the memory space, or cyclic store, (discussed in connection with steps 815 and 817) with a sequence identification PHE value representative of the recognizable speech sound.

In other words, CPU3 in glide subroutine 810 and step 867 advantageously recognizes that the phonetic element PHE value last stored in the memory space according to step 815 by trajectory analysis (e.g. by curvature) should be replaced in appropriate instances with a glide or sequence identification value indicative of a diphthong or other glide speech sound which has been identified in step 863.

After step 867, a step 869 resets the glide flag GLF and glide number NG back to zero and the the flag is not set for glide detection again until a significant trajectory parameter again occurs in the vowel slab (cf. steps 807 and 814). If no recognizable speech sound is found in step 863, then operations branch from step 865 to step 869 as well, whence RETURN 859 is reached.

For purposes of step 863, a root position is in an identifiable glide nucleus if it lies within any of the regions in perceptual space identified as the respective glide nuclei in FIGS. 32, 32B and 32C, or 32D and 32E.

FIG. 32 shows various dipthong nuclei which occupy the Z' width of the vowel slab of FIG. 19 and have outlines in the X', Y' plane as shown.

FIGS. 32B and 32C show the w-glide nucleus from views along the X' axis and Z' axis respectively.

FIGS. 32D and 32E show the j-glide (yuh) nucleus from views along the X' axis and Z' axis respectively.

The angular orientations and the plane of the angles of offglide are tabulated in the following tables: Diphthong Table, Glide Table, and R-Coloration of Vowels Table.

DIPHTHONG TABLE
(Diphthongs as nucleus - offglide sequences)

| Phonetic Unit | Nucleus | OFFGLIDE PLANE | ANGLE |
|---|---|---|---|
| /ju/ | [ju$_n$] | x'y' | 180°–225° |
| /eI/ | [eI$_n$] | x'y' | 315°–0° |
| /aI/ | [aI$_n$] | x'y' | 316°–30° |
| /aU/ | [aU$_n$] | x'y' | 200°–315° |
| /oI/ | [oI$_n$] | x'y' | 5°–60° |
| /oU/ | [oU$_n$] | x'y' | 180°–315° |

GLIDE TABLE
(glides as nucleus - offglide sequences)

| Phonetic Unit | Nucleus | OFFGLIDE PLANE | ANGLE |
|---|---|---|---|
| /j/ | [j$_n$] | x'y' | 0°–180° |
| /w/ | [w$_n$] | x'y' | 0°–180° |

R-COLORATION OF VOWELS TABLE

| Phonetic Unit | Nucleus | OFFGLIDE PLANE | ANGLE |
|---|---|---|---|
| /or/ | [oU$_n$] | y'z' | 270°–350° |
| /ir/ | [ju$_n$] | y'z' | 200°–270° |
| /eIr/ | [eI$_n$] | y'z' | 210°–340° |
| /ar/ | [aI$_n$] | y'z' | 270°–350° |

Accordingly, CPU3 in its operations of FIGS. 33 and 34 acts as an example of a means for electronically computing a trajectory parameter from the series of coordinate values and, when both the trajectory parameter satisfies a predetermined condition for significance and a coordinate value currently reached by the speech is within a predetermined region of such values, producing a signal, for electronically analyzing the speech on the path in response to the signal for occurrence of a position in the nucleus and an offglide in said range of directions which offglide happens before another significant trajectory parameter occurs, and upon occurrence of such indicia of a glide, obtaining from the electronic memory the phonetic representation corresponding to the glide indicia.

In FIG. 35 operations in an embodiment (alternative to FIG. 26 for implementing Test Type II for a glide) are marked with 900+numbers in a manner analogous to the 800+numbers of FIG. 33 to facilitate comparison. Operations in FIG. 35 commence with a BEGIN 901 and proceed to a step 902 to set a glide flag GLF and a glide number NG to zero. Glide number NG operates as a glide timer between trajectory events in this embodiment. Next in a step 903 the coordinate values X$_p$, Y$_p$ and Z$_p$ of the latest point on the path in the mathematical space are input from CPU2 and stored in a table such as 504 of FIG. 27. Next in a step 905, a latest value of a parameter (such as curvature CURV of equation (13) or CURV1 of equation (17)) of the trajectory is computed.

Following step 905, operations proceed to a step 907 to determine whether a significant peak in CURV1 has occurred by the same table analysis procedure as described for MAGACCEL in step 505 for example.

If the test of step 907 is not passed, operations proceed to a step 908 to test the glide flag GLF. If GLF is still zero, as it is initially, then operations proceed directly to a decision step 909 where CPU3 checks an ON/OFF switch to determine whether it is to continue, and if so operations loop back to step 903. If in step 908 the glide flag had been set (as described in further operations hereinbelow), then step 908 increments the glide number NG whence step 909 is reached.

Eventually, a significant trajectory parameter value is detected in step 907 and operations proceed to a step 911 to generate an address ADR of target space storage 31 according to ADR Equation (10) hereinabove. Then in a step 913 the address ADR is asserted by CPU3 to memory 31 of FIG. 1 to obtain an identification number TZ as discussed for step 813.

Figure 36:
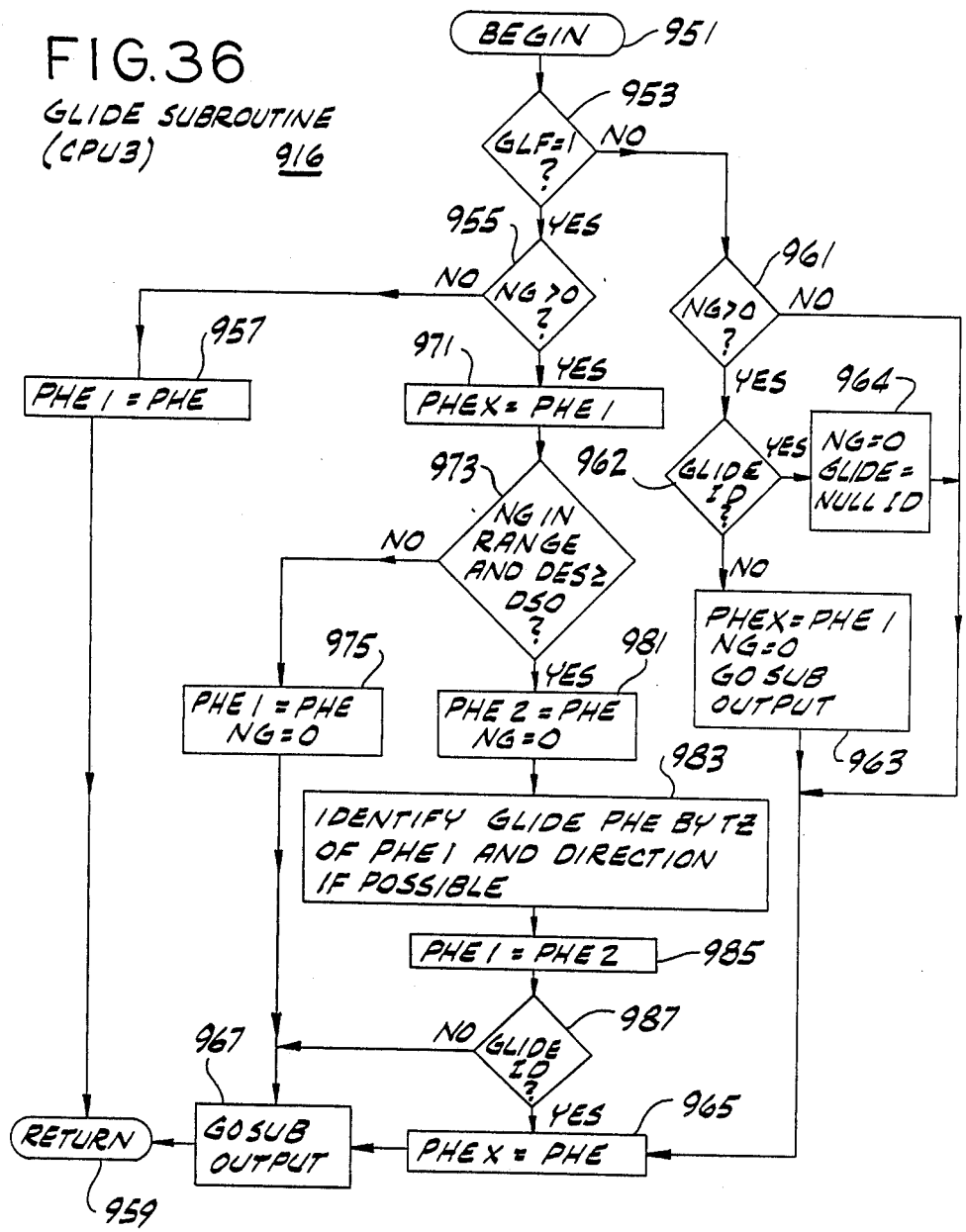
FIG. 36 is a flow diagram of inventive operations in a glide subroutine portion of FIG. 35 for the inventive glide detection method.

Then in a step 914 the table of FIG. 29 is accessed as described for step 814. Further in step 914, the glide flag GLF is set (GLF=1) if the coordinate values X$_p$, Y$_p$ and Z$_p$ are in a test region Y$_p$ greater than a predetermined value of 0.03 for example. The test region includes all glottal source target zones which encompasses the vowels and a number of the consonants from which glides may be constituted. On the other hand, if the coordinate value Y$_p$ is not in the test region, then the glide flag GLF is maintained at zero or reset to zero. A glide subroutine 916 of FIG. 36 is executed to detect any glides and output phonetic element representation(s) as appropriate, whence operations loop back to ON test 909. If CPU3 is turned off, a branch from step 909 to an END 921 is made.

In FIG. 36 operations in the Glide Subroutine 916 of FIG. 35 are described in further detail. Operations commence with a BEGIN 951 and proceed to a step 953 to test glide flag GLF. If GLF is set to one, operations proceed to test the glide number NG to determine whether it exceeds zero. Initially, NG is zero when GLF is first set by step 914 of FIG. 35, so a branch is made from step 955 of FIG. 36 to a step 957 where a first backup register PHE1 is loaded with the PHE value from step 914 table access. Then a RETURN 959 is reached so that operations continue in FIG. 35 and execute a loop through steps 909, 903, 905, 907, 908 repeatedly so that glide number NG increases with time until a significant trajectory parameter is detected in step 907 and subroutine 916 is again executed after steps 911, 913 and 914.

Figure 37:
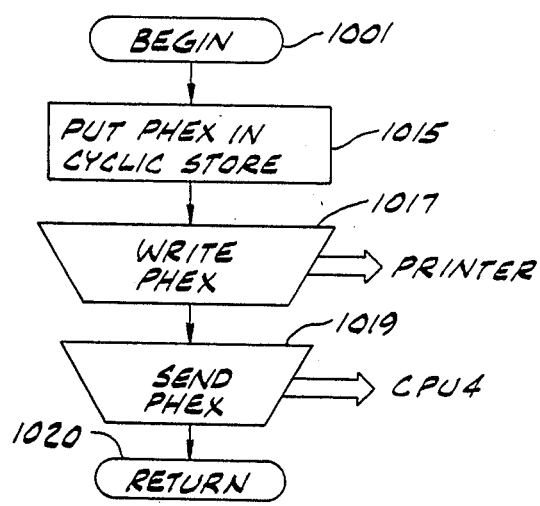
FIG. 37 is a flow diagram of operations in an output subroutine portion of FIG. 36 for the inventive glide detection method.

Operations once again enter subroutine 917 of FIG. 36. If a phonetic element outside the test region of step 914 was detected, for example, glide flag GLF is not one in step 953 and operations branch to a step 961 to test glide number NG. If NG exceeds zero, then a phonetic element in the test region may have earlier been detected but has not yet been output even though it ought to be. In such case operations proceed to a step 962 to make sure that this is not the result of a second event identification in a previous glide doublet (which ought not to be output). If there is no glide identification in step 962, operations go on to a step 963 to load first backup register PHE1 into an output subroutine register PHEX. The glide number NG is reset to zero. An output subroutine of FIG. 37 is called, as indicated by the phrase "GOSUB OUTPUT" in step 963. If there is a glide identification symbol in step 962, operations branch to a step 964 to reset glide number NG to zero and null the glide identification symbol. Since the phonetic element hypothetically found outside the test region in step 914 also should be output, operations pass from either step 963 or 964 (or directly from step 961 if NG was zero) to a step 965. Step 965 loads the phonetic element representation PHE resulting from the most recent table access in step 914 into output subroutine register PHEX. Then in a step 967, the Output subroutine of FIG. 37 is called, whence RETURN 959 is reached.

If in step 914 of FIG. 35, another PHE value in the test region had instead been found after the first one in the test region, then glide flag GLF is found to be one in step 953 of FIG. 36. Then operations proceed to step 955 where glide number NG is found to exceed zero due to above-described looping over time in FIG. 35. From step 955 operations proceed to a step 971 in which the as-yet unprinted phonetic element in backup register PHE1 is loaded into register PHEX for possible output. Next in a step 973, the value of the glide number NG is tested to determine whether it represents an interval of time between predetermined limits of a range such as 30 to 100 milliseconds and whether distance DES exceeds predetermined minimum distance DS0. If the NG number is out of range or the distance is too little, then there is no glide represented by the latest pair of phonetic element representations PHEX and PHE from table access in step 914. Consequently, the latest phonetic element PHE is stored in first backup register PHE1 in case it is part of a glide yet to be detected, and NG is reset to zero in a step 975. After step 975, the OUTPUT subroutine is executed on PHEX in step 967.

If on the other hand in step 973, the value of glide number NG indicates that a time interval in the appropriate range has elapsed between two phonetic events in the test region and distance DES is sufficient, then operations go to a step 981 to load the latest phonetic element representation PHE into a second backup register PHE2. Also in step 981, glide number NG is reset to zero whence a step 983 is reached.

Step 983 executes an important aspect of Test Type II for glides in that a Glide Table is searched to obtain and load into register PHE any glide identification which corresponds to the target zone or nucleus of the event that resulted in element PHE1 and which is associated with a direction corresponding to detected angular orientation in tabulated range. It is noted that in contrast to FIGS. 33 and 34, a pair of trajectory events is detected in step 907 of FIG. 35 before this glide identification of step 983 is undertaken. The direction is computed based on the coordinate positions of the two trajectory events that resulted in elements PHE1 and PHE2, instead of a monotonicity table as in FIGS. 34 and 34A.

After step 983, a step 985 loads the contents of PHE2 into PHE1. Then in a test step 987 if no glide was identified, a null identification exists in PHE due to step 983 and a branch is made to step 967 to output the last phonetic element loaded into PHEX in step 971. If there was a glide in step 983, then operations proceed from step 987 to step 965 to load the PHE value of the glide identification into the output subroutine register PHEX. PHEX is then output by the Output subroutine in step 967 whence RETURN 959 is reached.

In other words, CPU3 in glide subroutine 916 advantageously recognizes that the last two phonetic elements PHE1 and PHE2 value detected by trajectory analysis (e.g. by curvature) should be replaced in appropriate instances with a glide identification value PHE which has been identified in step 983.

Step 985 recognizes that latest phonetic element value in PHE2 should be and is stored in first backup register PHE1 in case it is part of a glide or another glide yet to be detected. In this way when there is no glide, the first of two phonetic element representations which were detected by trajectory analysis is output, and the second phonetic element representation is retained for later operations which determine whether it should be output as well, or regarded as part of a subsequent actual glide. When there is a glide, the glide representation is output, but the second event identification in the doublet is retained for later operations in case there is a subsequent glide.

Glide subroutine 916 as shown in FIG. 36 advantageously detects two successive glides which are constituted by successive pairs of phonetic elements to which the glides correspond. Moreover, subroutine 916 advantageously retains phonetic element representation which may be part of a glide yet to be detected even though the phonetic element was part of a latest pair which failed the glide test of step 983. And a retained phonetic element representation which turns out to be no part of a glide either is ultimately output in a subsequent pass through the subroutine 916.

As described, CPU3 acts as an example of a means for electronically selecting and supplying an event identification depending on the sound of the speech when the speech satisfies a preestablished condition, for measuring a time interval between successive times when the preestablished condition is satisfied and, when the time interval is within a predetermined range, retrieving from the electronic memory the phonetic representation corresponding to the pair of different event identifications when they have successively occurred. Further, CPU3 acts as an example of a means for generating two phonetic element representations respectively corresponding to each of first and second event identification symbols in the pair when the particular value of a derived coordinate for the speech for which the first event identification symbol is supplied is in a predetermined test region of the coordinates and not in a glide and the particular value of another derived coordinate for the speech for which the second event identification symbol is supplied is outside of the predetermined test region. Also, CPU3 acts as an example of means for determining whether any prestored phonetic element representation corresponds to an actually occurring pair having an earlier event identification and a later event identification that are consecutively supplied, and if not, then generating a phonetic element representation corresponding to the earlier event identification in the pair and retaining the later event identification for use as an earlier event identification in a later pair.

In the OUTPUT subroutine called in the glide subroutine of FIG. 36, operations commence with a BEGIN 1001 of FIG. 37. Then in a step 1015, the contents of variable PHEX are stored in a memory space or cyclic store holding PHEX values corresponding to each instance when the OUTPUT subroutine was called. In a step 1017, the latest PHEX is used to look up in a table providing instructions for writing the corresponding phonetic symbol or category code corresponding to a phone of the language to printer 33 of FIG. 1. In a next step 1019 the latest PHEX value is sent to CPU4 of FIG. 1. After step 1019 is completed, a RETURN 1020 is reached.

The present description now turns to a separate type of improvement which pertains to the sensory reference SR (also called a spectral reference herein) of step 245 in FIG. 13B. Improved methods and apparatus for computing sensory reference SR are of interest because all of the bands B1, B2 and B3 used to categorize peaks in the incoming spectra are defined in terms of ranges of $\log_{10}(f/SR)$. Therefore, the position of a peak as inside or outside of a band can importantly affect the determination of values SF1H, SF1L, SF(1), SF(2) and SF(3) which are used to compute the sensory pointer coordinates $X_s$, $Y_s$ and $Z_s$ in step 143 of FIG. 4. Moreover, the value of SR itself is directly used in the computation of the $Y_s$ coordinate according to the formula $Y_s = -\log(SF1L/SR)$.

Figure 38:
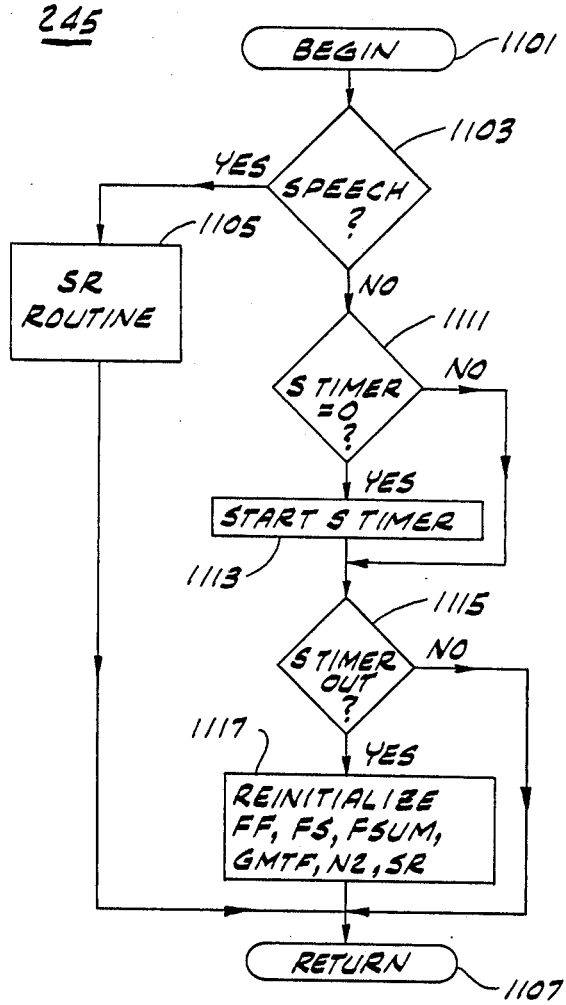
Figure 40:
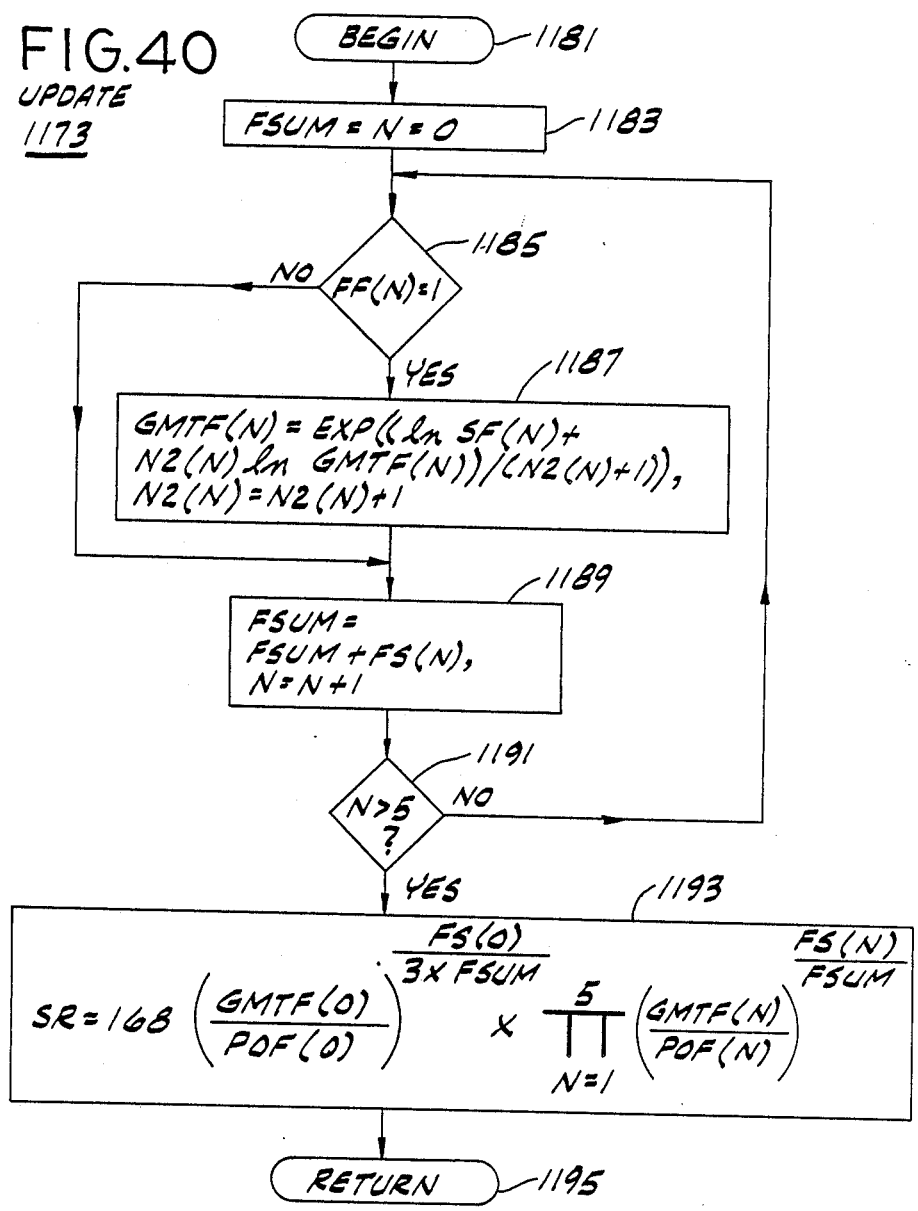

An improvement for computing SR in CPU1 of the apparatus of FIG. 1 utilizes operations as illustrated in FIGS. 38-40. Generally, these operations take account of previously computed values designated SF(1), SF(2), and SF(3), keeping track of the glottal-source or burst-friction nature of SF(2) and SF(3) by segregating the burst-friction peaks which might otherwise be designated SF(2) and SF(3) as SF(4) and SF(5) for purposes of the SR calculation. Silence and other no-speech is appropriately accounted for.

In FIG. 38 operations commence with a BEGIN 1101 and go to a step 1103 to determine whether speech is present. In step 1103 a suitable test for speech is that its loudness and goodness exceed respective predetermined levels. If so, an SR Routine 1105 is executed to update the value of sensory reference SR whence a RETURN 1107 is reached.

If step 1103 detects silence or other no-speech, then operations go to a step 1111 to test whether a timer STIMER is at zero. If so, operations start STIMER in a step 1113 whence a step 1115 is reached. If STIMER is already started in step 1111, operations bypass step 1113. Then in step 1115, a test is made to determine whether STIMER is timed out by reaching or exceeding a preset value corresponding to three (3) continuous seconds of no-speech, for example. If STIMER is not timed out, RETURN 1107 is reached directly, without affecting the SR value. However, if STIMER is timed out, then a step 1117 reinitializes a set of variables including a set of five factor flags FF(1) ... FF(5), a set of five factor summand flags (or latching factor flags) FS(1) ... FS(5), a factor sum FSUM, a set of six geometric mean values GMTF(0) ... GMTF(5), a set of six averaging divisors N2(0) ... N2(5) for computing the geometric mean values, and the sensory reference value SR itself. After step 1117 RETURN 1107 is reached. In this way, pauses in speech of a talker do not affect the SR value, and long delays between episodes of speech causes SR computation to be reinitiated as in the case of a different talker beginning to talk. CPU1 thereby acts as an example of a means for initializing the sensory reference value and electronically analyzing the sets of digital values (e.g. spectra) to determine whether sound indicative of speech is present, and if no speech is present for a predetermined period of time then reinitializing the sensory reference value and preventing any spectra of earlier speech from thereafter affecting the sensory reference value.

A set of population geometric mean values POF(0) ... POF(5) for the various formants in Hertz are estimated as listed in the following Population Mean Table and prestored in memory ROM1:

POPULATION MEAN TABLE

| Population Mean Designation | Value | Remarks |
|---|---|---|
| POF(0) | 168 | F0 |
| POF(1) | 535 | F1 |
| POF(2) | 1605 | Glottal Source F2 |
| POF(3) | 2675 | Glottal Source F3 |
| POF(4) | 2170 | Burst Friction F2 |
| POF(5) | 4285 | Burst Friction F3 |

In the initialization step 103 of FIG. 4 and reinitialization step 1117 of FIG. 38, each geometric mean value GMTF(N) is initialized to its corresponding population mean value POF(N) of Table II. Sensory reference SR is initialized to 168 Hertz for example. All other variables FF, FS, FSUM, and N2 are initialized to zero.

Speech as it heard may initially be of a glottal source type for which SR should be computed as a geometric mean on the basis of formants F0, F1, F2 and F3, that is, a fourth root of the product of four factors. If the speech is burst-friction, then SR should be a geometric mean on the basis of burst-friction formants F2 and F3 (SF(4) and SF(5)) and the latest previous value for F0 even if it be the estimate 168 Hertz, i.e. the cube root of that product. As the speech proceeds, the values should accumulate various geometric means which are used to move the initial value of SR from 168 Hertz to a computed value based on the actual talker's speech which depends on the departure of the sensed geometric means GMTF(N) of the various formants of the talker's speech relative to population values POF(N).

FIG. 39 shows a preferred embodiment for achieving the SR values in an improved way. Operations in the SR Routine 1105 commence with a BEGIN 1151 and set no-speech timer STIMER to zero in a step 1153. Then a step 1155 tests the burst-friction flag BF. If BF is set to one, then operations go to a step 1157 to set two factor flags FF(4) and FF(5) to one and to set the latching factor flags FS(4) and FS(5) to one also. If BF is not 1 in step 1155, a branch is made to a step 1159 to set factor flags FF(4) and FF(5) to zero without doing any operation on the latching factor flags FS(4) and FS(5).

After either step 1157 or 1159 operations proceed to a step 1161 to test glottal-source flag GS. If GS is set to one, then a step 1163 sets three factor flags FF(1), FF(2) and FF(3) to one and corresponding latching factor flags FS(1), FS(2) and FS(3) to one also. If GS is not 1 in step 1161, a branch is made to a step 1165 to set factor flags FF(1), FF(2) and OF(3) to zero without doing any operation on the corresponding latching factor flags. Also, since the sound is not glottal-source in nature, registers SF(4) and SF(5) are loaded with the F2 and F3 formant values SF(2) and SF(3) in preparation for calculations in FIG. 40.

After either of steps 1163 and 1165 operations go to a step 1167 to test the spectrum to determine whether it has a periodic component according to the pitch-extraction algorithm of Scheffers, M.T.M. (1983) cited hereinabove. If so, then a step 1169 sets an a periodic flag AP to zero, and sets both factor flag FF(0) and latching factor flag FS(0) to one. If the spectrum is a periodic in step 1167, then a step 1171 sets a periodic flag AP to one, and sets factor flag FF(0) to zero and sets latching factor flag FS(0) to one. This latter operation on FS(0) can be omitted if it is desired to initially exclude any stabilizing contribution by the F0 estimate when BF speech (e.g. "s" in "so") breaks a silence. However, FS(0) is set to one in step 1171 preferably to obtain this stabilizing contribution even though no actual F0 may be initially sensed.

After either step 1169 or 1171 a step 1173 updates the geometric mean values GMTF(N) and factor sum FSUM as appropriate, and provides a latest computation of sensory reference SR as described in more detail in FIG. 40. Then two steps 1175 and 1177 analyze a TF0 table for pitch modulation and augment the value of SR appropriately, as discussed in connection with steps 319 and 321 of FIG. 14, and followed by a RETURN 1179.

In FIG. 40 operations in the update routine 1173 of FIG. 39 commence with a BEGIN 1181 and then in a step 1183 initialize factor FSUM to zero and set an index N to zero in preparation for a looping series of steps 1185, 1187, 1189 and 1191.

In step 1185, a test is made of each factor flag FF(N) in turn to determine whether it is set to one. Only if the factor flag for a given factor is set, does CPU1 execute an update on the corresponding geometric mean GMTF(N) of the corresponding formant of the talker's speech. The computation of equation (6A) is generalized to the Nth formant according to the following formula:

$$GMTF(N) = EXP((\ln SF(N) + N2(N) \ln GMTF(N))/(N2(N) + 1)) \quad (6C)$$

Also, in step 1187 the averaging divisor N2 is generalized to a set of averaging divisors having values respective to each of the six geometric mean computations for index $N = 0, 1, 2, \ldots 5$. The respective averaging divisor N2(N), which was used for purposes of updating GMTF(N) in step 1187, is then incremented by one. After step 1187 (or step 1185 if FF is not set, for a given value of index N) operations go to a step 1189 to determine how many factors will participate in the final geometric mean calculation for SR. In other words this number of factors represented by FSUM determines whether a cube root, fourth, fifth, or sixth root will be needed. In step 1189, FSUM is incremented for each latest latching factor flag FS(N) which is set to 1. Also in step 1189, the index N is incremented in preparation for a test 1191. If in test 1191 index N does not exceed 5, operations loop back to step 1185 to repeat the loop based on the incremented index N.

When the loop is completed for $N = 0$ to 5 inclusive, operations go from step 1191 to a final step 1193 for computing sensory reference SR as a geometric mean which adjusts the initial value of 168 Hertz for SR to the latest updated value appropriate to the talker. By analogy with equation (6B) a first ratio GMTF(0)/POF(0) is raised to the ⅓ power (see "3" in denominator of exponent of that ratio) and then integrated into the overall geometric mean. FSUM in the denominator of each exponent of every ratio GMTF(N) signifies the root for the geometric mean. The latching flag FS(N) is one or zero depending on whether or not a given ratio is permitted to participate as a factor in the geometric mean calculation. The sensory reference SR is thus computed according to the formula:

$$SR = 168 \times (GMTF(0)/POF(0))^{(FS(0)/(3FSUM))} \times \quad (6D)$$

-continued $$\prod_{N=1}^{N=5} (GMTF(N)/POF(N))^{(FS(N)/FSUM)}$$

Upon completion of step 1193, a RETURN 1195 is reached and operations continue with step 133 of FIG. 4 in the overall operations of CPU1 of FIG. 1.

CPU1 as described thus advantageously electronically generates a signal representing a sensory reference value over time as a function of frequencies of a plurality of peaks in each of a plurality of the frequency spectra. CPU1 also electronically generates the signal to represent the sensory reference value over time as a function of respective ratios of the frequencies of a plurality of peaks in each of a plurality of the frequency spectra to predetermined frequency values corresponding to population averages for the peaks. CPU1 also detects the presence of a spectrum having peaks and indicative of a burst friction sound when such sound is present and electronically generates the signal to represent the sensory reference value over time as a function of respective ratios of the frequencies of two of the peaks indicative of the burst friction sound to predetermined frequency values corresponding to a population averages for the two peaks. It also detects the presence of a spectrum having peaks and indicative of a glottal source sound when such sound is present and electronically generates the signal to represent the sensory reference value over time as a function of the frequency of at least one of the peaks associated with the spectrum of the glottal source sound.

Still further it electronically generates the signal to represent the sensory reference value over time as a function of a fundamental frequency of the spectrum when the detecting step indicates that the spectrum includes a periodic component. Additionally, it recursively electronically computes respective geometric means of frequencies of a plurality of peaks in each of a plurality of the frequency spectra and then electronically computes the sensory reference value as a function of the recursively computed geometric means. Moreover, it electronically computes the sensory reference as a function of a geometric mean of factors which are functions of first, second, and third frequencies corresponding to first, second, and third formant peaks in the sets of digital values for spectra of glottal source sounds and of fourth and fifth frequencies corresponding to second and third formant peaks in the sets of digital values for spectra of burst friction sounds. The geometric mean of factors also includes a factor which is a function of a fundamental frequency of spectra that include a periodic component.

The sensory reference value is repeatedly computed and CPU1 selectively stores in respective locations in memory representing the different formants the values of frequency of different peaks in a spectrum wherein the respective memory location in which the frequency value of a given peak is stored depends on whether the peak lies in one or more defined bands of frequencies, the bands being defined as a function of a value of the sensory reference which has already been computed prior to said selective storing of frequencies of the formant peaks for use in computing a subsequent value of the sensory reference. Also, the sensory reference value is computed to include a geometric mean of factors corresponding to particular characteristics of speech sounds including periodicity, glottal source spectral features, and burst friction spectral features. The factors are introduced and retained in the same order in which speech sounds having the particular characteristics initially occur.

Figure 41:
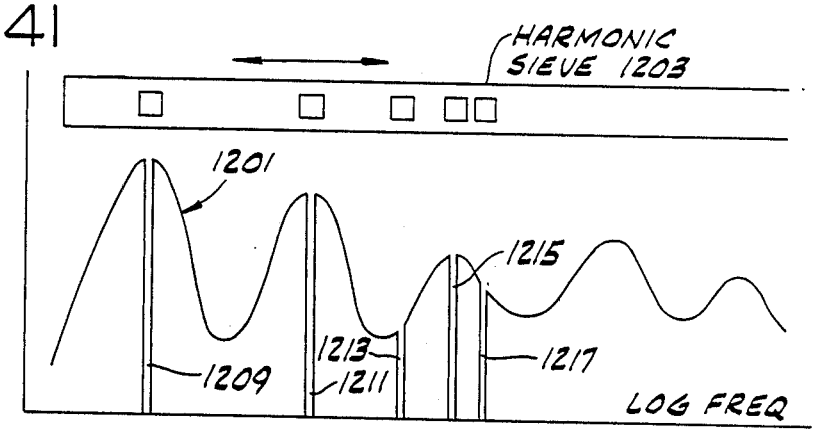
FIGS. 41, 42, 43 and 44 are diagrams of decibels versus log-frequency for illustrating a method of separating a spectrum of speech of FIG. 41 by use of a harmonic sieve to detect a periodic line spectrum of FIG. 42 and then produce a smoothed periodic spectrum of FIG. 43 and a smoothed spectrum of FIG. 44.
Figure 42:
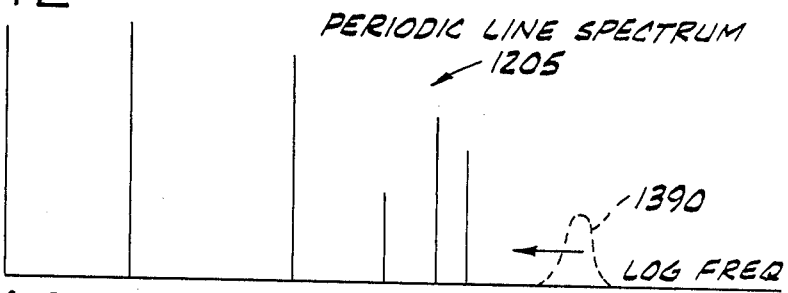
Figure 43:
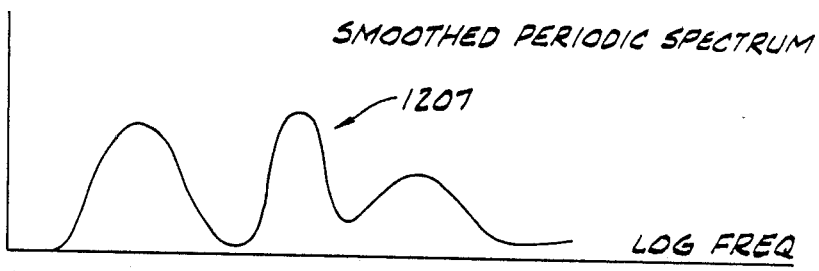

FIGS. 41-44 illustrate a method for processing a latest incoming spectrum 1201 of FIG. 41 by a harmonic sieve (conceptually indicated as a movable template 1203 in the frequency domain) to obtain a periodic line spectrum 1205 of FIG. 42 which is smoothed to produce a smoothed periodic spectrum 1207 of FIG. 43. The periodic line spectrum 1205 is subtracted from the spectrum 1201 of FIG. 41 as indicated by empty segments 1209, 1211, 1213, 1215 and 1217. The spectrum 1201 with the empty segments is then smoothed to produce a smoothed aperiodic spectrum 1221 of FIG. 44. In this way, it is advantageously recognized that spectrum 1201 in general comprises a periodic spectrum 1207 and an aperiodic spectrum 1221 at the same time.

In whispered speech the aperiodic spectrum 1221 predominates and the periodic spectrum has low loudness. In voiced speech the periodic spectrum 1207 predominates and the aperiodic spectrum has low loudness. In breathy speech both the periodic and aperiodic spectra are present with significant loudness. In general, the periodic spectrum can have either a glottal-source GS characteristic or a burst-friction BF characteristic depending on whether or not the first formant P1 is present. Likewise, the aperiodic spectrum can have either a glottal-source GS characteristic or a burst-friction BF characteristic depending on whether or not the first formant P1 is present. Next follows further description of operations for processing the incoming waveform.

Figure 45:
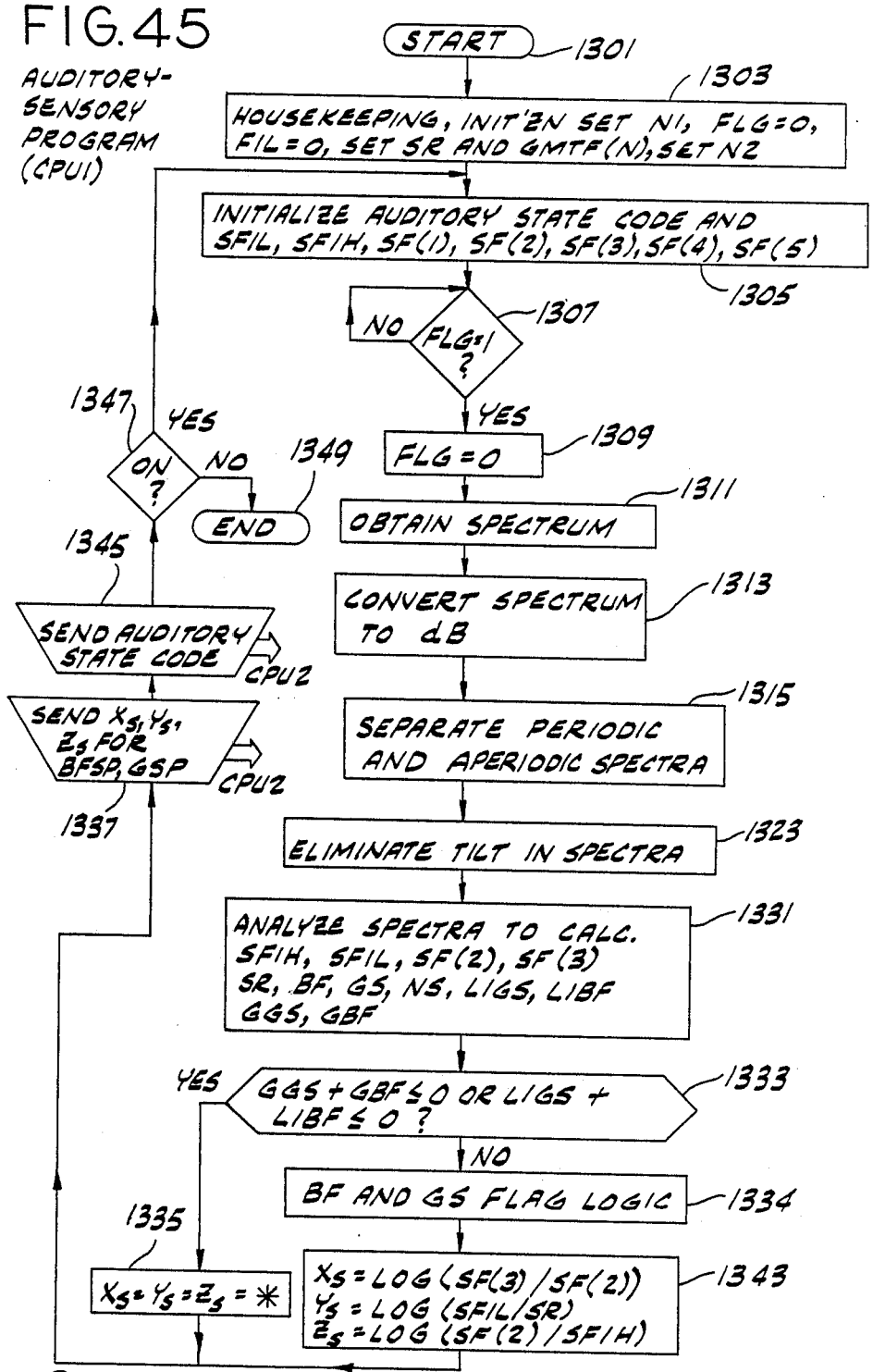
FIG. 45 is a flow diagram of inventive operations according to a more detailed version of FIG. 4 for the main routine of CPU1 of FIG. 1.

In FIG. 45, operations, according to an improvement of those of FIG. 4, commence with a START 1301 and housekeeping and initialization 1303, 1305, 1307 and 1309 as described for steps 101, 103, 105, 107 and 109 of FIG. 4.

Next in a step 1311 CPU1 computes a FFT (Fast Fourier Transform) spectrum with a resolution of 2 to 5 Hertz on a current window sample. For example, with a sampling rate of 20,000 Hertz, there are 20 samples per millisecond. Using a 24 millisecond Kaiser-Bessel window, there are 480 samples. For computation purposes, the 24 milliseconds is then padded out with enough zeros to form an effective transformable time domain function having 8192 (8K) points, or about 410 milliseconds (2.5 Hertz resolution). Accordingly, the Fast Fourier Transform is computed on the 480 samples plus 7712 zeros in step 1311. In this way a spectrum with a resolution below 50 Hertz and preferably below 30 Hertz and even 10 Hertz is advantageously obtained so that the periodic (harmonic) spectrum of the speech can be separated from the aperiodic spectrum without confusion with the line spacing in the Fourier Transform itself.

Next a step 1313 converts the spectrum so derived to decibels as discussed in connection with step 121.

A step 1315 separates the periodic and aperiodic spectra as discussed in connection with FIGS. 41-44 to obtain a smoothed periodic spectrum 1207 and a smoothed aperiodic spectrum 1221 corresponding to the latest incoming spectrum from step 1311. The separation process utilizes, for example, a harmonics sieve procedure described in the Scheffers article cited hereinabove, or any other procedure which suffices to accomplish the separation.

As described by Scheffers:

"The harmonics sieve has meshes at the harmonic frequencies $f_n = nf_o$ with n=1 to N. Each mesh has a width of 8% of the frequency to which it corresponds in order to allow for frequency shifts up to 4%. Successive meshes are not allowed to overlap. This restricts the number N of meshes to 12. The set of harmonic numbers that best fits the set of resolved component frequencies, can be determined by using the sieve. To this end the sieve is successively set at a number of positions in respect to the components. Each position is fully characterized by the fundamental of the sieve which varies from 50-500 Hz. A step size between successive positions of 3% of the fundamental frequency is chosen so that there is a slight overlap to minimize the chance of a component being missed.

"At each position (i) a criterion value is calculated for the match of the sieve in this position to the set of components. This criterion is basically a measure of the difference between the pattern of the sieve and that of the resolved components. The value is diminished for each component that passes a mesh and augmented (a) for each component that cannot pass a mesh (a spurious component) and (b) for each mesh through which no component passes (a missing harmonic). The last decision cannot be taken for components with frequencies above the frequency to which the 12th mesh corresponds. These components are therefore disregarded in the criterion. The same is done for empty meshes above the highest one through which a component passes. The mathematics underlying the criterion are extensively described by Duifhuis et al. (1982). The criterion[1] is given in Eq. (1).

$$C_i = [(H_i - P_i) + (R_i - P_i)]/P_i \quad (1)$$

"In this equation $P_i$ equals the number of components that pass the sieve in this position i, $H_i$ equals the harmonic number of the highest mesh through which a component passes and $R_i$ equals the number of resolved components minus the number of components with a frequency above that of the 12th harmonic at position i. Note that $(H_i - P_i)$ equals the number of missing harmonics for the fundamental of the sieve in this position and that $(R_i - P_i)$ equals the number of components that are rejected as harmonics of that fundamental. That position of the sieve which obtains the lowest criterion value is regarded as the best fit. Each signal component that passes a mesh of the sieve in this position is labeled with the harmonic number of that particular mesh. A more accurate estimate of the best fitting fundamental than the fundamental of the sieve at the best fitting position, is then calculated by means of the maximum likelihood estimate of Eq.(2) (Goldstein, 1973).

$$f_o = \mathop{\mathrm{SUM}}_{j=1}^{p}(X_j N_j) / \mathop{\mathrm{SUM}}_{j=1}^{p}(N_j^2). \quad (2)$$

In this equation $X_j$ equals the estimated frequency of the component that passes the mesh with harmonic number $N_j$ and P equals the number of components that are accepted as harmonics.

"The criterion described above, works well on signals in which three or more low harmonics can be detected. However, errors occur on signals in which a number of low harmonics are missing, e.g., typical psychoacoustical stimuli, 'telephone' speech, or vowel sounds that are partially masked by noise. It can be seen from Eq. (1) that for such signals a higher pitch than the correct one is favored by the criterion in order to reduce the number of empty meshes. The C value of a complex comprising the harmonics 6, 7, and 8 for example, equals 1.67 for the fundamental but 1.5 for the octave. These errors can be avoided by incorporating not only the highest harmonic number (H) assigned to a component, but also the lowest one (L), and considering the maximal number of harmonics to be found: $M = H - L + 1$. To indicate the difference with respect to the criterion of the DWS meter a 'quality' measure $Q_i$ of a fit is introduced at this point[2]. It is given in Eq. (3). Now, that position which obtains the highest Q value is considered as the best fit:

$$Q_i = P_i/(M_i + R_i). \quad (3)$$

... "In most cases only one optimal fit of the sieve is found. When the signal is heavily disturbed, however, two or more fits of the sieve sometimes obtain the highest Q value. The lowest estimate is in these cases taken for the pitch ... " Scheffers at pp. 1719, 1720.

Figure 46:
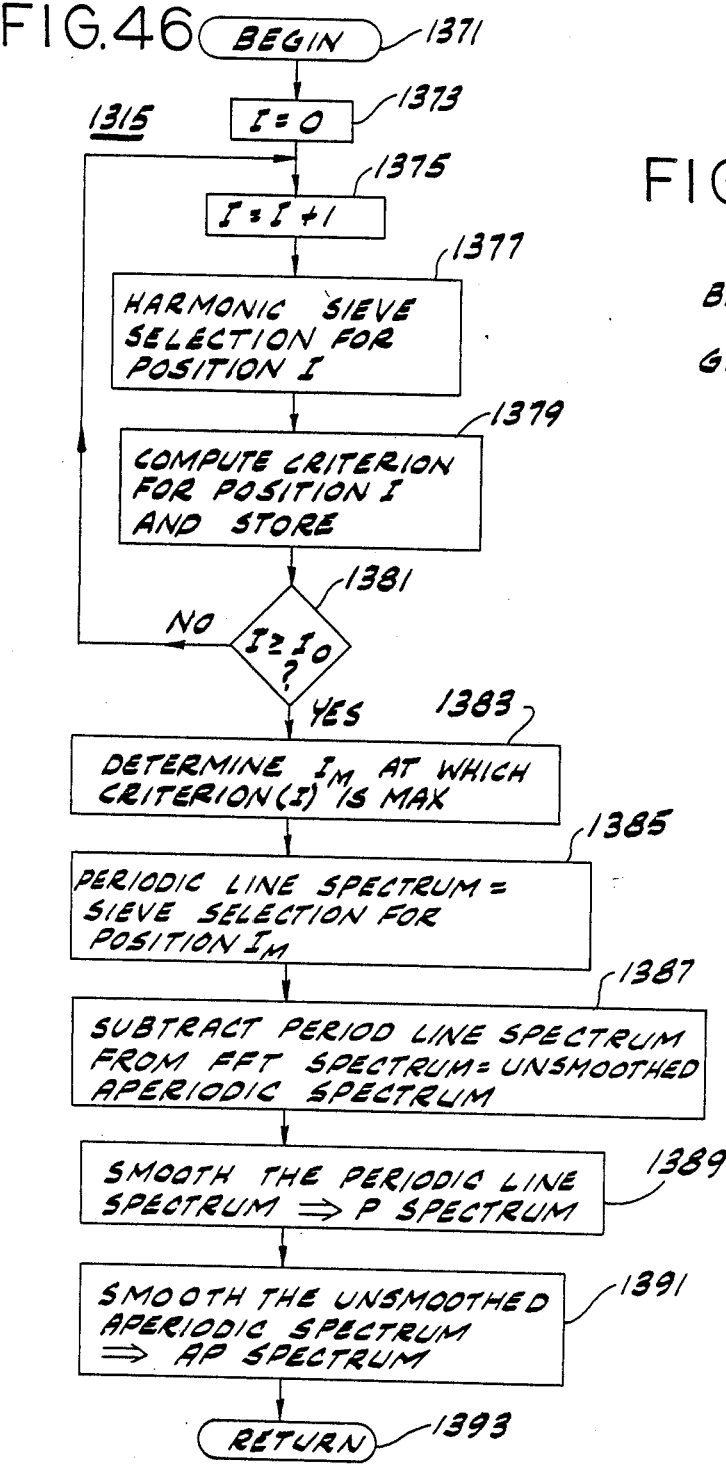
FIG. 46 is a flow diagram of inventive operations of a step in FIG. 45 for separating periodic and a periodic spectra shown in FIGS. 41–44.

A further detail of the inventive operations in step 1315 in FIG. 46 commences with a BEGIN 1371 and proceeds to initialize an index I to zero in a step 1373. Then in a step 1375, the index I is incremented by 1. In a step 1377 a harmonic sieve selection from the spectrum 1201 of FIG. 41 is made using a predetermined sieve 1203 such as the 12 frequency sieve of Scheffers and having a first sieve frequency which is a function of index I (e.g. 10 Hertz steps in the range 50–500 Hz. wherein first sieve frequency is $F = 40 + 10 \times I$ and I goes from 1 to $I_o = 46$).

In a step 1379, a criterion such as Q of Scheffers is computed and stored in a table according to index I. A test step 1381 determines whether index I equals or exceeds the index value $I_o$ (e.g. 46) for the upper end of the range. If not, operations loop back to step 1375 until the sieve has been slid along the spectrum through its range 50–500 Hertz. Then in a step 1383, the table of criterion values Q is searched for the maximum value, and the corresponding index $I_M$ is determined.

In a further step 1385, the harmonic sieve is applied to spectrum 1201 at the value of the index $I = I_M$ for which the criterion Q was maximum. In this way, the periodic line spectrum 1205 of FIG. 42 is obtained and temporarily stored. Then in a step 1387, the periodic line spectrum is subtracted from the spectrum 1201 of FIG. 41 resulting in an unsmoothed aperiodic spectrum with empty segments 1209, 1211, 1213, 1215 and 1217 as shown in FIG. 41 and stored separately.

After step 1387, a step 1389 of FIG. 46 smooths the periodic line spectrum 1205 of FIG. 42 by convolving it with a predetermined bell-shaped distribution of stored values 1390 (see FIG. 42), and storing the resulting smoothed spectrum as spectrum 1207 of FIG. 43.

Figure 44:
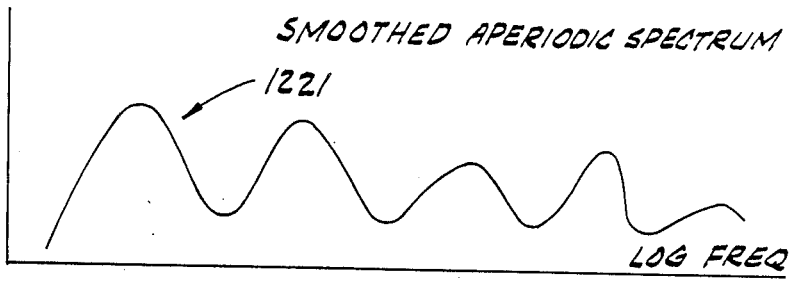

Similarly, in a step 1391 the unsmoothed aperiodic spectrum of FIG. 41 with the empty segments is smoothed to produce smoothed aperiodic spectrum 1221 of FIG. 44 and stored, whence a RETURN 1393 is reached.

Operations return to FIG. 45 and continue with a step 1323 analogous to step 123 of FIG. 4 wherein the periodic spectrum and aperiodic spectrum are processed to eliminate tilt from each.

It is contemplated that the skilled worker provide sufficient computer speed in CPU1 or provide an auxiliary DMA (direct memory access) processor to accomplish the processing described for the various operations detailed herein.

Continuing in FIG. 45, operations execute a step 1331 by executing the operations of FIGS. 13A and 13B first for the smoothed periodic P spectrum and then for the smoothed aperiodic AP spectrum obtained as hereinabove-described. The various values and flags respective to the two spectra are separately stored temporarily.

Two steps 1333 and 1335 are analogous to steps 133 and 135 of FIG. 4. A further step 1334 provides BF and GS flag logic to determine that the proper spectrum or spectra are used in a step 1343 to compute the sensory pointer coordinates for each of glottal source and burst friction pointers BFSP and GFSP. These are output and operations occur in steps 1337, 345, 1347 and 1349 which are analogous to steps 137, 145, 147 and 149 of FIG. 4.

Returning to step 1334 it is noted that for many speech sounds the aperiodic AP spectrum lacks a first formant F1 and analysis of it in step 1331 therefore results in the burst-friction flag BF being set. Also, in many speech sounds the periodic P spectrum has a first formant F1, causing glottal-source flag GS to be set in step 1331. Still other sounds have both glottal source and burst friction components occurring simultaneously, as in "V" or "Z". In general, for these speech sounds the aperiodic AP spectrum provides the values for computation of the coordinates $X_s$, $Y_s$ and $Z_s$ of the burst-friction sensory pointer BFSP and the periodic P spectrum provides the values for computation of the coordinates $X_s$, $Y_s$ and $Z_s$ of the glottal source sensory pointer GSSP. For sounds in which the glottal source component predominates, and the burst friction component is weak or nonexistent, the BFSP, if computed, exerts a negligible influence since its loudness is low or zero. For sounds in which the burst frction component predominates, and the glottal source component is weak or nonexistent, the GSSP, if computed, exerts a negligible influence since its loudness is low or zero. If the skilled worker elects, a loudness test can be provided in step 1334 to turn off the BF or GS flag respective to a given AP or P spectrum if the AP or P spectrum respectively falls below a predetermined loudness level, instead of relying on low loudness to eliminate the influence of the weak spectrum in the difference equations (9A-C) and (9A'-C').

Figure 47:
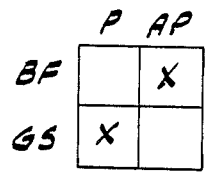
FIG. 47 is a table showing one example of burst friction and glottal source flag values determined according to operations of FIGS. 13A and 13B for each of the periodic and a periodic spectra separated according to the operations of FIG. 46.

A table of FIG. 47 illustrates that ordinarily when both the BF and GS flags are set, they correspond to the aperiodic AP spectrum and periodic P spectrum respectively. However, it is possible in cases of breathy speech and some electronically synthesized speech for both the aperiodic AP spectrum and periodic P spectrum to turn on the same flag (e.g. GS). In step 1334, a logic sequence searches the table of FIG. 47 to determine whether either row of the table indicates that the same flag is set for both the P and AP spectra. Ordinarily, as illustrated in FIG. 47, this does not occur. If the same flag is set for both spectra, however, then a test for greater loudness is executed in step 1334 to determine which spectrum P or AP should be used in step 1343 to compute the coordinates for the sensory pointer (e.g. GSSP) associated with that flag. In this way, the spectrum with the greater loudness is used to determine the BF or GS nature of the sound.

CPU1 thus electronically produces sets of values representing both a periodic spectrum and an aperiodic spectrum from one of the frequency spectra of the speech and generates two sets of signals representing a glottal-source sensory pointer position and a burst-friction sensory pointer position from the sets of values representing the periodic spectrum and the aperiodic spectrum. CPU2 electrically derives coordinate values on a path of a perceptual pointer from both the glottal-source sensory pointer position and burst-friction sensory pointer position.

Figure 48:
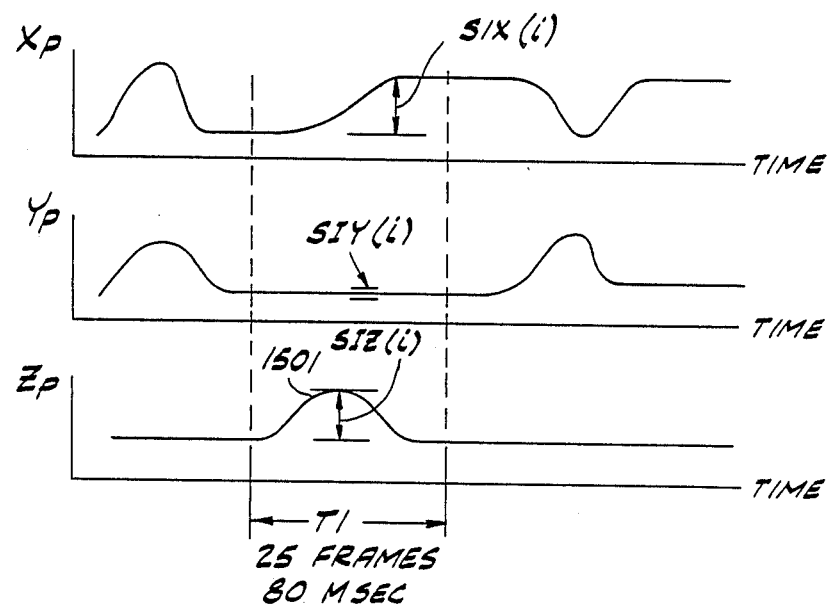
FIG. 48 shows three hypothetical graphs of values in mathematical perceptual space for three coordinates over time, for use in describing inventive operations involving an alternative segmentation index approach to deriving a trajectory parameter in FIG. 26, 33 or 35.

FIG. 48 illustrates a segmentation index method of computing a segmentation index (SI) value from three series of coordinate values for the primed coordinates $X'_p$, $Y'_p$, and $Z'_p$ (see FIG. 18). Processor CPU3 of FIG. 1 generates a segmentation index signal representing a function of the differences between the greatest and the least primed coordinate value occurring in a time period encompassing a predetermined number of time intervals of the speech for which spectra are computed. CPU3 computes each segmentation value represented by the signal as weighted sum of respective differences SIX(i), SIY(i), SIZ(i) for each primed coordinate between the greatest and the least value for the respective primed coordinate occurring in a time period encompassing a predetermined number of the time intervals.

For example, this means that if a peak (local maximum) occurs and is centered in the window, the applicable difference in the window for the coordinate in which the peak occurs is the difference between the top of the peak and the least value in the window, even if a higher peak is also in the window. If a dip (local minimum) occurs and is centered in the window, the difference in the window for the coordinate in which the dip occurs is the difference between the bottom of the dip and the largest value in the window, even if a deeper dip is also in the window.

Two weights W1 and W2 for coordinates $X'_p$ and $Y'_p$ are set to unity and a weight W3 for coordinate $Z'_p$ is set to unity if $Z'_p$ exceeds 0.6 and otherwise is set to a value of $3/Z'_i$. Thus, the weight W3 is an inverse function over a range of values of that Z' coordinate. As a new peak 1501 in FIG. 48 occurs in any of the three series of values, it is identified when it becomes centered in an 80 millisecond window time period T1, and the segmentation index signal SI is generated in response to an occurrence of the peak, with the time period encompassing a peak time when the peak occurs and the peak time being approximately centered in the window time period for purposes of the segmentation index relating to its corresponding peak 1501.

Figure 49:
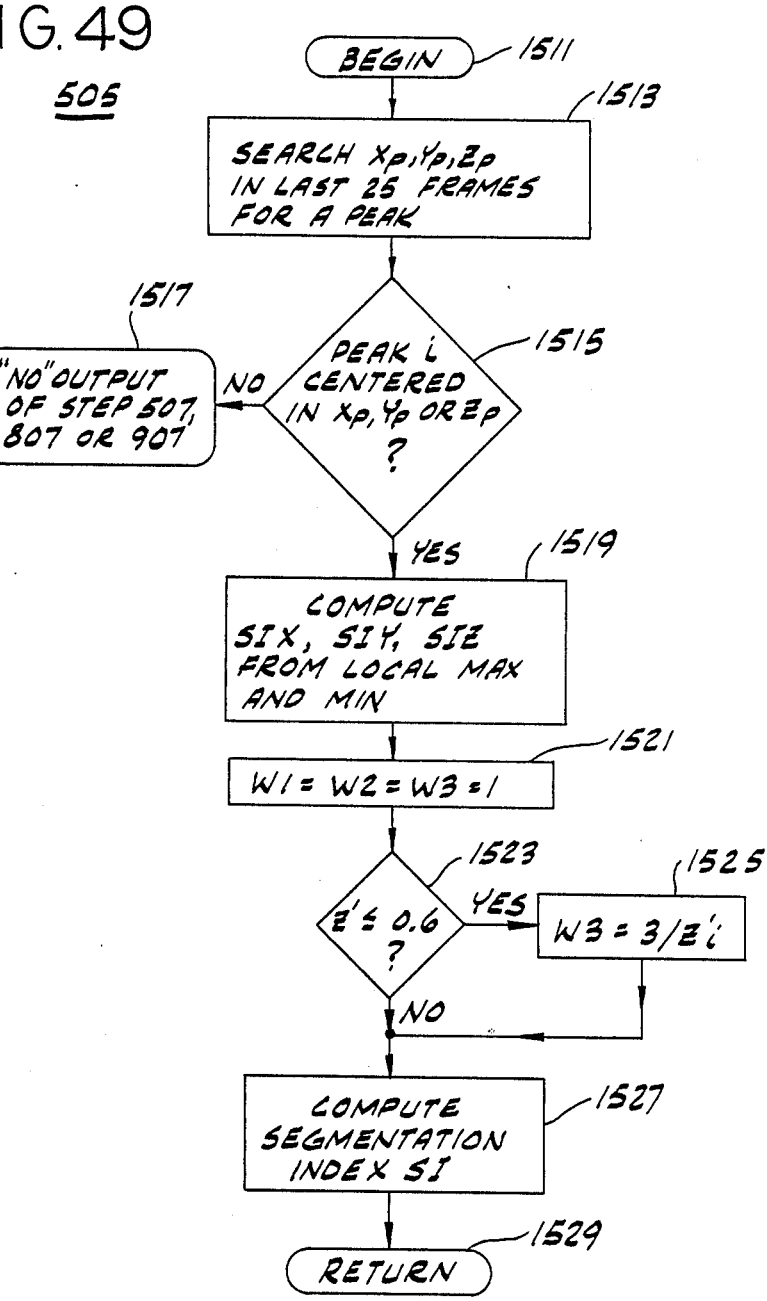
FIG. 49 is a flow diagram of inventive operations for the alternative segmentation index approach to deriving a trajectory parameter in FIG. 26, 33 or 35.

In FIG. 49 operations in an alternative version of any of steps 505, 805 or 905 of FIGS. 26, 33, or 35 respectively, commence with a BEGIN 1511. Then in a step 1513 CPU3 searches the three series of values for $X'_p$, $Y'_p$, and $Z'_p$ for a peak in any of them. Next, a step 1515 tests to determine whether the peak is centered yet in the last 25 frames (or number of frames corresponding to a desired window time period). If not, operations branch to a point 1517 representing the "NO" output of step 507, 807, or 907 of FIGS. 26, 33 or 35 respectively since there is no significant trajectory parameter at this time. However, when the peak is centered as determined by test 1515, operations proceed to a step 1519 to compute respective differences SIX(i), SIY(i), SIZ(i) for each coordinate between the local maximum and minimum values in the window. A step 1521 sets each of the weights W1, W2 and W3 to unity. However, if the value of Z' is between the origin and the vowel slab of FIG. 19 (Z' less than or equal to 0.6) then a branch is made to a step 1525 to set W3 to the abovementioned inverse function of the Z coordinate value of the latest centered peak 1501. After either of steps 1523 or 1525, operations proceed to a step 1527 to compute the segmentation index SI according to the formula:

$$SI = W1 \times SIX(i) + W2 \times SIY(i) + W3 \times SIZ(i) \tag{21}$$

After step 1527 a RETURN 1529 is reached, completing the generation of the segmentation index signal. Then in steps 507, 807 or 907 the segmentation index represented by the signal is compared with a preset reference value of approximately 0.10. If the segmentation index exceeds the reference value, a significant trajectory parameter is considered to exist for segmentation purposes in analyzing the speech to be recognized.

A system (not shown) for studying target zones for refining system 1 from examples of talkers' speech displays and analyzes the target zones in three-dimensional display of the mathematical space. Such a system has an Evans and Sutherland PS300 Graphic System and a VAX-750 or uVAX-II computer, a special purpose "coordinate transformer" and appropriate peripherals that allow three-dimensional viewing of line figures. Features of the display include knob control of "zoom", and knob control of rotation or translation relative to the system's axe.

The mathematical space, or auditory-perceptual space is displayed with axes. Three-dimensional target zones are created with a programs in the system. A target zone can be located in the space with a specified color, orientation and size as well as with a phonetic symbol located near it as desired.

To display the path of the sensory pointer, a quadruple set of values F0, F1, F2, F3 is entered for each time t at which time the fundamental and the first three spectral prominences are estimated using current speech-analysis techniques. These quadruples comprise a file. Next a value of a constant a is selected and quadruples (t, log (F3/F2), log (F1/R), log (F2/F1) are formed, where is a reference. These are the logarithms of the formant ratios and comprise a second file. When F1 is not defined log (F1/R) is arbitrarily set to zero. Next, linear interpolation is performed by the computer to provide a file of the quadruples spaced at 5 or 10 millisecond intervals. A line segment connecting each set of coordinates can be displayed at user option. On the tip of each such segment a pyramid, appropriately oriented is displayed to represent the sensory pointer. The line segments and pyramids are stored in a third file. The mathematical space is displayed with appropriate selection of target zones. The user selects a sensory path, e.g. the syllable "dud" as spoken by a particular speaker. Then a rate of display, such as five times real time, is selected and the run is started. The displays shows the sensory pointer moving through the mathematical space, and its path is shown by the segments.

The interpolated log ratio file is converted into a table representing perceptual coordinates by applying the sensory-perceptual transformation to the sensory coordinates. n-resonators (second order) serve as the transformation. In this way, certain rates of spectral modulation are emphasized and others attenuated. These are stored in a fourth file. The perceptual path is displayed in the same way as the sensory path.

Further programs enable the study of the magnitudes of velocity v, acceleration a, and curvature k as either the sensory pointer or perceptual pointer moves through the space. Appropriately scaled displays permit viewing of x, y, x, v, a, and k as a function of time or to view similarly log (F3), log (F2), log (F1), log (F0), v, a, and k as a function of time. In this way, one can study sensory and perceptual paths to discover the correlates of the phoneme and syllable. Knob control of a cursor permits marking points of interest and determination of the values of the coordinates and dynamic parameters at those points. Modeling of the sensory-perceptual transformation as a single second-order resonator with a center frequency of 55 Hz. and a damping factor of 0.6 results in perceptual paths that are orderly and reasonable, although experimental refinements can be made.

Further features involving top-down processing are now discussed. The importance of top-down processing in a great many listening situations is significant, and the separation of the perceptual and sensory aspects of phonetic processing advantageously permits top-down processing by CPU2, CPU3 and/or CPU4. For example, information derived by the system by pattern recognition apparatus, prestorage or other means is suitably used to generate additional contributions in Equations 9A, 9B and 9C that attract the perceptual pointer toward particular target zones. In this way, the perceptual pointer is driven not only by the sensory pointer(s) and the other factors previously mentioned, but also by the other information derived by the system as they are controlled by context, knowledge of the language, and so on. Another form of top-down processing involves information such as visual cues and information from other senses resulting in attractive or repulsive forces on the perceptual pointer. For example, mouth movements can be observed by pattern recognition apparatus and used to add forces that attract the perceptual pointer PP to various target zones and thus influence phonetic perception. Even more complicated forms of top-down processing are contemplated. For example, the sizes and shapes of the target zones are changed depending on the speech characteristics of the talker such as having a foreign accent, deaf speech, and so on.

Additional kinds of top-down processing are introduced as the output of the auditory-perceptual space undergoes additional processing such as that required for the identification of words and meanings. For instance, in CPU3 memory 31 in such embodiments, the PHE information prestored in the memory is accompanied by confidence level information bits representing a confidence between 0 and 1. PHE information for volume elements deep in the interior of a target zone has a high confidence, and PHE information for volume elements near the surface of a target zone has a low confidence. The confidence information derived from the target zones when a peak in acceleration magnitude occurs is compared with confidence information derived from the pattern recognition apparatus and a decision is made as to the most probable interpretation of the speech. Similar analyses are executed in embodiments of the invention at the lexical access level by CPU4 to identify words and meanings.

In other embodiments of the invention, CPU3 forms and refines the target zones in memory 31 automatically. Streams of speech are fed to the system 1 and phonetically significant events identify addresses in memory 31. CPU3 tabulates the frequencies of events in regions of the memory and assigns distinctive binary category codes to regions having clusters of events. The category codes are listed in a table, and the skilled worker assigns conventional phonetic symbols to the tabulated category codes generated by the system, so that the system prints out the conventional symbols needed for human interpretation of the category codes generated by the system in a manner analogous to teaching the system to spell at a phonetic element level.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Speech processing apparatus comprising:
means for electronically deriving from speech over time a series of coordinate values representing positions of points on a path in a mathematical space which path positions represent the speech;
electronic memory means for prestoring phonetic representations in correspondence with indicia of a glide in the path which indicia represent a nucleus in the space at which the glide begins and a range of directions from the nucleus; and
means for electronically computing a trajectory parameter from the series of coordinate values and, when both the trajectory parameter satisfies a predetermined condition for significance and at least one of the coordinate values currently reached by the speech is within a predetermined region of such values, producing a signal, for electronically analyzing the speech on the path in response to the signal and, upon occurrence of a point position in the nucleus and an offglide on the path in said range of directions which offglide happens before another significant trajectory parameter occurs, obtaining from said electronic memory means the phonetic representation corresponding to the glide indicia.

2. Speech processing apparatus as set forth in claim 1 wherein said electronic computing and analyzing means includes means for electronically computing computing a numeric value indicative of direction of the offglide along the path beginning with the position where the trajectory parameter resulted in said signal when the coordinate values for at least one coordinate along the path are monotonic for a predetermined period of time beginning with the position where the trajectory parameter resulted in the signal.

3. Speech processing apparatus comprising:
means for electronically deriving frequency spectra from speech in successive time intervals respectively and for computing a series of coordinate values of points on a path in a mathematical space form the frequency spectra of the speech; and
means, connected to said means for electronically deriving and computing, for generating a segmentation index signal representing a function of the difference between the greatest and the least of the coordinate values in a time period encompassing a predetermined number of the time intervals.

4. Speech processing apparatus as set forth in claim 3 further comprising memory means for holding prestored information indicative of different phonetic representations corresponding to respective sets of addresses in the memory, and means for identifying coordinate values approximating at least one position along the path where the segmentation index value exceeds a predetermined value, generating a memory address as a function of the position coordinate values and obtaining from said memory means the phonetic representation information prestored at that memory address.

5. Speech processing apparatus as set forth in claim 3 wherein the series of coordinate values of points on the path includes three series of values for three coordinates respectively and said means for generating a segmentation index signal includes means for computing each segmentation value represented by the signal as a weighted sum of respective differences for each coordinate between the greatest and the least value for the respective coordinate occurring in a time period encompassing a predetermined number of the time intervals.

6. Speech processing apparatus as set forth in claim 3 wherein the series of coordinate values of points on the path includes three series of values for three coordinates respectively and said means for generating a segmentation index signal includes means for computing each segmentation value represented by the signal as a weighted sum of respective differences for each coordinate between the greatest and the least value for the respective coordinate occurring in a time period encompassing a predetermined number of the time intervals, the weight for one of the coordinates being a function of coordinate value for that coordinate.

7. Speech processing apparatus as set forth in claim 6 wherein the weight function is inverse over a range of coordinate values for the coordinate to which it relates.

8. Speech processing apparatus as set forth in claim 3 wherein said means for generating a segmentation index signal includes means for indentifying a peak in the series of values and generating the segmentation index signal in response to an occurrence of the peak, with the time period encompassing a peak time when the peak occurs and the peak time being approximately centered in said time period.

9. Speech processing apparatus as set forth in claim 3 wherein the series of coordinate values of points on the path includes a plurality of series of values for a plurality of coordinates respectively and said means for generating a segmentation index signal includes means for identifying peaks as they occur in any of the plurality of series of values and generating the segmentation index signal in response to an occurrence of each peak, with the time period successively encompassing each of successive peak times when each peak occurs and each peak time being approximately centered in said time period for purposes of the segmentation index relating to its corresponding peak.

10. Speech processing apparatus as set forth in claim 3 further comprising means for prestoring phonetic representations in correspondence with indicia of a glide in the path which indicia represent a nucleus in the space at which the glide begins and a range of directions from the nucleus, wherein said means for generating a segmentation index signal includes means for electronically analyzing subsequent positions of the speech on the path in response to the segmentation index signal exceeding a predetermined value and, upon an occurrence of a glide beginning in the nucleus and moving in a direction in the range before another such segmentation index signal occurs, obtaining from the electronic memory the phonetic representation corresponding to the glide indicia.

11. A speech processing method comprising the steps of:
electronically deriving from speech over time a series of coordinate values representing positions of points on a path in a mathematical space which path positions represent the speech;
electrically computing a trajectory parameter from the series of coordinate values and, when both the trajectory parameter satisfies a predetermined condition for significance and at least one of the coordinate values currently reached by the speech is within a predetermined region of such values, producing a signal;
electronically analyzing the speech on the path in response to the signal for occurrence of a glide including a position in a predetermined nucleus in the space and an offglide on the path in a predetermined range of directions which offglide happens before another significant trajectory parameter occurs; and
upon said occurrence, producing a corresponding phonetic representation of the glide.

12. A speech processing method as set forth in claim 11 wherein said electronic analyzing step includes the step of electronically computing a numeric value indicative of the direction of motion along the path beginning with the position where the trajectory parameter resulted in the signal.

13. A speech processing method as set forth in claim 11 wherein said electronic analyzing step includes the step of electronically determining whether the motion along the path is monotonic for a predetermined period of time beginning with the position where the trajectory parameter resulted in the signal.

14. A speech processing method as set forth in claim 11 wherein said electronic analyzing step includes the step of electronically determining whether the motion along the path is monotonic for a predetermined distance beginning with the position where the trajectory parameter resulted in the signal.

15. A speech processing method as set forth in claim 11 wherein said electronic analyzing step includes the step of electronically computing a numeric value indicative of the direction of motion along the path beginning with the position where the trajectory parameter resulted in said signal when the motion along the path is monotonic for a predetermined period of time beginning with the position where the trajectory parameter resulted in the signal.

16. A speech processing method as set forth in claim 11 wherein said electronic analyzing step includes the step of electronically determining whether the motion along the path is monotonic for a predetermined period of time beginning with the position where the trajectory parameter resulted in the signal, by determining that the values for at least one of the coordinates beginning with that position are either all increasing or all decreasing.

17. A speech processing method comprising the steps of:
electronically deriving frequency spectra from speech in successive time intervals respectively;
computing a series of coordinate values of points on a path in a mathematical space from the frequency spectra of the speech;
determining a greatest and a least of the coordinate values of the points on the path in a time period encompassing a predetermined number of the time intervals; and generating a segmentation index signal representing a function of the difference between the greatest and the least of the coordinate values in the time period.

18. As speech processing method as set forth in claim 17 wherein the series of coordinate values of points on the path includes a plurality of series of values for a plurality of coordinates respectively and the step of generating a segmentation index signal includes identifying peaks as they occur in any of the plurality of series of values and generating the segmentation index signal in response to an occurrence of each peak, with the time period successively encompassing each of successive peak times when each peak occurs and each peak time being approximately centered in said time period for purposes of the segmentation index relating to its corresponding peak.

* * * * *